US011553551B2

(12) United States Patent
Jung et al.

(10) Patent No.: US 11,553,551 B2
(45) Date of Patent: Jan. 10, 2023

(54) METHOD AND DEVICE FOR SUPPORTING DOUBLE CONNECTION OF RRC INACTIVATION MODE IN NEXT GENERATION MOBILE COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Donggun Kim, Suwon-si (KR); Himke Van Der Velde, Suwon-si (KR); Anil Agiwal, Suwon-si (KR); Jungsoo Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 61 days.

(21) Appl. No.: 17/253,950

(22) PCT Filed: Jun. 21, 2019

(86) PCT No.: PCT/KR2019/007534
§ 371 (c)(1),
(2) Date: Dec. 18, 2020

(87) PCT Pub. No.: WO2019/245335
PCT Pub. Date: Dec. 26, 2019

(65) Prior Publication Data
US 2021/0274587 A1 Sep. 2, 2021

(30) Foreign Application Priority Data

Jun. 21, 2018 (KR) .................. 10-2018-0071372
Sep. 27, 2018 (KR) .................. 10-2018-0115229

(51) Int. Cl.
*H04W 76/27* (2018.01)
*H04W 76/30* (2018.01)
(Continued)

(52) U.S. Cl.
CPC ....... *H04W 76/27* (2018.02); *H04W 12/0433* (2021.01); *H04W 24/08* (2013.01); *H04W 76/30* (2018.02)

(58) Field of Classification Search
CPC . H04W 76/27; H04W 76/30; H04W 12/0433; H04W 24/08
(Continued)

(56) References Cited

U.S. PATENT DOCUMENTS 10,980,081 B2 * 4/2021 Lee ....................... H04W 76/27
11,140,740 B2 * 10/2021 Martinez Tarradell ..................... H04W 76/34
(Continued)

FOREIGN PATENT DOCUMENTS

KR    10-2018-0133194 A    12/2018

OTHER PUBLICATIONS

Huawei et al. 'State transition between RRC connected and inactive', R2-1706723, 3GPP TSG RAN WG2 AdHoc, Jun. 17, 2017, Qindao, China.
(Continued)

*Primary Examiner* — Mong-Thuy T Tran
(74) *Attorney, Agent, or Firm* — Jefferson IP Law, LLP

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security, and safety-related services, and
(Continued)

the like) on the basis of 5G communication technology and IoT-related technology. Disclosed are a method and a device for supporting the connection of a terminal operating in an RRC inactivation mode.

18 Claims, 26 Drawing Sheets

(51) Int. Cl.
*H04W 12/0433* (2021.01)
*H04W 24/08* (2009.01)
(58) Field of Classification Search
USPC .......................................................... 370/328
See application file for complete search history.

(56) References Cited

U.S. PATENT DOCUMENTS

| | | | | |
|---|---|---|---|---|
| 11,184,785 | B2* | 11/2021 | Zacharias | H04W 24/08 |
| 11,336,517 | B2* | 5/2022 | Byun | H04W 76/22 |
| 2018/0139778 | A1 | 5/2018 | Chou et al. | |
| 2018/0270682 | A1* | 9/2018 | Zacharias | H04W 24/08 |
| 2018/0278357 | A1* | 9/2018 | Kim | H04W 76/27 |
| 2019/0014492 | A1* | 1/2019 | Kim | H04W 76/27 |
| 2019/0021023 | A1* | 1/2019 | Byun | H04W 4/70 |
| 2019/0021052 | A1* | 1/2019 | Kadiri | H04W 76/27 |
| 2019/0037425 | A1* | 1/2019 | Hong | H04B 7/06 |
| 2019/0037634 | A1* | 1/2019 | Kadiri | H04W 74/0833 |
| 2019/0387569 | A1* | 12/2019 | Martinez Tarradell | H04W 76/27 |
| 2020/0008255 | A1* | 1/2020 | Sharma | H04W 12/0431 |
| 2020/0045764 | A1* | 2/2020 | Kim | H04L 5/0007 |
| 2020/0053810 | A1* | 2/2020 | Lee | H04W 76/15 |
| 2020/0113012 | A1* | 4/2020 | Lee | H04W 28/02 |
| 2020/0154326 | A1* | 5/2020 | Deenoo | H04W 36/08 |
| 2020/0178113 | A1 | 6/2020 | Jin et al. | |
| 2020/0351723 | A1* | 11/2020 | Kim | H04W 36/0033 |

OTHER PUBLICATIONS

Huawei et al., 'Remaining issues on state transition between RRC connected and inactive', R2-1808100, 3GPP TSG RAN WG2 Meeting #102, May 10, 2018, Busan, Korea.
Asustek, 'State transition from RRC_connected to RRCJnactive', R2-1709058, 3GPP TSG RAN WG2 Meeting #99, Aug. 11, 2017, Bedin, Germany.
Oualcomm Incorporated, 'Suppod of MR-DC with RRC inactive', R3-183107, 3GPP TSG RAN WG3 Meeting #100, May 11, 2018, Busan, Korea.
Extended European Search Report dated Jun. 17, 2021, issued in a counterpart European Application No. 19821604.6.
Qualcomm Incorporated: "Fast SCell Configuration through Quick SCell Measurement Reporting", 3GPP Draft; R2-1802073_Fastscellconfiguration_Through Quick_s_Cell_Measurement Reporting_V1, 3rd Generation Partnership Project (3GPP), Mobile Competence Centre; 650, Route Des Lucioles ; F-06921 SOPH, vol. RAN WG2, No. XP051399823; Feb. 15, 2018, Athens, Greece.
Nokia et al: "Finalizing IDLE mode measurements for euCA", 3GPP Draft; R2-1806772 Finalizing Idle Mode Measurements, 3rd Generation Partnership Project (3GPP), Mobile Competence Centre; 650, Route Des 02 Lucioles ; F-06921 Sophia-Antipolis Cedex ; France, vol. EPO Form 1703 01 .91 TRI RAN WG2, No. XP051465117; May 25, 2018, Busan, South Korea.
Nokia et al: "Stage-2 description of euCA", 3GPP Draft; 36300_CR1137R1_(REL-15)_R2-1809245_EUCA STAGE-2 CR (REL-15), 3rd Generation Partnership Project (3GPP), Mobile Competence Centre; 650, Route Des Lucioles; 03 F-06921 Sophia-Antipolis Cedex, vol. RAN WG2, No. XP051452579; Jun. 7, 2018, Busan, South Korea.

* cited by examiner

METHOD AND DEVICE FOR SUPPORTING DOUBLE CONNECTION OF RRC INACTIVATION MODE IN NEXT GENERATION MOBILE COMMUNICATION SYSTEM

CROSS-REFERENCE TO RELATED APPLICATION(S)

This application is a U.S. National Stage application under 35 U.S.C. § 371 of an International application number PCT/KR2019/007534, filed on Jun. 21, 2019, which is based on and claimed priority of a Korean patent application number 10-2018-0071372, filed on Jun. 21, 2018, and of a Korean patent application number 10-2018-0115229, filed on Sep. 27, 2018, in the Korean Intellectual Property Office, the disclosure of each of which are incorporated by reference herein in their entireties.

TECHNICAL FIELD

The disclosure relates to a method and device for supporting a terminal which operates in a radio resource control (RRC) inactive mode in a next-generation mobile communication system and, more specifically, to a method and device for supporting dual connectivity of a terminal which operates in an RRC inactive mode.

Further, the disclosure relates to a method and device for enhancing security and an operation of efficient protocol layer device when a terminal, which uses a dual-connectivity technology in a next-generation mobile communication system, performs state transition from an RRC-connected mode to an RRC inactive mode, or performs state transition from an RRC inactive mode to an RRC-connected mode.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

As a communication system evolves, active research is being conducted on a terminal which operates in an RRC inactive mode, and there is an increasing need for a method of supporting dual connectivity for the terminal.

DISCLOSURE OF INVENTION

Technical Problem

In general, a mobile communication system has been developed to provide communication while securing mobility of a user. The mobile communication system has advanced to the stage of providing a high-speed data communication service as well as a voice communication service by virtue of the remarkable development of technologies. However, in such a wireless mobile communication system, a terminal may be serviced intermittently, instead of being continuously serviced for a long time. Accordingly, when the terminal consistently receives and identifies signals of a base station, the terminal power will be consumed quickly. Therefore, it is very important to reduce such power consumption. The terminal may switch from an RRC-connected mode to an RRC idle mode, thereby remaining in a standby mode. However, the conversion of the state of the terminal from the standby mode to the RRC-connected mode requires a large number of signaling procedures. Therefore, an RRC inactive mode, which enables signaling procedure reduction, prompt connection, and terminal power saving as in the standby mode, may be introduced in the next-generation mobile communication system. However, for the terminal employing dual-connectivity technology, an efficient method is required to switch from the RRC-connected mode to the RRC inactive mode (or lighted-connected mode), or from the RRC inactive mode (or lighted-connected mode) to the RRC-connected mode.

In the next-generation mobile communication system, the detailed operation of protocol layer devices (MAC, RLC, and PDCP), which is to be performed when the terminal performs state transitions, or which is appropriate for the newly introduced RRC inactive mode, is to be defined. Further, there is a need for detailed encryption and decryption procedures in consideration of security required in the process of transmitting or receiving an RRC message in the RRC inactive mode.

In addition, an enhanced method of supporting dual connectivity of the terminal operating in the RRC inactive mode is required.

Solution to Problem

A method of a terminal according to an embodiment to solve the above-described technical problems includes: acquiring, from an RRC release message or system information received from a base station, configuration information for frequency measurement; performing the frequency measurement in an RRC inactive mode based on the configuration information; receiving, from the base station for which the terminal is to configure connection, an RRC resume message including first information for requesting to report a frequency measurement result; and transmitting, to the base station for which the terminal is to configure connection, an RRC resume complete message including second information of the frequency measurement result.

A terminal according to an embodiment to solve the above-described technical problems includes a transceiver configured to transmit and receive a signal, and a controller configured to: acquire, from an RRC release message or system information received from a base station, configuration information for frequency measurement; perform the frequency measurement in an RRC inactive mode based on the configuration information; receive, from the base station for which the terminal is to configure connection, an RRC resume message including first information for requesting to report a frequency measurement result; and transmit, to the base station for which the terminal is to configure connection, an RRC resume complete message including second information of the frequency measurement result.

A method of a base station according to an embodiment to solve the above-described technical problems may include: transmitting, to a terminal, an RRC release message or system information including configuration information for frequency measurement; transmitting, to the terminal, an RRC resume message including first information for requesting to report a frequency measurement result; and receiving, from the terminal, an RRC resume complete message including second information of the frequency measurement result, wherein the frequency measurement result is a result of the frequency measurement performed in an RRC inactive mode based on the configuration information.

A base station according to an embodiment to solve the above-described technical problems may include a transceiver configured to transmit and receive a signal, and a controller configured to: transmit, to the terminal, an RRC release message or system information including configuration information for frequency measurement; transmit, to the terminal, an RRC resume message including first information for requesting to report a frequency measurement result; and receive, from the terminal, an RRC resume complete message including second information of the frequency measurement result, wherein the frequency measurement result is a result of the frequency measurement performed in an RRC inactive mode based on the configuration information.

Advantageous Effects of Invention

In the disclosure, an RRC message exchange procedure and an efficient protocol layer device operation are proposed to enhance security required when a terminal employing dual-connectivity technology in a next-generation mobile communication system performs state transition from an RRC inactive mode to an RRC-connected mode, or from an RRC-connected mode to an RRC inactive mode.

In the disclosure, a connection release procedure and a connection configuration procedure in the case when the terminal performs state transition, for example, in the case of state transition from the RRC-connected mode to the RRC inactive mode, and transition from the RRC inactive mode to the RRC-connected mode again, are proposed in detail in consideration of security, and an operation to be performed by each protocol layer device in the connection release procedure and the connection configuration procedure is proposed, whereby the terminal employing dual-connectivity technology can be efficiently supported in the RRC inactive mode.

MODE FOR THE INVENTION

Figure 1A:
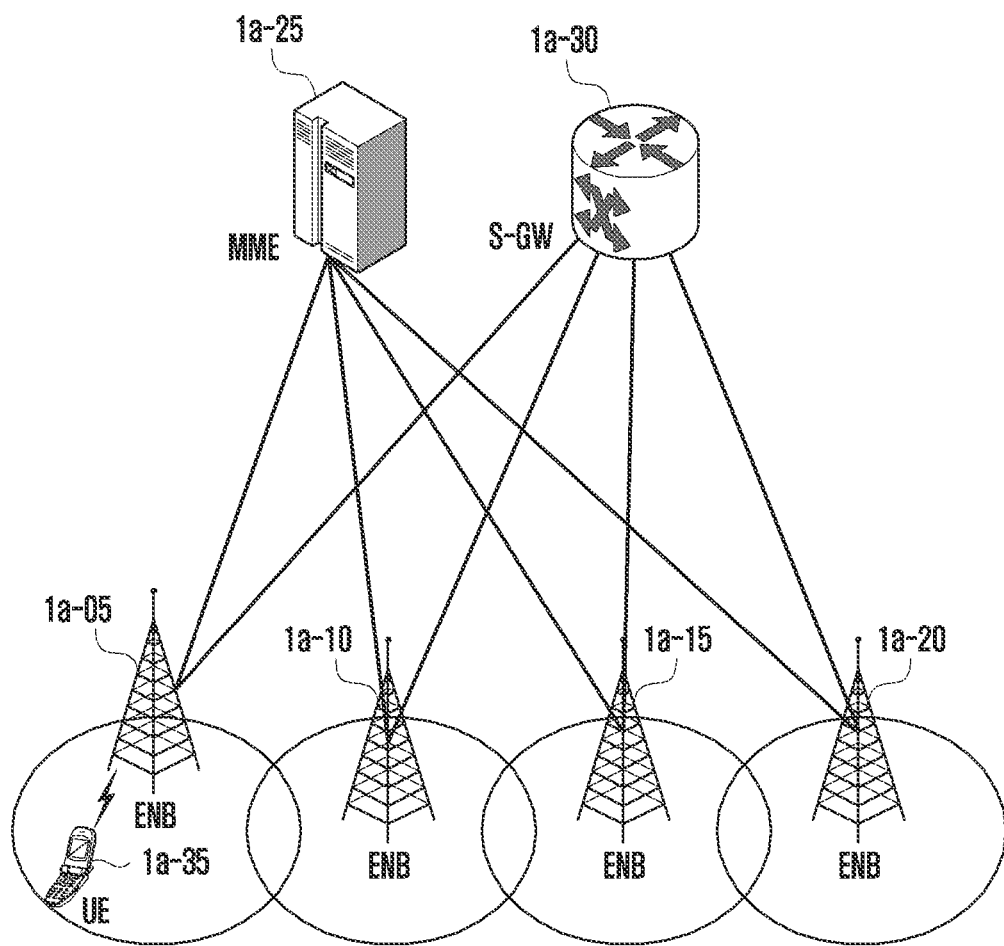
FIG. 1A illustrates the structure of an LTE system, to which the disclosure is applicable.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

First Embodiment

FIG. 1A illustrates the structure of an LTE system, to which the disclosure is applicable.

Referring to FIG. 1A, a radio access network (RAN) of the LTE system includes evolved base stations (hereinafter, referred to as "evolved node Bs (ENBs)", "Node Bs", or "base stations") $1a$-05, $1a$-10, $1a$-15, and $1a$-20, a mobility management entity (MME) $1a$-25, and a serving-gateway (S-GW) $1a$-30. A user equipment (hereinafter, referred to as a "UE" or "terminal") $1a$-35 accesses an external network via the ENBs $1a$-05, $1a$-10, $1a$-15, and $1a$-20 and the S-GW $1a$-30.

In FIG. 1A, the ENBs $1a$-05, $1a$-10, $1a$-15, and $1a$-20 correspond to the existing node Bs of a universal mobile telecommunication system (UMTS). The ENB is connected to the UE $1a$-35 via a radio channel, and performs more complex functions than an existing node B. Since all user traffic data including real-time services such as voice over Internet protocol (VoIP) is serviced through a shared channel in the LTE system, a device for collecting state information, such as buffer state information of a UE, available transmission power state information, and channel state information and performing scheduling is required, and each of the ENBs $1a$-05, $1a$-10, $1a$-15, and $1a$-20 serves as such a device. A single ENB generally controls multiple cells. For example, the LTE system uses a radio-access technology such as orthogonal frequency-division multiplexing (hereinafter, referred to as "OFDM") in a bandwidth of 20 MHz to achieve a data rate of 100 Mbps. In addition, the LTE system also applies adaptive modulation & coding (hereinafter, referred to as "AMC") to determine a modulation scheme and a channel-coding rate in accordance with the channel state of a terminal. The S-GW $1a$-30 is a device for providing a data bearer, and generates or releases the data bearer under the control of the MME $1a$-25. The MME is a device for performing a mobility management function and various control functions for a terminal, and is connected to multiple base stations.

Figure 1B:
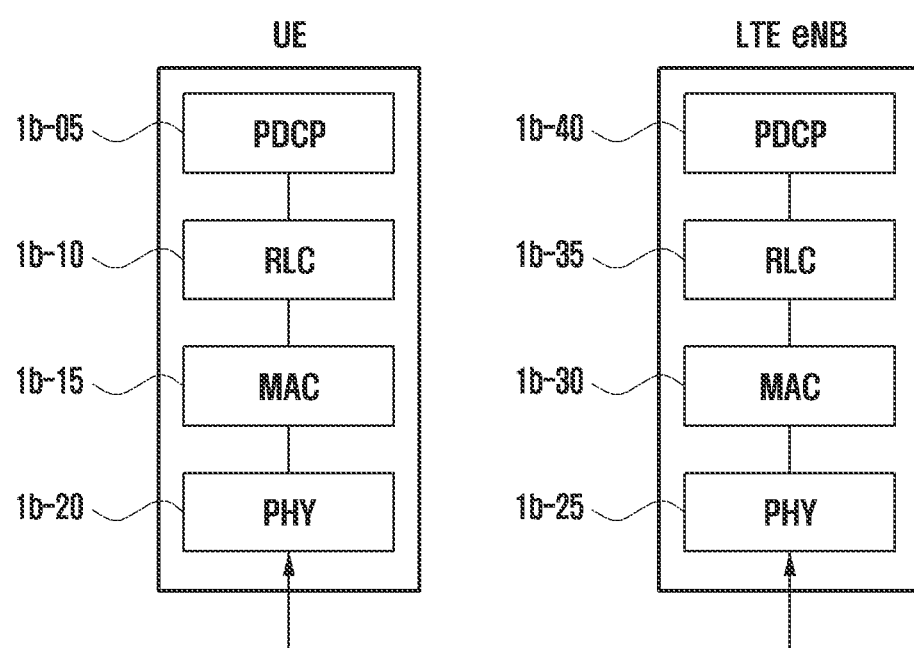
FIG. 1B illustrates a radio protocol structure in an LTE system, to which the disclosure is applicable.

FIG. 1B illustrates a radio protocol structure in an LTE system, to which the disclosure is applicable.

Referring to FIG. 1B, the radio protocol in the LTE system includes packet data convergence protocols (PDCPs) $1b$-05 and $1b$-40, radio link controls (RLCs) $1b$-10 and $1b$-35, and medium access controls (MACs) $1b$-15 and $1b$-30 in a terminal and an ENB, respectively. The PDCPs $1b$-05 and $1b$-40 perform operations of IP header compression/recovery and the like. The main functions of the PDCP are summarized below:

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link controls (hereinafter, referred to as "RLCs") $1b$-10 and $1b$-35 reconfigure the PDCP packet data unit (PDU) at an appropriate size to perform an automatic repeat reQuest (ARQ) operation or the like. The main functions of the RLC are summarized below:

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment The MACs $1b$-15 and $1b$-30 are connected to several RLC layer devices configured in one terminal, and perform an operation of multiplexing RLC PDUs into a MAC PDU and demultiplexing the RLC PDUs from the MAC PDU. The main functions of the MAC are summarized below:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers (PHYs) $1b$-20 and $1b$-25 generate an OFDM symbol by performing an operation of channel-coding and modulating upper-layer data and transmit the same through a radio channel, or perform an operation of demodulating and channel-decoding the OFDM symbol received through the radio channel and transmit the same to an upper layer.

Figure 1C:
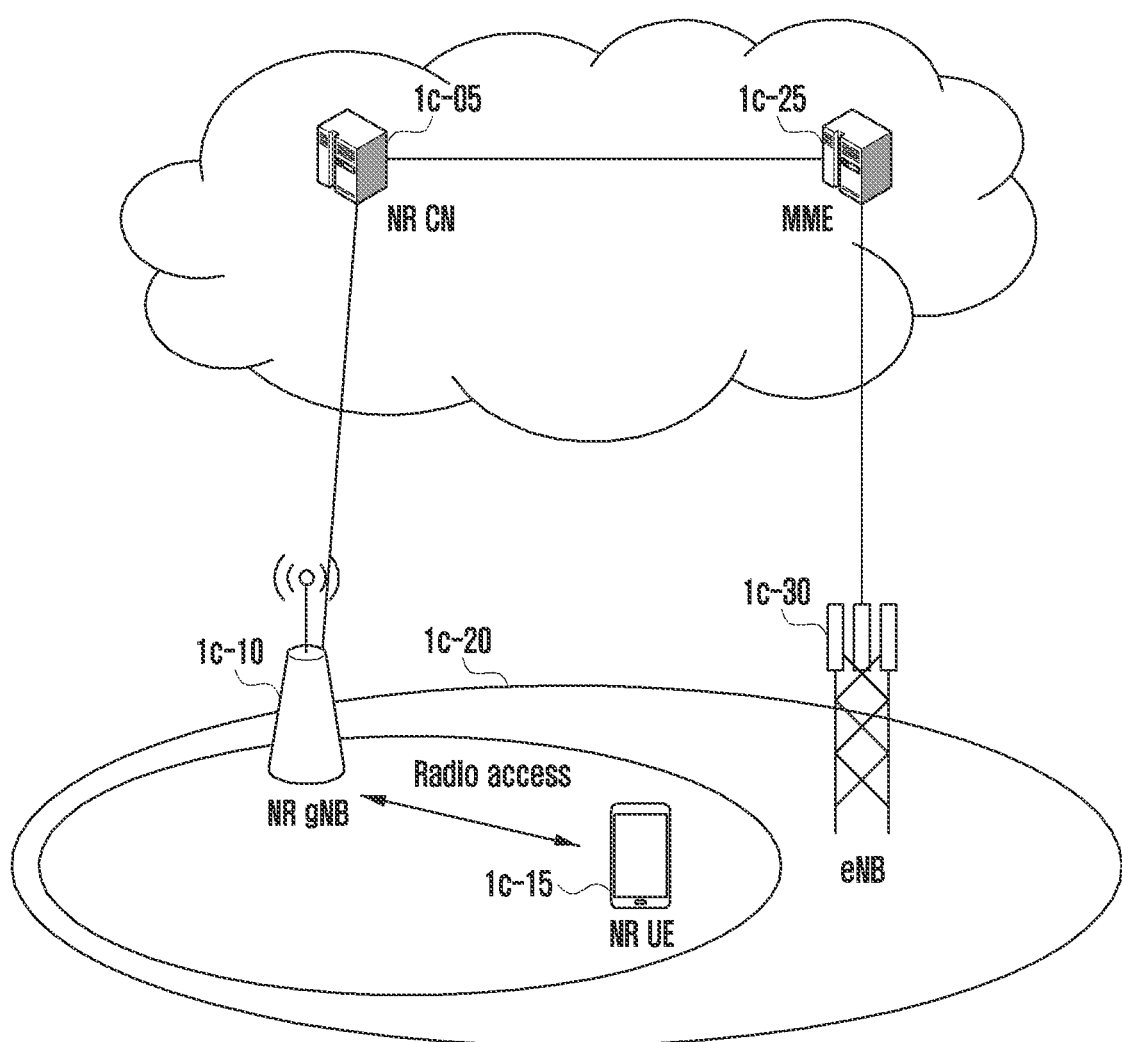
FIG. 1C illustrates the structure of a next-generation mobile communication system, to which the disclosure is applicable.

FIG. 1C illustrates the structure of a next-generation mobile communication system, to which the disclosure is applicable.

Referring to FIG. 1C, a radio access network in the next-generation mobile communication system (Hereinafter, referred to as "NR" or "5G") includes a new-radio node B (hereinafter, referred to as an "NR gNB" or "NR base station") 1c-10 and a new-radio core network (NR CN) 1c-05. A new-radio user equipment (hereinafter, referred to as an "NR UE" or a "terminal") 1c-15 accesses an external network through the NR gNB 1c-10 and the NR CN 1c-05.

In FIG. 1C, the NR gNB 1c-10 corresponds to an evolved node B (eNB) of the existing LTE system. The NR gNB may be connected to the NR UE 1c-15 through a radio channel, and thus may be capable of providing service superior to that of the existing node B. Since all user traffic is serviced through shared channels in the next-generation mobile communication system, a device for collecting state information, such as buffer state information of each UE, available transmission power state information, and channel state information, and performing scheduling is required, and the NR NB 1c-10 serves as such a device. A single NR gNB generally controls multiple cells. In order to implement ultra-high-speed data transmission as compared with the existing LTE, the NR gNB may have a maximum bandwidth that is equal to or higher than the existing maximum bandwidth, and a beamforming technology may be additionally combined using orthogonal frequency-division multiplexing (hereinafter, referred to as "OFDM") as a radio connection technology. In addition, an adaptive modulation & coding (AMC) scheme that determines a modulation scheme and a channel-coding rate in accordance with the channel state of the terminal is applied to the NR gNB. The NR CN 1c-05 performs mobility support, bearer configuration, quality of service (QoS) configuration, and the like. The NR CN is a device that performs not only terminal mobility management functions but also various types of control functions, and is connected to multiple base stations. Further, the next-generation mobile communication system may be linked with the existing LTE system, and the NR CN is connected to the MME 1c-25 through a network interface. The MME is connected to an eNB 1c-30, that is, the existing base station.

Figure 1D:
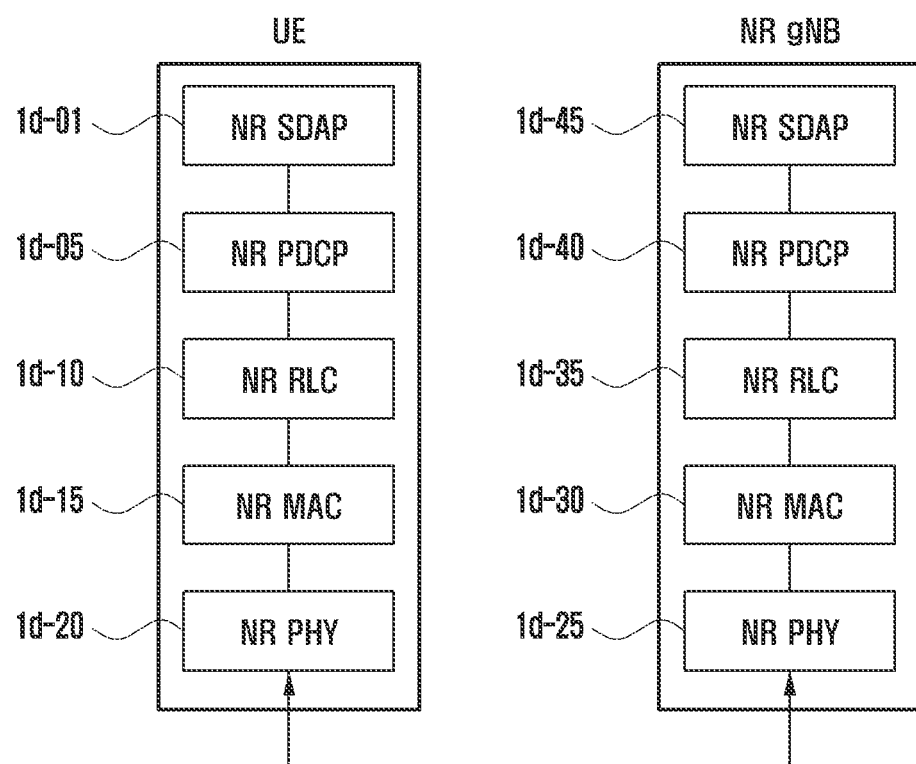
FIG. 1D illustrates a radio protocol structure in the next-generation mobile communication system to which the disclosure is applicable.

FIG. 1D illustrates a radio protocol structure in the next-generation mobile communication system to which the disclosure is applicable.

Referring to FIG. 1D, the radio protocol in the next-generation mobile communication system includes NR SDAPs 1d-01 and 1d-45, NR PDCPs 1d-05 and 1d-40, NR RLCs 1d-10 and 1d-35, and NR MACs 1d-15 and 1d-30, in a terminal and an NR base station, respectively.

The main functions of the NR SDPAs 1d-01 and 1d-45 may include some of the following functions:
  Transfer of user plane data
  Mapping between a QoS flow and a DRB for both DL and UL
  Marking QoS flow ID in both DL and UL packets
  Reflective QoS flow to DRB mapping for the UL SDAP PDUs For an SDAP-layer device, the terminal may receive, through an RRC message, a configuration as to whether to use a header of the SDAP-layer device or to use a function of the SDAP-layer device function for each PDCP layer device, each bearer, or each logical channel When an SDAP header is configured, the terminal may be indicated to update or reconfigure, with an NAS reflective QoS 1-bit indicator and an AS reflective QoS 1-bit indicator of the SDAP header, mapping information for uplink and downlink QoS flows and a data bearer. The SDAP header may include QoS flow ID information indicating the QoS. The QoS information may be used for data-processing priority, scheduling information, or the like in order to ensure a smooth service.

The main functions of the NR PDCPs 1d-05 and 1d-40 may include some of the following functions:
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink In the above description, the reordering function of the NR PDCP device refers to a function of sequentially rearranging PDCP PDUs received in a lower layer based on a PDCP sequence number (SN), and may include: a function of transferring data to an upper layer in the rearranged order; a function of directly transferring data without considering an order; a function of recording lost PDCP PDUs by rearranging an order; a function of reporting a state of the lost PDCP PDUs to a transmission end; and a function of requesting retransmission of the lost PDCP PDUs.

The main functions of the NR RLCs 1d-10 and 1d-35 may include some of the following functions:
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment In the above description, the in-sequence delivery function of the NR RLC device refers to a function of sequentially transferring RLC SDUs received from a lower layer to an upper layer, and may include: a function of rearranging and transferring, when a single RLC SDU is divided into multiple RLC SDUs and received, the divided multiple RLC SDUs; a function of rearranging the received RLC PDUs based on an RLC sequence number (SN) or a PDCP sequence number (SN); a function of recording lost RLC PDUs by rearranging an order; a function of reporting the state of the lost RLC PDUs to a transmission end; a function of requesting retransmission of the lost RLC PDUs; a function of sequentially transferring only RLC SDUs preceding the lost RLC SDU to the upper layer when there is a lost RLC SDU; a function of sequentially transferring all received RLC SDUs to the upper layer before a predetermined timer starts if the timer expires even when there is a lost RLC SDU; and a function of transferring all RLC SDUs received up to that point in time to the upper layer if the predetermined timer expires even when there is a lost RLC SDU. Further, the NR RLC may process the RLC PDUs in the received order (in order of arrival regardless of the order of serial numbers or sequence numbers), and may deliver the processed RLC PDUs to the PDCP device regardless of the order thereof (out-of-sequence delivery). In the case of a segment, the NR RLC may receive segments which are stored in a buffer or are to be received later, reconfigure the segments into one complete RLC PDU, and then process the complete RLC PDU and deliver the same to the PDCP device. The NR RLC layer may not include a concatenation function and may perform the function in the NR MAC layer or may replace the function with a multiplexing function of the NR MAC layer.

In the above description, the out-of-sequence delivery function of the NR RLC device refers to a function of directly delivering, to the upper layer regardless of order, the RLC SDUs received from the lower layer, and may include: a function of rearranging and transferring, when a single RLC SDU is divided into multiple RLC SDUs and received, the divided multiple RLC SDUs; and a function of recording lost RLC PDUs by storing RLC SNs or PDCP SNs of received RLC PDUs and reordering the received RLC PDUs.

The NR MAC 1d-15 and 1d-30 may be connected to several NR RLC layer devices configured in one terminal, and the main functions of the NR MAC may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR Physical layers (NR PHYs) 1d-20 and 1d-25 may generate an OFDM symbol by performing an operation of channel-coding and modulating upper-layer data and transmit the same through a radio channel, or may perform an operation of demodulating and channel-decoding the OFDM symbol received through the radio channel and transmit the same to the upper layer.

Figure 1E:
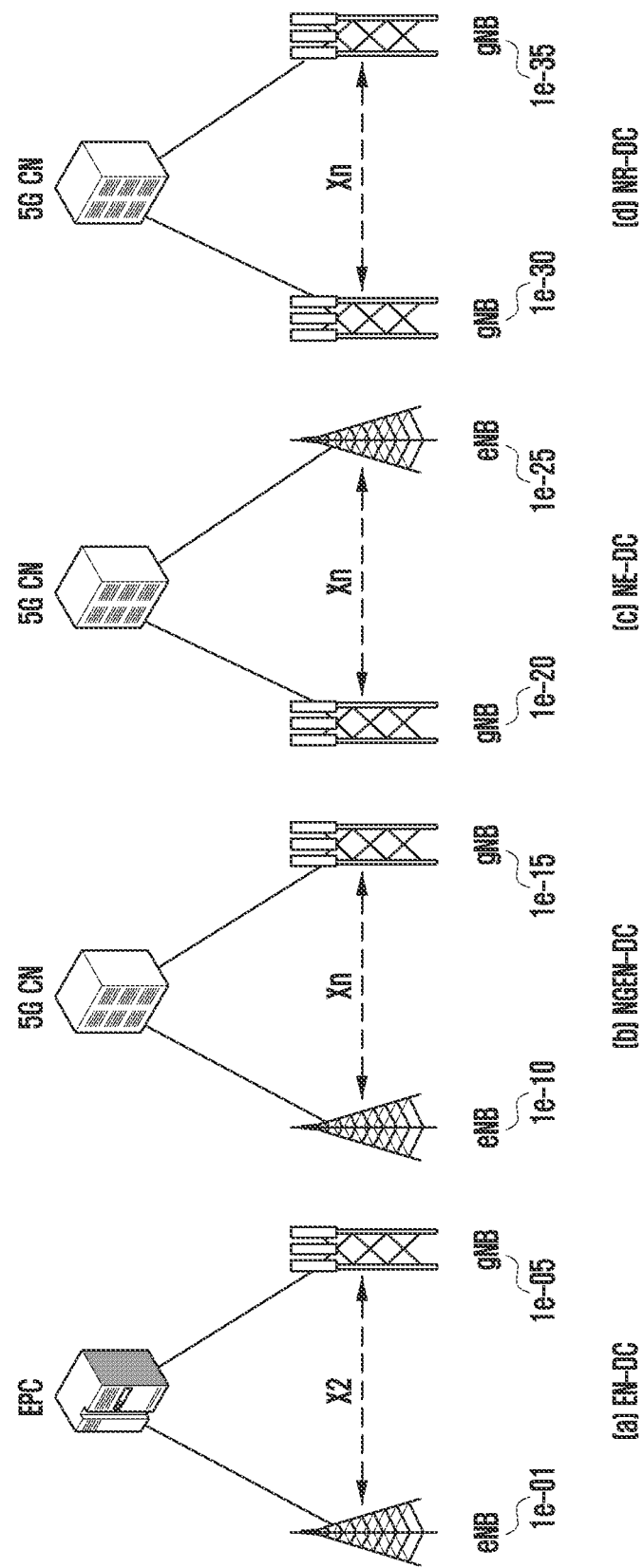
FIG. 1E illustrates a network structure for supporting multi-radio access technology-dual connectivity (MR-DC) or NR-NR dual connectivity (NR-DC) in a wireless communication system (for example, an LTE system) and a next-generation mobile communication system (for example, an NR system), to which the disclosure is applicable.

FIG. 1E illustrates a network structure for supporting multi-radio access technology dual connectivity (MR-DC) or NR-NR dual connectivity (NR-DC) in a wireless communication system (the LTE system in FIG. 1A) and a next-generation mobile communication system (the NR system in FIG. 1C), to which the disclosure is applicable.

In FIG. 1E, E-UTRA-NR dual connectivity (EN-DC) means that a terminal is connected to an LTE base station (eNB) 1e-01 serving as a master node (MN) and an NR base station (gNB) 1e-05 serving as a secondary node (SN) 1e-05. Here, the LTE base station (eNB) is connected to an EPC, and the NR base station (gNB) may or may not be connected the EPC. Therefore, according to whether the NR base station (gNB) is connected to the EPC, data transmission or reception to or from the terminal supporting EN-DC may be performed via an X2 interface, or data transmission or reception may be performed directly to or from the terminal. NG-E-UTRA-NR dual connectivity (NGEN-DC) means that a terminal is connected to an LTE base station (eNB) 1e-10 serving as an MN and an NR base station (gNB) 1e-15 serving as an SN. Here, the LTE base station (eNB) is connected to a 5G CN, and the NR base station (gNB) may or may not be connected to the 5G CN. Therefore, according to whether the NR base station (gNB) is connected to the 5G CN, data transmission or reception to or from the terminal supporting NGEN-DC may be performed via an Xn interface, or data transmission or reception may be performed directly to or from the terminal. NR-E-UTRA dual connectivity (NE-DC) means that a terminal is connected to an NR base station (gNB) 1e-20 serving as an MN and an LTE base station (eNB) 1e-25 serving as an SN. Here, the NR base station (gNB) is connected to a 5G CN, and the LTE base station (eNB) may or may not be connected to the 5G CN. Therefore, according to whether the LTE base station (eNB) is connected to the 5G CN, data transmission or reception to or from the terminal supporting NE-DC may be performed via an Xn interface, or data transmission or reception may be performed directly to or from the terminal. NR-NR dual connectivity (NR-DC) means that a terminal is connected to an NR base station (gNB) 1e-30 serving as an MN and an NR base station (gNB) 1e-35 serving as an SN. Here, one NR base station (gNB) is connected to a 5G CN, and the other NR base station (gNB) may or may not be connected to the 5G CN. Therefore, according to whether the other NR base station (gNB) is connected to the 5G CN, data transmission or reception to or from the terminal supporting NR-DC may be performed via an Xn interface, or data transmission or reception may be performed directly to or from the terminal.

Figure 1F:
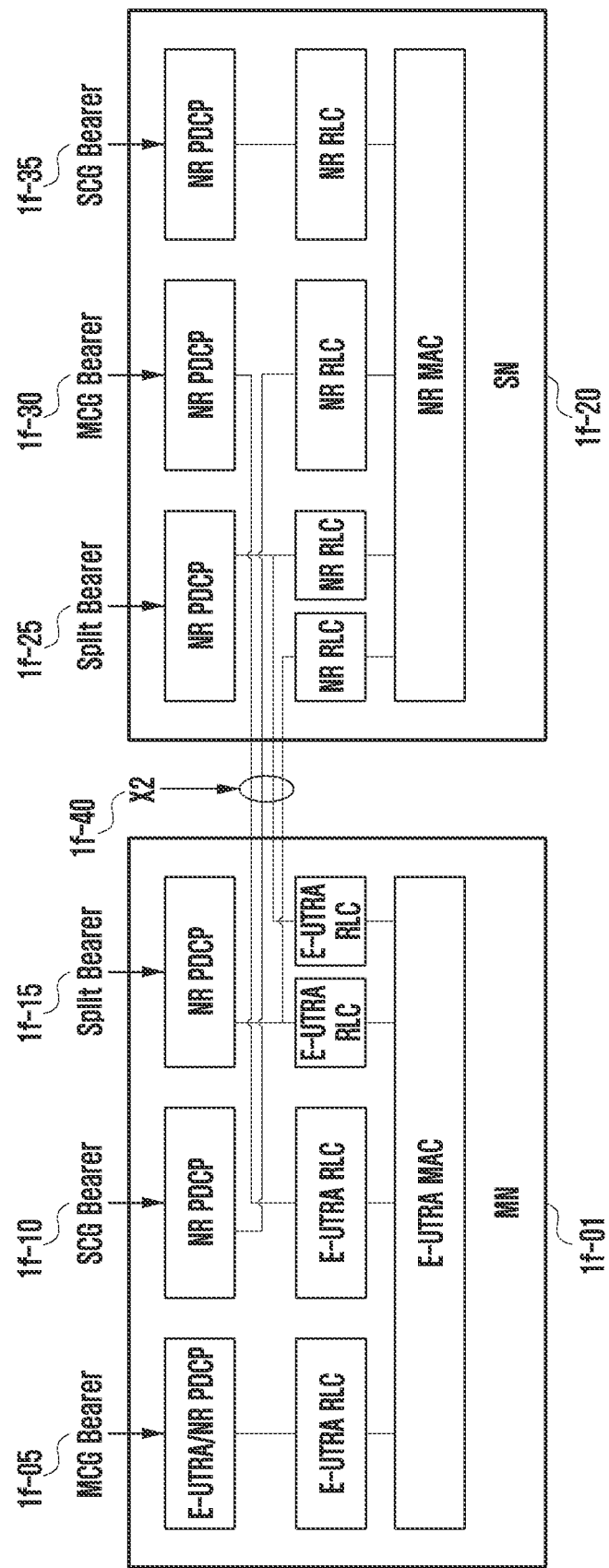
FIGS. 1FA and 1FB illustrate bearer types supporting MR-DC or NR-DC in an LTE system or a next-generation mobile communication system in the disclosure.
Figure 1F:
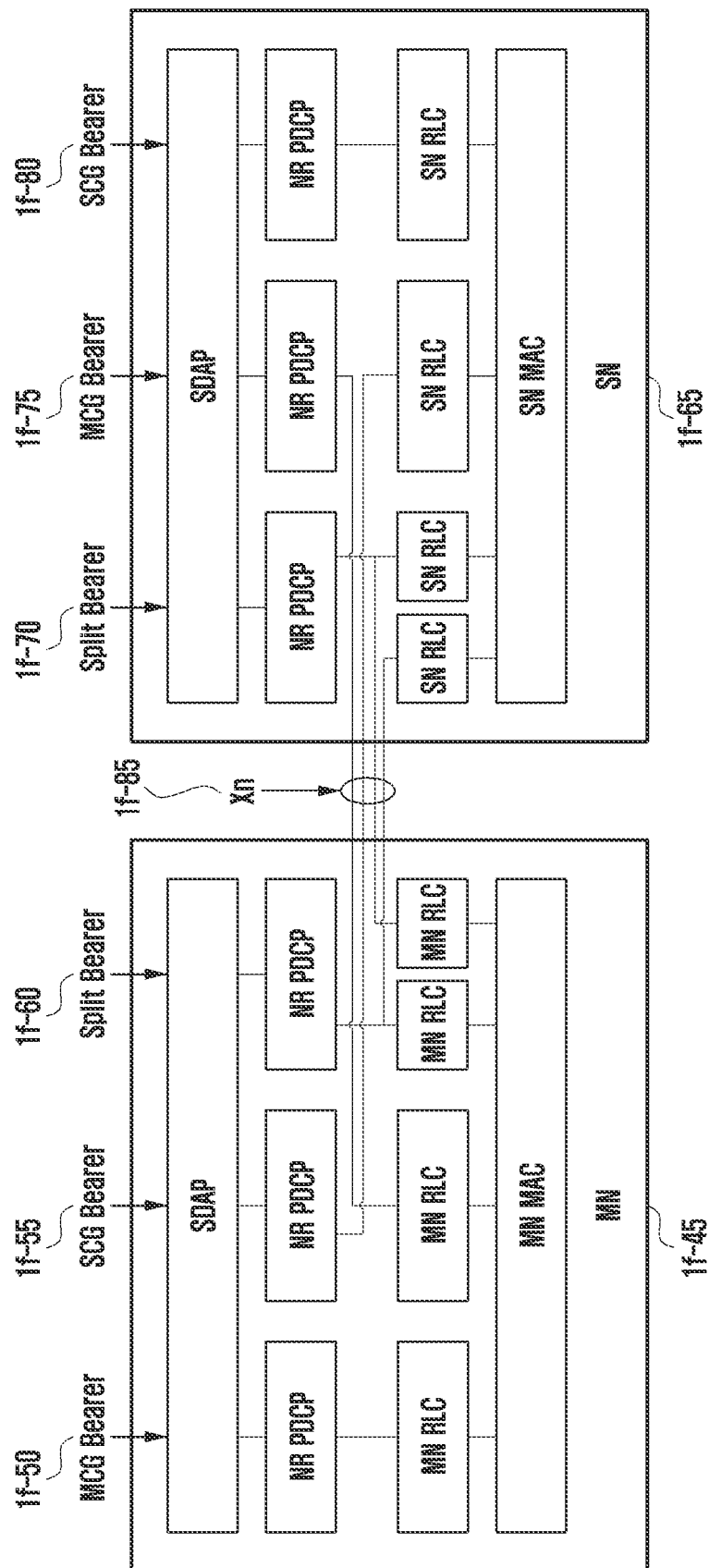

FIGS. 1FA and 1FB illustrate bearer types supporting MR-DC or NR-DC in an LTE system or a next-generation mobile communication system in the disclosure. FIG. 1FA illustrates network-side protocol termination options for master cell group (MCG), secondary cell group (SCG), and split bearers in EPC-based MR-DC (EN-DC), and FIG. 1FB illustrates network-side protocol terminal options for MCG, SCG, and split bearers in 5G CN-based MR-DC (NGEN-DC or NE-DC) and 5G CN-based NR-DC.

In FIGS. 1FA and 1FB, an MCG means a group of serving cells (Scells) associated with the MN, and includes one SpCell (for example, a primary cell of the MCG (PCell)) and one or more SCells. An SCG means a group of SCells associated with the SN, and includes one SpCell (for example, a primary cell of the SCG (PSCell)) and one or more SCells.

In FIGS. 1FA and 1FB, an MCG bearer means a radio bearer 1f-05, 1f-30, 1f-50, or 1f-75 in which an RLC bearer is in the MCG only, an SCG bearer 1f-10, 1f-35, 1f-55, or 1f-80 means a radio bearer in which an RLC bearer is in the SCG only, and a split bearer 1f-15, 1f-25, 1f-60, or 1f-70 means a radio bearer in which RLC bearers are in both the MCG and the SCG. An MN-terminated bearer means a radio bearer in which a PDCP is positioned in the MN, and an SN-terminated bearer means a radio bearer in which a PDCP is positioned in the SN, which is to distinguish the MCG bearer of the MN from the MCG bearer of the SN. For example, an MN-terminated MCG bearer 1f-05 or 1f-50 indicates the MCG bearer of the MN, and an SN-terminated MCG bearer 1f-30 or 1f-75 indicates the MCG bearer of the SN. The same definition above is applied when distinguishing an SCG/split bearer of the MN from an SCG/split bearer of the SN.

In the disclosure, when a bearer of a layer device is suspended, it means that no data transmission or reception may be performed and data-processing is suspended, and also means that the data is not considered for transmission and is thus not considered for buffer state reporting. On the other hand, when a bearer or a layer device is resumed, it means that data transmission or reception may be performed and data-processing is resumed, and also means that the data is considered for transmission and is thus considered for buffer state reporting. Therefore, in the disclosure, a resumption procedure and suspension procedure for supporting an RRC-connected mode or an RRC inactive mode of the MR-DC terminal or the NR-DC terminal described in FIG. 1E are defined, and a bearer handling method according to the procedures is proposed.

Figure 1G:
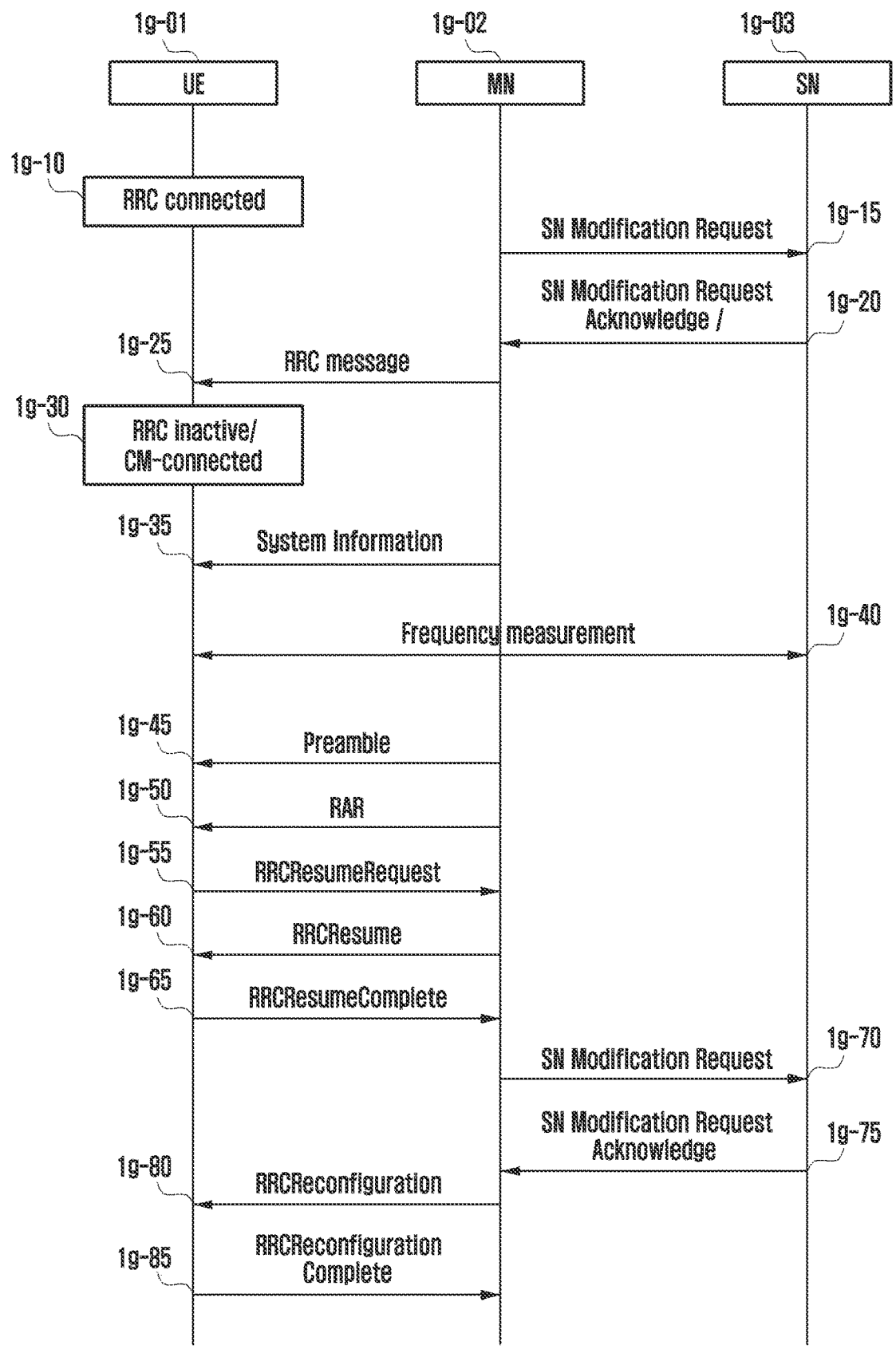
FIG. 1G illustrates a (1-1)th embodiment describing a procedure of suspending and resuming RRC connection by applying MR-DC or NR-DC in an RRC-connected mode or an RRC inactive mode of an MR-DC or NR-DC terminal in the disclosure.

FIG. 1G illustrates a (1-1)th embodiment describing a procedure of suspending and resuming RRC connection by applying MR-DC or NR-DC in an RRC-connected mode or an RRC inactive mode of an MR-DC terminal or an NR-DC terminal in the disclosure.

In FIG. 1G, in the case in which there is no data transmission or reception to or from an MR-DC or NR-DC terminal 1g-10 which transmits or receives data in the RRC-connected mode, for a predetermined time or for a predetermined reason, when an MN 1g-02 attempts to change SCG configuration information or SN-terminated MCG bearers in the same SN configured for the terminal (configuration changes of the SCG within the same SN, e.g. the addition, modification, or release of SCG bearer(s) and the SCG RLC bearer of split bearer(s), as well as configuration changes for SN-terminated MCG bearers in EN-DC or configuration changes of the SCG within the same SN, including addition, modification, or release PDU session/QoS Flows mapped to SN-terminated bearer(s) and MN-terminated bearers with an SCG RLC bearer in both MR-DC with 5GC or NR-DC), the MN 1g-02 may initiate an SN modification procedure towards an SN 1g-03. In addition, when the MN 1g-02 attempts to perform handover within the same MN while keeping the SN (when the MN performs handover within the same SN while keeping the SN), the MN 1g-02 may initiate the SN modification procedure towards the SN 1g-03. Further, when the MN 1g-02 attempts to inquire about whether it is possible to change a part of configuration information within the current SCG configuration and apply the changed information (when the MN queries the current SCG configuration, e.g. when delta configuration is applied), the MN 1g-02 may initiate the SN modification procedure towards the SN 1g-03. However, when the MN attempts to change SCells of the SCG (performs the addition, modification, or release of SCG SCells), the MN 1g-02 may not initiate the SN modification procedure towards the SN 1g-03.

The MN 1g-02 may transmit an SN modification request message to the SN 1g-03 to initiate the SN modification procedure (operation 1g-15). The SN modification request message 1g-15 may include the following information.

1. The SN modification request message may include information related to UE context. For example, when a security key is to be updated in the SN, a new security key (a new SgNB security key) may be included.

2. The SN modification request message may include information related to bearer context. For example, when SCG RLC re-establishment is to be performed for a bearer to which the SCG RLC bearer among the MN-terminated bearers is mapped and configured, an uplink general packet radio service (GPRS) tunneling protocol (GTP) tunnel endpoint identifier (UL GTP TEID) may be included.

3. Information related to PDU session/QoS flow context

4. Data forwarding address information, if applicable

5. PDU-session-level network slice information

6. Requested SCG configuration information including a UE capability adjustment result In addition, a new indicator or a new information element (IE) below may be defined and included in the SN modification request message 1g-15.

1. MR-DC configuration information or NR-DC configuration information configured for the terminal 1g-10, and information to request whether to keep, suspend, release the MR-DC configuration information or the NR-DC configuration information in the case where the corresponding information is included or not included 2. Information indicating transition of the state of the terminal 1g-10 to an RRC inactive mode 3. The SN modification request message may include information to request whether there is data activity of the terminal in the SCG RLC bearer or the split bearer among the MN-terminated bearers. For example, when identifying whether there are PDU session/QoS flows, which are mapped to the SCG RLC bearer(s) among the MN-terminated bearer(s) and activated, the corresponding information may be included in the new indicator or the new IE. The SN modification request message include information to request whether to maintain, suspend, or release the configuration information of the SCG RLC bearer(s) or the split bearer(s) among the MN-terminated bearer(s) in the case where the SCG RLC bearer or the split bearer among the MN-terminated bearers includes or does not include the information to request whether there is data activity of the terminal.

4. The SN modification request message may include information to request whether there is terminal activity in the SN-terminated bearer(s). For example, when identifying whether there are PDU session/QoS flows, which are mapped to the SN-terminated bearer(s) and activated, the new indicator or the new IE may be included. The SN modification request message may include information to request whether to maintain, suspend, or release configuration information of the SN-terminated bearer(s) in the case where the SN-terminated bearer(s) includes or does not include information to request whether there is data activity of the terminal.

5. Full configuration information for the SN (fullConfig for the SN), and information to request whether to maintain, suspend, or release the full configuration information for the SN in the case where the corresponding information is included or not included 6. SN cell group information (CellGroupConfig, CellGroupConfig, i.e. RLC bearer configurations for all DRBs, MAC-CellGroupConfig, PhysicalCellGroupConfig, and PCell/SCell configuration of SN), and information to request whether to maintain, suspend, or release SN cell group information in the case where the SN cell group information is included or not included 7. SN SDAP/PDCP configuration information (RadioBearerConfig, i.e. SDAP/PDCP configurations for all DRBs), and information to request whether to maintain, suspend, or release the SN SDAP/PDCP configuration information in the case where the corresponding information is included or not included 8. Configuration information relating to measurement from the SN (MeasConfig), information to request whether to maintain, suspend, or release the configuration information relating to measurement from the SN in the case where the corresponding information is included or not included 9. The SN modification request message may include information to request whether it is possible to change only a part of configuration (delta configuration) information from within current SCG configuration and apply the changed information. For example, information to request whether delta configuration is applicable when the MN performs handover within the same MN while keeping the SN may be included.

The SN 1g-03 having received the SN modification request message may transmit an SN modification request acknowledge message to the MN 1g-02 (operation 1g-20). A new indicator or a new IE below may be defined and included in the SN modification request acknowledge message 1g-02.

1. MR-DC configuration information or NR-DC configuration information configured for the terminal 1g-10 by the SN, and information indicating whether to apply, maintain, suspend, or release MR-DC configuration information or NR-DC configuration information included in the SN modification request message in the case where the MR-DC configuration information or the NR-DC configuration information is not included 2. Information to request whether to maintain the state of the terminal 1g-10 in the RRC-connected mode or information to request whether to switch the state of the terminal 1g-10 to the RRC inactive mode 3. The SN modification request acknowledge message may include information indicating data activity of the terminal in the SCG RLC bearer or the split bearer among MN-terminated bearers. For example, when PDU session/QoS flows, which are mapped to the SN-terminated bearer(s) and activated, are indicated, the new indicator or the new ID may be included. The SN modification request acknowledge message may include information indicating whether to apply, maintain, suspend, or release the configuration information of the SCG RLC bearer(s) or the split bearer among the MN-terminated bearer(s) included in the SN modification request message in the case where the SCG RLC bearer or the split bearer among the MN-terminated bearers includes or does not include information indicating the data activity of the terminal.

4. The SN modification request acknowledge message may include information indicating whether there is terminal activity in the SN-terminated bearer(s). For example, when PDU session/QoS flows, which are mapped to the SN-terminated bearer(s) and activated, are indicated, the new indicator or the new ID may be included. The SN modification request acknowledge message may include information indicating whether to apply, maintain, suspend, or release SN-terminated bearer(s) configuration information included in the SN modification request message in the case where the SN-terminated bearer(s) includes or does not include information indicating the terminal activity in the SN-terminated bearer(s).

5. Full configuration information of the SN (fullConfig for the SN), and information to request whether to apply, maintain, suspend, or release full configuration information for the SN, included in the SN modification request message, in the case where the full configuration information for the SN is not included 6. SN cell group information (CellGroupConfig, i.e. RLC bearer configurations for all DRBs, MAC-CellGroupConfig, PhysicalCellGroupConfig, and PSCell/SCell configuration of SN), and information to request whether to apply, maintain, suspend, or release SN cell group information included in the SN modification request message in the case where the SN cell group information is not included 7. SN SDAP/PDCP configuration information (RadioBearerConfig, i.e. SDAP/PDCP configurations for all DRBs), and information indicating whether to maintain, suspend, or release SN SDAP/PDCP configuration information included in the SN modification request message in the case where the SN SDAP/PDCP configuration information is not included 8. SN measurement configuration information (MeasConfig), and information indicating whether to maintain, suspend, or release SN measurement configuration information included in the SN modification request message in the case where the SN measurement configuration information is not included 9. The SN modification request acknowledge message may include a part of configuration (delta configuration) information within the SCG configuration, included in the SN modification request message. When duplicated information or large-sized information is not included, signaling between the MN and the SN may be reduced, so that only a part of the configuration information may be included within the SCG configuration.

According to the above-described SN modification procedure 1g-15 and 1g-20, the MN 1g-02 and the SN 1g-03 may maintain or release N2/N3 connection for the MR-DC terminal or the NR-DC terminal. When the N2/N3 connection is maintained, the MN 1g-02 and the SN 1g-03 may perform operations below.

1. The MN and the SN may maintain, suspend, or release MR-DC configuration information or NR-DC configuration information.

2. The MN may maintain or suspend both MN SDAP/PDCP configuration information and SN SDAP/PDCP configuration information, or may maintain or suspend the MN SDAP/PDCP configuration information, and release the SN SDAP/PDCP. The SN may maintain or suspend the SN SDAP/PDCP configuration information.

3. The MN and the SN may maintain or suspend the SCG RLC bearer or the split bearer among the MN-terminated bearers depending on whether there is terminal activity.

4. The MN and the SN may maintain or suspend the SN-terminated bearer(s) depending on whether there is terminal activity.

5. The MN and the SN may maintain, suspend, or release full configuration information for the SN.

6. The MN and the SN may maintain, suspend, or release SN cell group information.

7. The MN and the SN may maintain, suspend, or release SN measurement configuration information.

8. The MN may apply, maintain, or suspend a part of configuration (delta configuration) information within SCG configuration.

In operation 1g-25, the MN 1g-02 may transmit an RRC message (for example, RRC Release with SuspendConfig) to the terminal 1g-10 to switch the state of the terminal to an RRC inactive mode 1g-30 (operation 1g-25).

That is, when the terminal in the RRC-connected mode performs state transition to the RRC inactive mode in the network, mode switching may be indicated by transmitting the RRC release message 1g-25 including suspension configuration information (suspendConfig). The RRC message 1g-25 may include information relating to a frequency which is to be measured in the RRC inactive mode, a priority of the frequency, a timer value, and the like. Configuring the frequency measurement configuration information to the terminal through the RRC message may be more efficient than broadcasting the frequency measurement configuration information on system information in a cell by the network. This is because the network may accurately identify the UE capability of the RRC-connected mode terminal and thus may configure more appropriate frequency measurement configuration information.

The RRC message 1g-25 may include the following information.

1. Information relating to a frequency to be measured or information relating to a cell-specific frequency belonging to an individual base station (MR-DC may support only multiple cells or frequencies belonging to two base stations, and thus the message may be configured to be information relating to cells or frequencies belonging to the individual base station), frequency band information, a frequency identity (a cell identity), a measurement value to be measured (RSRP, RSRQ, or RS-SINR), a measurement object identity, a measurement identity (measurement ID), or a report configuration identity (report configuration ID)

2. The RRC message may include information on an area in which frequency measurement is to be performed in the RRC inactive mode (for example, default area information which is used when a tracking area (TA), a list of cells, an RAN notification area (RNA), or area information does not exist). Further, the frequency or the area, in which frequency measurement is to be performed by the terminal, may be indicated by a physical cell ID or a base station identify.

3. A physical cell identity (physical cell ID) or a base station identity may be indicated to distinguish, when the terminal measures the frequency, different cells or base stations with respect to the same frequency band. That is, the frequency measurement may be performed only for the cell or the frequency corresponding to the configured physical cell identity or the base station identity.

4. An indicator for indicating whether or not to perform frequency measurement in the RRC inactive mode, or whether to perform frequency measurement according to frequency configuration information configured through an RRC message, or to perform frequency measurement according to frequency configuration information received through system information 5. The RRC message may include information including a frequency value to be measured and a way of measuring the frequency value when frequency measurement is performed in the RRC inactive mode. For example, configuration information indicating to measure one or more RSRP, RSRQ, and RS-SINR may be included.

6. The maximum number of measurable carriers when frequency measurement is performed in the RRC inactive mode 7. In order to save battery life of the terminal, a time may be configured so that frequency measurement is performed for a predetermined time only. For example, a timer value may be configured so that the frequency measurement is performed only when the timer operates. When the timer expires, the frequency measurement is suspended, whereby the battery life of the terminal can be saved. That is, the RRC message may include a frequency measurement time when the frequency measurement is performed in the RRC inactive mode.

8. A first time, a second time, or the number of times, a threshold, or a period: The following frequency measurement scheme may be indicated by configuring these values. In addition, a time stamp may be reported to indicate how long ago or how recently the measurement was performed when the frequency measurement is performed according to these values and the measurement reporting is performed.

A. In the case where a state, in which frequency signal strength (for example, RSRP, RSRQ, or RS-SINR) has a value greater than a given threshold, is maintained for a given time (the threshold and the time may be configured for the terminal through the RRC message, or may be broadcasted on system information), when a period is given, performing measurement during each period B. In the case where frequency signal strength (for example, RSRP, RSRQ, or RS-SINR) having a value greater than a given threshold is measured a given number of times or more (the threshold and the number of times may be configured for a terminal through the RRC message, or may be broadcasted on system information), when a period is given, performing measurement during each period C. In the case where frequency signal strength (for example, RSRP, RSRQ, or RS-SINR) having a value greater than a given threshold is measured a given number of times or more within a given time (the threshold, the time, and the number of times may be configured for a terminal through the RRC message, or may be broadcasted on system information), when a period is given, performing measurement during each period D. In the case where a state, in which frequency signal strength (for example, RSRP, RSRQ, or RS-RINR) has a value greater than a given threshold, is maintained for a given second time within a given first time (for example, when a timer is operated) (the threshold, the first time, and the second time may be configured for a terminal through the RRC message, or may be broadcasted on system information), when a period is given, performing measurement during each period E. In the case where frequency signal strength (for example, RSRP, RSRQ, or RS-RINR) having a value greater than a given threshold is measured a given number of times within a given first time (for example, when a timer is operated) (the threshold, the first time, and the number of times may be configured for a terminal through the RRC message, or may be broadcasted on system information), during a period is given, performing measurement for each period Further, the base station may indicate to the terminal: whether or not to perform frequency measurement by the terminal in the RRC inactive mode by defining a new indicator in the RRC message 1g-25; whether to receive frequency measurement configuration information according to system information and perform frequency measurement; or whether to perform frequency measurement based on the frequency measurement configuration information configured through the RRC message.

Further, a Resume ID may be allocated to the RRC message 1g-25 while RRC connection of the terminal is released and then a control message for indicating to store UE context and to release the RRC connection by the terminal is transmitted. In this case, according to the allocation of the Resume ID, the terminal may identify that the UE context is to be stored. Alternatively, the base station may transmit, through the message, a separate context maintenance indication for indicating that the terminal is operated in the RRC inactive mode and the UE context is to be stored.

In the RRC message 1g-25, security information to update a security configuration required later when the terminal performs an RRC resumption procedure may be included. For example, NextHopChainingCount (NCC) may be preassigned so as to calculate and configure a new security key (KeNB* or KgNB* in the MN) by using NCC, and an SK-Counter or an SCG Counter may be preassigned so as to calculate or configure a new security key (SKeNG* or SKgNB* in the SN) by using the SK-Counter or the SCG Counter. In addition, if neither SK-Counter nor SCG Counter is included in the RRC message, an indicator indicating implicit calculation or configuration of a new security key (SKeNG* or SKgNB* in the SN) may be included in the RRC message. Later, the terminal may encrypt, into the security key, information on the result of frequency measured in the RRC inactive mode, and may report the security key to the base station. As described above, by preassigning the security key, the security can be enhanced and signaling overhead, which may be caused by the security configuration, can be reduced when the terminal assesses again. Further, by using the preconfigured security key, when message 3 (an RRC message, for example, an RRC resume request message) is transmitted, an encrypted RRC message may be transmitted, and when encrypted message 4 (an RRC message, for example a RRC resume message) is received, message 4 may be decrypted.

In the RRC message 1g-25, a common configuration parameter may be introduced and used in order for the terminal to simultaneously apply configuration for the MCG and the SCG, an individual configuration parameter may be introduced and used for SpCell in the MCG (for example, a primary cell of the MCG (PCell)) and for one or more SCells, or an individual configuration parameter may be introduced and used for SpCell in the SCG (for example, a primary cell of the SCG (PSCell) and for one or more SCells. When the common configuration parameter and the individual configuration parameter are configured, the individual configuration parameter may precede the common configuration parameter.

In the RRC message 1g-25, a new indicator or a new IE may be defined and included.

1. MR-DC configuration information or NR-DC configuration information, wherein when no MR-DC configuration information or NR-DC configuration information is included, an indicator to maintain, suspend, or release the MR-DC configuration information or the NR-DC configuration information configured in operation 1g-10 may be included 2. MN SDAP/PDCP configuration information and SN SDAP/PDCP configuration information, wherein when the corresponding information is not included, an indicator to maintain, suspend, or release the MN SDAP/PDCP configuration information and the SN SDAP/PDCP configuration information configured in operation 1g-10 may be included 3. Configuration information of a SCG RLC bearer or a split bearer among MN-terminated bearers, wherein when the corresponding information is not included, an indicator to maintain, suspend, or release the configuration information of the SCG RLC bearer or the split bearer among the MN-terminated bearers, the information being configured in operation 1g-10, may be included 4. SN-terminated bearer configuration information, wherein when the corresponding information is not included, an indicator to maintain, suspend, or release the SN-terminated bearer configuration information configured in operation 1g-10 may be included 5. Full configuration information for the SN, wherein when the corresponding information is not included, an indicator to maintain, suspend, or release the full configuration information for the SN, configured in operation 1g-10, may be included 6. SN cell group information, wherein when the corresponding information is not included, an indicator to maintain, suspend, or release the SN cell group information configured in operation 1g-10 may be included 7. SN measurement configuration information, wherein when the corresponding information is not included, an indicator to maintain, suspend, release the SN measurement information configured in operation 1g-10 may be included 8. A part of configuration information within SCG configuration for delta configuration, wherein when the corresponding information is not included, an indicator to maintain, suspend, or release the SCG configuration configured in operation 1g-10 may be included, or an indicator to maintain or suspend a part of preconfigured SCG configuration information and to release the rest of the SCG configuration information may be included When the RRC message 1g-25 is received, the fowling terminal operation may be proposed.

1. The terminal may apply suspension configuration information (suspendConfig) included in the RRC message.

A. When there is no RAN-notification area information (ran-NonitificationAreaInfo) in the suspension configuration information, the terminal may apply prestored RAN-notification area information in order to support delta configuration for the terminal because of the large size of the RAN-notification area information. When there is RAN-notification area information in the suspension configuration information, the terminal may update the existing stored values with new RAN-notification included in the suspension configuration information of the RRC message.

B. When there is no t380 in the suspension configuration information, the terminal may release t380 that is already stored. When there is t380 in the suspension configuration information, the terminal may store the corresponding value.

C. The terminal may store a complete terminal connection resumption identity (FullI-RNTI), a truncated terminal connection resumption identity (ShortI-RNTI), nextHopChainingCount (NCC), and a RAN-paging cycle (ran-PagingCycle), which are included in the suspension configuration information.

D. When there is no SCG-counter value (or sk-counter) and there is an indicator indicating implicit calculation and configuration of a new security key (SKeNG* or SKgNB* in the SN) in the suspension configuration information, the terminal may update the new security key with the prestored SCG-counter value (or sk-counter) and store the same. When there is an SCG-counter value (or sk-counter) in the suspension configuration information, the terminal may store the corresponding value.

2. The terminal may apply configuration information for supporting the inactive mode of the terminal in dual-connectivity, the configuration information being included in the RRC message.

A. When MR-DC configuration information or NR-DC configuration information is included in the RRC message, the terminal may maintain or suspend the corresponding configuration information. When the corresponding information is not included in the RRC message, and an indicator indicating to maintain, suspend, or release the MR-DC configuration information or the NR-DC configuration information configured in operation 1g-10 is included in the RRC message, the terminal operates according to the corresponding indicator. When the indicator is not included in the RRC message, the terminal may maintain, suspend, or release the MR-DC configuration information or the NR-DC configuration information configured in operation 1g-10.

B. When MN SDAP/PDCP configuration information and SN SDAP/PDCP configuration information are included in the RRC message, the terminal may maintain or suspend the corresponding configuration information. When the corresponding information is not included in the RRC message, and an indicator indicating to maintain, suspend, or release the MN SDAP/PDCP configuration information and the SN SDAP/PDCP configuration information configured in operation 1g-10 is included in the RRC message, the terminal operates according to the corresponding indicator. When the indicator is not included in the RRC message, the terminal may maintain, suspend, or release the MN SDAP/PDCP configuration information and the SN SDAP/PDCP configuration information configured in operation 1g-10.

C. When configuration information of a SCG RLC bearer or a split bearer among MN-terminated bearers is included in the RRC message, the terminal may maintain or suspend the corresponding configuration information. When the corresponding information is not included in the RRC message, and an indicator indicating to maintain, suspend, or release the configuration information of the SCG RLC bearer or the split bearer among the MN-terminated bearers, configured in operation 1g-10, is included in the RRC message, the terminal operates according to the corresponding indicator. When the indicator is not included in the RRC message, the terminal may maintain, suspend, or release the configuration information of the SCG RLC bearer or the split bearer among the MN-terminated bearers, configured in operation 1g-10.

D. When SN-terminated bearer configuration information is included in the RRC message, the terminal may maintain or suspend the corresponding configuration information. When the corresponding information is not included in the RRC message, and an indicator indicating to maintain, suspend, or release the SN-terminated bearer configuration information configured in operation 1g-10 is included in the RRC message, the terminal operates according to the corresponding indicator. When the indicator is not included in the RRC message, the terminal may maintain, suspend, or release the SN-terminated bearer configuration information configured in operation 1g-10.

E. When full configuration information for the SN is included in the RRC message, the terminal may maintain or suspend the corresponding configuration information. When the corresponding information is not included in the RRC message, and an indicator indicating to maintain, suspend, or release the full configuration information for the SN configured in operation 1g-10 is included in the RRC message, the terminal operates according to the corresponding indicator. When the indicator is not included in the RRC message, the terminal may maintain, suspend, or release the full configuration information for the SN, configured in operation 1g-10.

F. When SN cell group information is included in the RRC message, the terminal may maintain or suspend the corresponding information. When the corresponding information is not included in the RRC message, and an indicator indicating to maintain, suspend, or release the SN cell group information configured in operation 1g-10 is included, the terminal operates according to the corresponding indicator. When the indicator is not included in the RRC message, the terminal may maintain, suspend, or release the SN cell group information configured in operation 1g-10.

G. When SN measurement configuration information is included in the RRC message, the terminal may maintain or suspend the corresponding information. When the corresponding information is not included in the RRC message, and an indicator indicating to maintain, suspend, or release the SN measurement configuration information configured in operation 1g-10 is included, the terminal operates according to the corresponding indicator. When the indicator is not included in the RRC message, the terminal may maintain, suspend, or release the SN measurement configuration information configured in operation 1g-10.

H. When a part of configuration information within SCG configuration for delta configuration is included in the RRC message, the terminal may maintain or suspend the corresponding information. When the corresponding information is not included in the RRC message, and an indicator indicating to maintain, suspend, or release the SCG configuration configured in operation 1g-10 is included, the terminal operates according to the corresponding indicator. When the corresponding information is not included in the RRC message, and an indicator indicating to maintain or suspend only a part of SGG configuration information preconfigured in operation 1g-10 and to release the rest of the SCG configuration information is included in the RRC message, the terminal operates according to the corresponding indicator. When the indicator is not included in the RRC message, scheme 1 or scheme 2 below may be performed.

i. Scheme 1: The terminal may maintain, suspend, or release the SCG configuration information configured in operation 1g-10.

ii. Scheme 2: The terminal may maintain or suspend only a part of the SGG configuration information preconfigured in operation 1g-10, and may release the rest of the SCG configuration information.

3. The terminal may reset a MAC-layer device corresponding the MN (or MCG). When the release is not performed according to the above-described procedure, the terminal may reset a MAC-layer device corresponding to the SN (or SCG). The terminal resets the MAC-layer device in order to prevent unnecessary data retransmission at the time of connection resumption of pieces of data stored in an HARQ buffer.

4. The terminal may re-establish RLC-layer devices for all SRBs and DRBs corresponding to the MCG bearer. When the release is not performed according to the above-described procedure, the terminal may re-establish RLC-layer devices for all SRBs and DRBs corresponding to the SCG RLC bearer or the split bearer among the MN-terminated bearers. When the release is not performed, the terminal may re-establish RLC-layer devices for all SRBs and DRBs corresponding to the SN-terminated bearer. The terminal re-establishes the RLC-layer device in order to prevent unnecessary data retransmission at the time of connection resumption of pieces of data stored in an RLC buffer, and to initialize parameters for later use.

5. When the RRC message having the suspension configuration information is not received as a response to the RRC connection resumption request message (the RRCResumeRequest message), the terminal may store UE context corresponding to the MN (or MCG). The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell). When the SN (or SCG) bearer is suspended or maintained in the above-described procedure, the terminal may store UE context corresponding to the SN (or SCG). The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

6. The terminal may suspend all SRBs and DRBs except for SRB0.

7. The terminal may operate a T380 timer by using a periodic RAN notification area update timer value (PeriodicRNAU-TimerValue) included in the suspension configuration information (suspendConfig).

8. The terminal may report suspension of RRC connection to an upper layer.

9. The terminal may configure lower-layer devices so as to suspend a function for integrity protection and encryption.

9. The terminal transitions to an RRC inactive mode (operation 1g-30).

The terminal having transitioned to the RRC inactive mode (operation 1g-30) according to the indication from the RRC message performs cell re-selection while moving, and searches for a suitable cell. When a cell to camp on is found, the terminal reads system information 1g-35 of the cell.

The terminal in the RRC inactive mode may camp on one cell and read, from the system information (for example, SIB5 in the LTE system, and SIB1, SIB2, SIB3, SIB4, or SIB5 in the next-generation mobile communication system) of the cell, information relating to a frequency which is to be measured in the RRC inactive mode, a priority of the frequency, timer information, and the like. That is, all or some of the pieces of information included in the RRC message 1g-25 described above may be broadcasted on system information.

When the information on frequency measurement to be performed in the RRC inactive mode, configured in the RRC message 1g-25, satisfies a first condition, the corresponding information precedes the system information 1g-35.

The first condition may correspond to one or more of the following conditions.

1. The case in which a timer value configured through the RRC message has not expired
2. The case in which the terminal has not deviated from an area or a list of cells valid for performing frequency measurement configured through the RRC message
3. The case in which the terminal has not deviated from a cell that was serviced in the RRC-connected mode However, when a second condition is satisfied, the terminal may determine that the information on frequency measurement to be performed in the RRC inactive mode, configured in the RRC message, is no longer valid, and may preferentially apply the system information 1g-35.

The second condition may correspond to one or more of the following conditions.

1. The case in which a timer value configured through the RRC message has expired
2. The case in which the terminal has deviated from an area or a list of cells valid for performing frequency measurement configured through the RRC message
3. The case in which the terminal has deviated from a cell that was serviced in the RRC-connected mode In the case in which the terminal having received, through the system information, the information on frequency measurement to be performed in the RRC inactive mode and having performed the frequency measurement moves and accesses a new cell through cell re-selection, when the information on frequency measurement to be performed in the RRC inactive mode is broadcasted on the system information of the new cell, the terminal receives the new system information and continues to perform the frequency measurement in the RRC inactive mode. However, when the information on frequency measurement to be performed in the RRC inactive mode is not broadcasted on the system information of the new cell, the terminal may stop measuring the frequency to save battery life.

When the terminal in the RRC inactive mode, which moves while performing the cell re-selection, is connected to a network to perform an RAN notification area update (RNAU), the network may configure, for the terminal through the RRC message, new information on the frequency measurement to be performed in the RRC active mode. During the RNAU update procedure, if the frequency measurement information is configured for the terminal when the terminal accesses the network, frequency measurement information appropriate for each terminal may be configured and signaling overhead may be reduced.

The terminal in the RRC inactive mode may perform frequency measurement according to the frequency measurement information configured through the RRC message 1g-25, or the frequency measurement information configured through the system information 1g-35 (operation 1g-40).

The frequency measurement performed by the terminal in the RRC inactive mode may be measurement of, for example, reference signals received power (RSRP), reference signals received quality (RSRQ), or reference signal-signal to interference & noise ratio (RS-SINR) for the frequency indicated to be measured, or a time point at which signal strength exceeds a predetermined threshold value, etc. Further, a time point to start performing the frequency measurement may be one of the following time points. When the terminal reports the frequency measurement, transitions to the RRC-connected mode, receives an RRC message (for example, message 2, message 4, or a frequency measurement request message from the base station), or reports that the base station has a valid frequency measurement result, the frequency measurement may be suspended.

The above-described frequency measurement time point may be one of the following.

1. Start measuring frequency from a time point at which the RRC message 1g-25 is received and frequency measurement configuration information is read
2. Start measuring frequency after the RRC message 1g-25 is received, frequency measurement configuration information is read, and n number of time units (for example, subframes, time slots, or TTIs), which is indicated (or predetermined) by the frequency measurement configuration information, passes
3. Start measuring frequency from a time point at which the system information 1g-25 is received and frequency measurement configuration information is read
4. Start measuring frequency after the system information 1g-25 is received, frequency measurement configuration information is read, and n number of time units (for example, subframes, time slots, or TTIs), which is indicated (or predetermined) by the frequency measurement configuration information, passes
5. Start measuring frequency from a time point at which a preamble is transmitted for network connection (this is because performing continuous frequency measurement when a network connection is not needed may cause an increase in battery consumption)
6. Start measuring frequency from a time point at which a preamble is transmitted for network connection and a random-access response (RAR) is received (this is because performing continuous frequency measurement when a network connection is not needed may cause an increase in battery consumption)
7. Start measuring frequency from a time point at which a preamble is transmitted for network connection, a random-access response (RAR) is received, and an RRC message (message 3, for example, an RRC resume request message) is transmitted (this is because performing continuous frequency measurement when a network connection is not needed may cause an increase in battery consumption)
8. Start measuring frequency from a time point at which a preamble is transmitted for network connection, a random-access response (RAR) is received, an RRC message (message 3, for example, an RRC resume Request message) is transmitted, and an RRC message (message 4, for example, an RRC resume message) is transmitted (this is because performing continuous frequency measurement when a network connection is not needed may cause an increase in battery consumption)

The frequency measurement performed by the terminal in the RRC inactive mode may be different from the frequency measurement performed by the terminal in the RRC-connected mode. That is, the frequency measurement performed in the RRC-connected mode may change to measurement of other frequency when the quality or the strength of the current serving cell decreases lower than a predetermined condition (for example, RSRP, RSRQ, Srxlev, or Squal). This is to move to a better cell and get a better service when a signal from the current service cell is not good. However, the purpose of the frequency measurement performed by the terminal in the RRC inactive mode is to measure and report the frequency of other cells and facilitate configuration of carrier aggregation technology, regardless of the strength of the current serving cell. In addition, the terminal in the RRC-connected mode may perform channel state information-reference signal (CSI-RS)-based frequency measurement with reference to a time reference value of the serving cell. On the other hand, it is difficult for the terminal in the RRC inactive mode to perform the CSI-RS-based frequency measurement since the terminal in the RRC inactive mode has no serving cell, and thus RSRP, RSRQ, and RS-SINR may be measured based on a channel reference signal (CRS). Accordingly, a reference signal for measuring frequency may be different. Further, the frequency measurement performed by the terminal in the RRC inactive mode may be performed for non-serving frequency even when the result of the measurement of serving frequency is greater than SnonIntraSearchP and SnonIntraSearchQ indicated by the system information.

The terminal in the RRC inactive mode performs an RRC connection resumption procedure with the MN when data to be transmitted/received is generated later. The terminal transmits a preamble through message 1 to perform a random-access procedure (operation 1g-45). When allocation of a resource according to the preamble received through message 1 is possible, the MN allocates a corresponding uplink resource to the terminal through message 2 (operation 1g-50). The terminal operation when the terminal transmits an RRC message to the base station based on the received uplink resource information is proposed below (operation 1g-55).

1. When a useFullResumeID field in the system information (SIB1) is signaled, the terminal may select RRCResumeRequest1 for a message to be transmitted to the base station. The terminal may prepare to transmit the RRCResumeRequest1 message including a complete terminal connection resumption identity value (fullI-RNTI value) storing resumeIdentity. Otherwise, the terminal may select RRCResumeRequest for a message to be transmitted to the base station. The terminal may prepare to transmit the RRCResumeRequest message including a truncated terminal connection resumption identity value (shortI-RNTI value) storing shortResumeIdentity.

2. The terminal may select a reason for resuming connection (resumeCause) from information provided by upper-layer devices or AS-layer devices.

3. The terminal may calculate MAC-I and prepare to transmit the message including the calculated MAC-I.

4. The terminal may include, in the selected message, an indicator indicating whether the SN configured in the RRC-connected mode is suitable based on the frequency measurement 1g-40, and may transmit the message.

5. The terminal may restore RRC configuration information and security context information from the stored UE context corresponding to the MN (or MCG), except for the cell group configuration information (cellGroupConfig) corresponding to the MN (or MCG). When the UE context corresponding to the SN (or SCG) is stored in operation 1g-25 or operation 1g-30, the terminal may restore RRC configuration information and security context information from the stored UE context corresponding to the SN (or SCG), except for the cell group configuration information (cellGroupConfig) corresponding to the SN (or SCG).

6. Further, the terminal updates a new KgNB security key or a new KeNB security key corresponding to the MN (or MCG) based on the current KgNB security key or the current KeNB security key, the NextHop (NH) value, and the stored NCC value. When an SCG-counter value (or sk-counter) is received in operation 1g-25 or 1g-35, the terminal updates a new SKgNB security key or a new SKeNB security key corresponding to the SN (or SCG) based on the SCG-counter value (or sk-counter) and the current SKgNB security key or the current SKeNB security key.

7. Further, the terminal induces new security keys (K RRCenc, K RRC_int, K_UPint, and K_UPenc) to be used in the integrity protection and verification procedure and the encryption and decryption procedure by using the newly updated security key corresponding to the MN (or MCG). When there is the newly updated security key corresponding to the SN (or SCG), the terminal induces new security keys (SK_RRCenc, SK_RRC_int, SC UPint, and SK_UPenc) to be used in the integrity protection and verification procedure and the encryption and decryption procedure by using the newly updated SKgNB security key or SKeNB security key.

7. Further, the terminal induces new security keys (K RRCenc, K RRC_int, K_UPint, and K_UPenc) to be used in the integrity protection and verification procedure and the encryption and decryption procedure by using the newly updated security key corresponding to the MN (or MCG). When there is the newly updated security key corresponding to the SN (or SCG), the terminal induces new security keys (SK_RRCenc, SK_RRC_int, SC UPint, and SK_UPenc) to be used in the integrity protection and verification procedure and the encryption and decryption procedure by using the newly updated SKgNB security key or SKeNB security key.

8. Further, the terminal resumes the integrity protection and verification procedure by applying the updated security keys corresponding to the MN (or MCG) and a preconfigured algorithm with respect to all SRBs and DRBs, except for SRB0, corresponding to MCG bearers, and applies the integrity verification and protection to pieces of data to be transmitted or received thereafter. The terminal resumes the integrity protection and verification procedure by applying the updated security keys corresponding to the MN (or MCG) and a preconfigured algorithm with respect to all SRBs and DRBs, except for SRB0, corresponding to the SCG RLC bearer or the split bearer among the MN-terminated bearers, unreleased in operation 1g-25 or operation 1g-30, and applies the integrity verification and protection to pieces of data to be transmitted or received thereafter. The reason to apply the integrity verification and protection is to increase reliability and security on the pieces of data to be transmitted or received later to or from SRB1 or DRBs.

9. The terminal resumes the integrity protection and verification procedure by applying the updated security keys corresponding to the SN (or SCG) and a preconfigured algorithm with respect to all SRBs and DRBs, except for SRB0, corresponding to the SN-terminated bearers unreleased in operation 1g-25 or operation 1g-30, and applies the integrity verification and protection to pieces of data to be transmitted or received thereafter.

10. Further, the terminal resumes the encryption and decryption procedure by applying the updated security keys corresponding to the MN (or MCG) and a preconfigured algorithm with respect to all SRBs and DRBs, except for SRB0, corresponding to MCG bearers, and applies the encryption and decryption to pieces of data to be transmitted or received thereafter. The terminal resumes the encryption and decryption procedure by applying the updated security keys corresponding to the MN (or MCG) and a preconfigured algorithm with respect to all SRBs and DRBs, except for SRB0, corresponding to the SCG RLC bearer or the split bearer among the MN-terminated bearers, unreleased in operation 1g-25 or operation 1g-30, and applies the encryption and decryption to pieces of data to be transmitted or received thereafter. The reason to apply the encryption and decryption is to increase reliability and security on the pieces of data to be transmitted or received later to or from SRB1 or DRBs.

11. The terminal resumes the encryption and decryption procedure by applying the updated security keys corresponding to the SN (or SCG) and a preconfigured algorithm with respect to all SRBs and DRBs, except for SRB0, corresponding to the SN-terminated bearers unreleased in operation 1g-25 or operation 1g-30, and applies the encryption and decryption to pieces of data to be transmitted or received thereafter.

12. Further, the terminal may restore the PDCP state and re-establish PDCP entities for SRB1.

13. The terminal resumes SRB1. This is because an RRCResume message is received through SRB1 as a response to the RRCResumeRequest message or the RRCResumeRequest1 message to be transmitted.

14. The terminal transmits the RRCResumeRequest message or the RRCResumeRequest1 message to the base station according to above-described procedure, and operates timer t319 at the time of transmission.

As a response to the RRCResumeRequest message or the RRCResumeRequest1 message, the MN transmits an RRCResume message to the terminal (operation 1g-60). The terminal operation when the terminal has received the RRCResume message is proposed below (operation 1g-60).

1. The terminal may stop timer t319 operated at the time of transmission of the RRC ResumeRequest message or the RRCResumeRequest1 message to the base station.

2. If the RRCResume message includes the full configuration information (fullConfig) for the MN (or MCG), the terminal may perform the full configuration procedure. Otherwise, when receiving the message, the terminal may restore the PDCP state corresponding to the MN (MCG), reset a COUNT value, and re-establish PDCP-layer devices of all SRB2 and DRBs (MN-terminated RBs) corresponding to the MN (or MCG). Further, the terminal may restore cell group configuration information (cellGroupConfig) of the MN from the stored UE context for the MN. The terminal may indicate the same to the lower-layer devices.

3. If the RRCResume message includes the full configuration information (fullConfig) for the SN (or SCG), the terminal may perform full configuration procedure. Otherwise, according to the above-described procedures in operation 1g-15, operation 1g-20, or operation 1g-55, when receiving the message, the terminal may restore the PDCP state corresponding to the SN (SCG), reset a COUNT value for all DRBs and SRB2. Further, the terminal may restore cell group configuration information (cellGroupConfig) of the SN from the stored UE context for the SN. The terminal may indicate the same to the lower-layer devices.

4. The terminal may release the complete terminal connection resumption identity (FullI-RNTI), the truncated terminal connection resumption identity (ShortI-RNTI), and the stored UE context. In this case, the RAN-notification area information (ran-NotificationAreaInfo) may not be released.

5. When the RRCResume message includes master cell group (masterCellGroup) configuration information, the terminal may perform and apply a cell group configuration procedure according to the configuration information.

6. When the RRCResume message includes secondary cell group (secondaryCellGroup) configuration information, the terminal may perform and apply a cell group configuration procedure according to the configuration information.

7. When the RRCResume message includes bearer configuration information (radioBearerConfig) on the MN (or MCG), the terminal may perform and apply a bearer configuration procedure according to the configuration information.

8. When the RRCResume message includes bearer configuration information (second radioBearerConfig) on the SN (or MCG), the terminal may perform and apply a bearer configuration procedure according to the configuration information.

9. Further, the terminal may perform scheme 1, scheme 2, scheme 3, or scheme 4 below:

A. Scheme 1: The terminal may resume SRB2 and all DRBs (MN-terminated RBs) corresponding to the master cell group. On the other hand, the terminal may suspend or release SRB2 and all DRBs (SN-terminated RBs) corresponding to the secondary cell group. When performing scheme 1, the terminal may resume the MCG by applying MCG configuration information through the RRC connection resumption procedure. Later, the terminal may resume the SCG or release the SCG by applying SCG configuration information through the RRC connection reconfiguration procedure.

B. Scheme 2: The terminal resumes SRB2 and all DRBs (MN-terminated RBs and SN-terminated RBs) corresponding to the master cell group and the secondary cell group. When performing scheme 2, the terminal may resume the MCG and the SCG by applying MCG configuration information and SCG configuration information through the RRC connection resumption procedure.

C. Scheme 3: The terminal may resume all DRBs and SRB2 corresponding to the MCG bearer among the MN-terminated RBs. On the other hand, the terminal may suspend or release all DRBs and SRB2 corresponding to the SCG RLC bearer or split bearer among the MN-terminated RBs. Further, the terminal may suspend or release SRB2 and all DRBs (SN-terminated RBs) corresponding to the secondary cell group. When performing scheme 3, the terminal may resume only the MCG bearer among the MN-terminated RBs through the RRC connection resumption procedure. Later, the terminal may resume the SN-terminated RBs and the SCG RLB bearer or split bearer among the MN-terminated RBs through the RRC connection reconfiguration procedure.

D. Scheme 4: The terminal may resume all DRBs and SRB2 corresponding to the MCG bearer among the MN-terminated RBs. Further, the terminal may resume all DRBs and SRB2 corresponding to the unreleased SCG RLC bearer or split bearer among the MN-terminated RBs, and may suspend or release all DRBs and SRB2 corresponding to the released SCG RCL bearer or split bearer among the MN-terminated RBs. Further, the terminal may suspend or release SRB2 and all DRBs (SN-terminated RBs) corresponding to the secondary cell group. When performing scheme 4, the terminal may resume the MCG bearer among the MN-terminated RBs and the unreleased SCG RLC bearer or split bearer among the MN-terminated RBs through the RRC connection resumption procedure. Later, the terminal may resume the SN-terminated RBs and the released SCG RLC bearer or split bearer among the MN-terminated RBs through the RRC connection reconfiguration procedure.

9. When the RRCResume message includes frequency measurement configuration information (measConfig) on the MN, the terminal may perform frequency measurement according to the configuration information.

10. When the RRCResume message includes frequency measurement configuration information (measConfig) on the SN, the terminal may perform frequency measurement according to the configuration information.

11. The terminal transitions to the RRC-connected mode.

12. The terminal indicates the resumption of the stopped or suspended RRC connection to upper-layer devices.

13. The terminal may suspend the cell re-selection procedure.

14. The terminal transmits an RRC connection resumption complete message (a RRCResumeComplete message) to the base station. The RRCResumeComplete message may include the frequency measurement result obtained by measuring the SCG frequency. The measurement result may be used later to help the MN determine whether to resume the MR-DC to the terminal in the RRC connection reconfiguration procedure (operations 1g-80 and 1g-85).

In addition, the RRCResume message may include an SK-Counter or SCG counter value. The RRCResume message may also include SDAP/PDCP configuration information for all DRBs (RadioBearerConfig, i.e. SDAP/PDCP configurations for all DRBs) of the MN and the SN, and cell group information of the MN for all DRBs (CellGroupConfig, i.e. RLC bearer configurations for all DRBs, MAC-CellGroupConfig, PhysicalCellGroupConfig, and PCell/SCell configuration of the MN). Further, the RRCResume message may include cell group information of SN (CellGroupConfig, i.e. RLC bearer configurations for all DRBs, MAC-CellGroupConfig, PhysicalCellGroupConfig, and PSCell/SCell configuration of the SN).

In operation 1g-60, when the terminal receives only cell group information of the MN, without cell group information of the SN, the terminal may resume all DRBs and SRB2, except for RLC bearers of the SN. In operation 1g-60, when the terminal receives both cell group information of the SN and cell group information of the MN, the terminal may resume all DRBs and SRB2 corresponding to the MN and the SN. Further, a new indicator for indicating to suspend the SN cell group information or the SCG (keep SN cellGroupConfig suspended or keep the SCG suspended) may be defined and included in the RRCResume message. This is to reconfigure or resume new SN cell group information or new SCG configuration information through the RRC connection reconfiguration procedure later, or to reuse or release the stored SN cell group information or SCG configuration information later since the terminal basically releases the SN cell group information or the SCG.

In addition, a new indicator for indicating to release the SN cell group information or the SCG (release SN cell-GroupConfig or release the SCG) may be defined and included in the RRCResume message. This is to release the SN cell group information or the SCG in the RRC connection resumption procedure through the corresponding new indicator so as to reconfigure or resume a new SCG through the RRC connection reconfiguration procedure later since the terminal basically suspends the SN cell group information or the SCG. Further, when new SN cell group information or new SCG configuration information is not included in the RRCResume message, and a separate indicator indicating to release the SN cell group information or the SCG configuration information is not included in the RRCResume message, the terminal may maintain the stored SN cell group information or SCG configuration information. This is to reconfigure and resume new SN cell group information or new SCG configuration information through the RRC connection reconfiguration procedure later, or to reuse or release the stored SN cell group information or SCG configuration information.

In operation 1g-70, the MN may determine whether to apply the MR-DC or the NR-DC to the terminal. For example, when it is determined that a predetermined SN is reusable for the terminal in the RRC-connected mode, the MN may apply the MR-DC or the NR-DC (enable MR-DC or NR-DC if old SN can be reused) to the terminal. When it is determined that the predetermined SN is changed and is not reusable, the MN may not apply the MR-DC or the NR-DC to the terminal (disenable MR-DC or NR-DC if old SN cannot be reused). In operation 1g-70, when it is determined that the MR-DC or the NR-DC is to be applied to the terminal, the MN transmits the SN modification request message, which is described in operation 1g-15, to the terminal. The SN having received the SN modification request message may transmit the SN modification request acknowledgment message, which is described in operation 1g-20, to the MN (operation 1g-75).

For example, the SN modification request acknowledge message including SN cell group information (CellGroupConfig, i.e. RLC bearer configurations for all DRBs, MAC-CellGroupConfig, PhysicalCellGroupConfig, and PSCell/SCell configuration of the SN) may be transmitted to the MN (operation 1g-75). The MN may transmit, to the terminal, the RRCReconfiguration message including the received SN modification request acknowledge message (operation 1g-80). For example, the MN may transmit, to the terminal, the RRCReconfiguration message including the cell group information and the SDAP/PDCP configuration information of the SN (operation 1g-80). Further, the MN may transmit, to the terminal, the RRCReconfiguration message including only a part of configuration within the SCG configuration to apply delta configuration (operation 1g-80). When neither new SCG configuration information nor a separate indicator indicating to release the SCG configuration information is included in the RRCReconfiguration message, the terminal may maintain the existing stored and configured SCG configuration information. This is to reconfigure or resume new SN cell group information or new SCG configuration information through the RRC connection reconfiguration procedure later, or to reuse or release the stored SN cell group information or SCG configuration information. Further, a new indicator or IE for allowing data transmission or reception by resuming only a bearer for a PDU session/QoS flow, which is mapped to a bearer and activated, and suspension of a bearer for a PDU session/QoS flow, which is mapped to a bearer and inactivated, may be defined and included in the RRCReconfiguration message.

The terminal transmits the RRCReconfigurationComplete message to the MN, as a response to the RRCReconfiguration message (operation 1g-85). In operation 1g-70, when it is determined that the MR-DC or the NR-DC may not be applied to the terminal, the MN transmits, to the SN, the SN modification request message including information or an indicator for indicating to release the cell group information of the SN. The SN having received the SN modification request message releases the cell group information and then transmits the same to the MN (operation 1g-75). The MN transmits, to the terminal, the RRCReconfiguration message including information or an indicator for indicating to release the cell group information and the SDAP/PDCP configuration information of the SN (operation 1g-80). The terminal transmits the RRCReconfigurationComplete message to the MN, as a response to the RRCReconfiguration message (operation 1g-85). The RRC connection reconfiguration procedure (operations 1g-80 and 1g-85) may be performed several times.

Figure 1H:
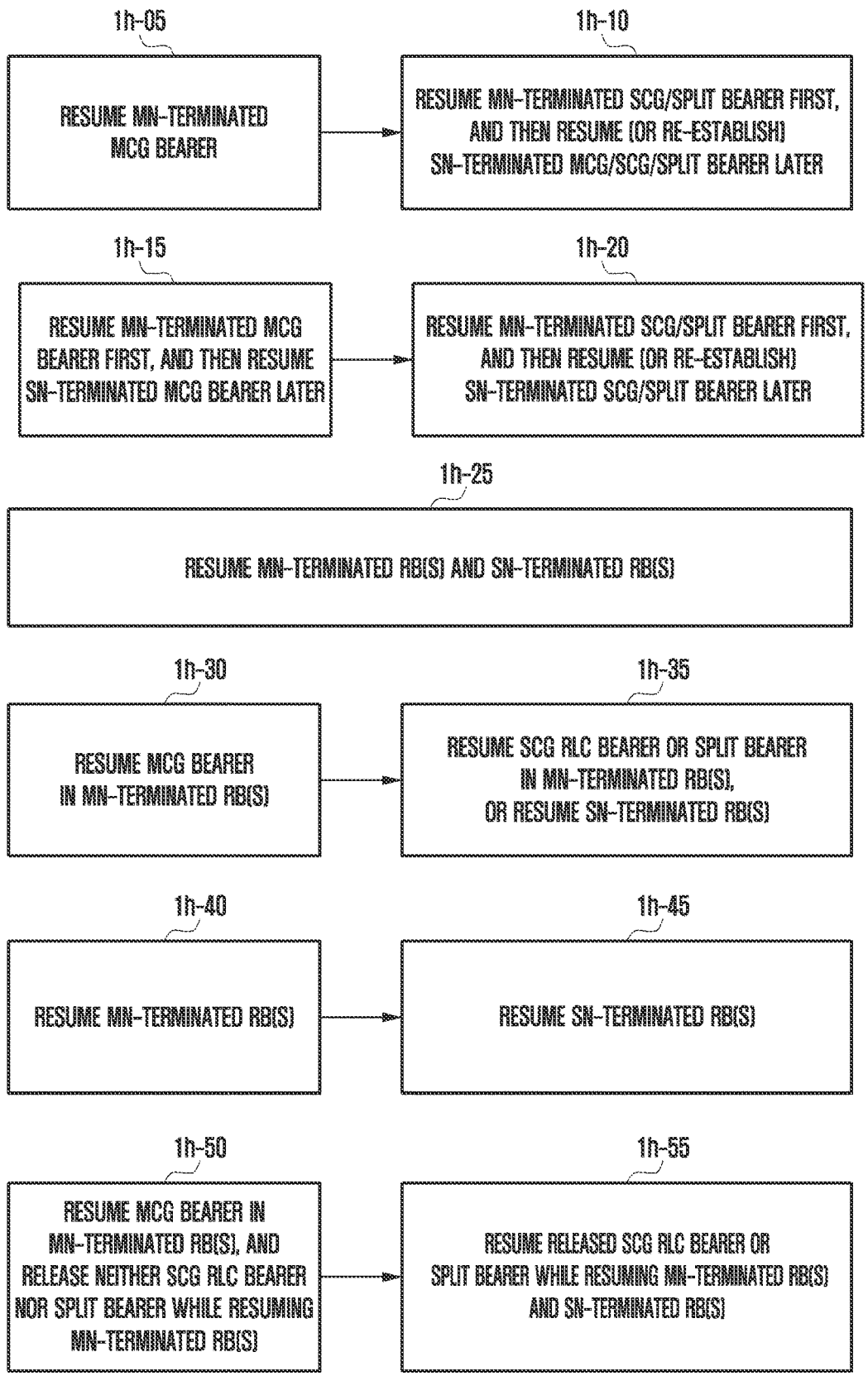
FIG. 1H illustrates a radio bearer processing method using a phased resumption method or a full resumption method when the state of an MR-DC or NR-DC terminal transitions from an RRC inactive mode to an RRC-connected mode in the (1-1)th embodiment of the disclosure.

FIG. 1H illustrates a radio bearer processing method using a phased resumption method or a full resumption method when the state of an MR-DC or NR-DC terminal transitions from an RRC inactive mode to an RRC-connected mode in the (1-1)th embodiment described above in the disclosure. When the MR-DC or NR-DC terminal in the RRC inactive mode receives an RRCResume message from the MN, the terminal may resume an MN-terminated MCG bearer (operation 1h-05) after transition to the RRC-connected mode and transmit or receive data in the corresponding bearer. In this case, an MN-terminated SCG/split bearer of the terminal is in a suspended state. When the MR-DC or NR-DC terminal having transitioned from the RRC inactive mode to the RRC-connected mode after receiving the RRCResume message receives an RRCReconfiguration message from the MN, the terminal may resume the MN-terminated SCG/split bearer and then resume or reconfigure the SN-terminated MCG/SCG/split bearer to transmit or receive data (operation 1h-10). In this case, the terminal may resume only a bearer for a PDU session/QoS flow, which is mapped to a bearer and activated, to transmit or receive data, and may suspend a bearer for a PDU session/QoS flow, which is mapped to a bearer and inactivated.

In addition, when the MR-DC or NR-DC terminal in the RRC inactive mode receives the RRCResume message from the MN, the terminal may resume an MN-terminated MCG bearer after transition to the RRC-connected mode, and then resume the SN-terminated MCG bearer (operation 1h-15), so as to transmit or receive data in the corresponding bearers. In this case, the MN-terminated SCG/split bearer of the terminal is in a suspended state. The MR-DC terminal having transitioned from the RRC inactive mode to the RRC-connected mode after receiving the RRCResume message may resume the MN-terminated SCG/split bearer when receiving the RRCReconfiguration message from the MN, and then may resume or reconfigure resumption the SN-terminated SCG/split bearer (operation 1h-15) to transmit or receive data. In this case, the terminal may resume only a bearer for a PDU session/QoS flow, which is mapped to a bearer and activated, to transmit or receive data, and may suspend a bearer for a PDU session/QoS flow, which is mapped to a bearer and inactivated.

Further, the MR-DC or NR-DC terminal in the RRC inactive mode receives the RRCResume message from the MN, the terminal may resume both MN-terminated RB(s) and SN-terminated RB(s) after transition to the RRC-connected mode (operation 1h-25), and then may transmit or receive data in the corresponding RB(s). In this case, the terminal may resume only an RB for a PDU session/QoS flow, which is mapped to an RB and activated, so as to transmit or receive data, and may suspend an RB for an PDU session/QoS flow, which is mapped to an RB and inactivated.

Further, when the MR-DC or NR-DC terminal in the RRC inactive mode receives the RRCResume message from the MN, the terminal may resume an MCG bearer among MN-terminated RB(s) after transition to the RRC-connected mode (operation 1h-30), and may transmit or receive data in the corresponding bearers. In this case, the SCG RLC bearer or the split bearer among the MN-terminated RB(s) of the terminal is in a suspended state. When the MR-DC terminal having transitioned from the RRC inactive mode to the RRC-connected mode after receiving the RRCResume message receives the RRCReconfiguration message from the MN, the terminal may resume the SN-terminated RBs or the SCG RLB bearer or the split bearer among the MN-terminated RB(s) (operation 1h-35), and then transmit or receive data. In this case, the terminal may resume only an RB or a bearer for a PDU session/QoS flow, which is mapped to an RB or a bearer and activated, so as to transmit or receive data, and may suspend an RB or a bearer for a PDU session/QoS flow, which is mapped to an RB and inactivated.

Further, when the MR-DC or NR-DC terminal in the RRC inactive mode receives the RRCResume message from the MN, the terminal may resume the MN-terminated RB(s) after transition to the RRC-connected mode (operation 1h-40), and may transmit or receive data in the corresponding RBs. When the MR-DC or NR-DC terminal having transitioned from the RRC inactive mode to the RRC-connected mode after receiving the RRCResume message receives the RRCReconfiguration message from the MN, the terminal may resume the SN-terminated RB(s) (operation 1h-35) to transmit or receive data. In this case, the terminal may resume only an RB or a bearer for a PDU session/QoS flow, which is mapped to an RB and activated, so as to transmit or receive data, and may suspend an RB for a PDU session/QoS flow, which is mapped to an RB and inactivated.

Further, when the MR-DC or NR-DC terminal in the RRC inactive mode receives the RRCResume message from the MN, the terminal may resume an MCG bearer and an unreleased SCG RLC bearer or split bearer among MN-terminated RBs after transition to the RRC-connected mode (operation 1h-50), and may transmit or receive data in the corresponding RBs. When the MR-DC or NR-DC terminal having transitioned from the RRC inactive mode to the RRC-connected mode after receiving the RRCResume message receives the RRCReconfiguration message from the MN, the terminal may resume the SN-terminated RB(s) and a SCG RLC bearer or a split bearer among the MN-terminated RBs, which is released in the RRC connection resumption procedure (operation 1h-55), so as to transmit or receive data. In this case, the terminal may resume only an RB or a bearer for a PDU session QoS flow, which is mapped to an RB or a bearer and activated, so as to transmit or receive data, and may suspend an RB or a bearer for a PDU session/QoS flow, which is mapped to an RB and inactivated.

Figure 1I:
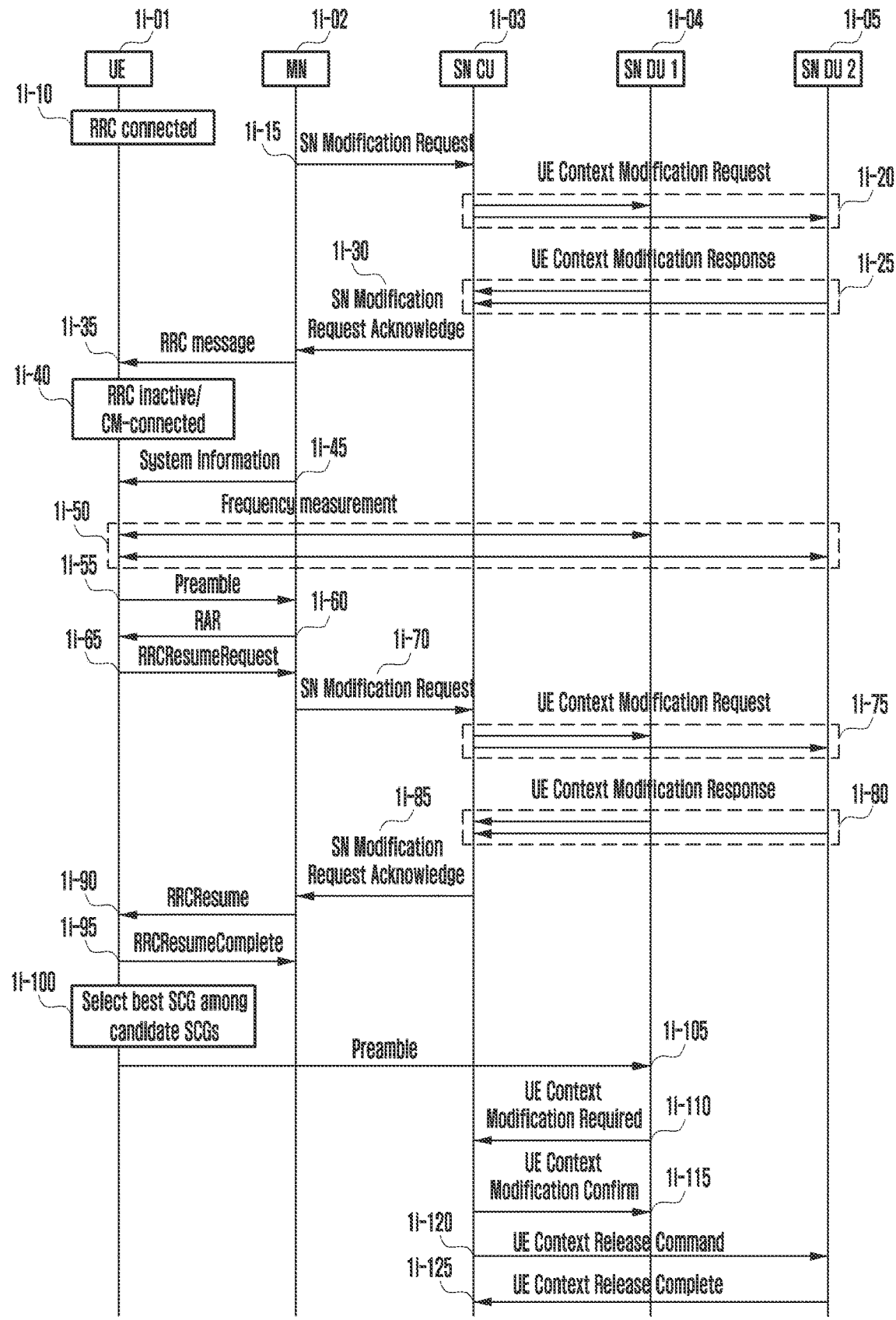
FIG. 1I illustrates a (1-2)th embodiment describing a procedure of suspending and resuming RRC connection by applying MR-DC or NR-DC in an RRC-connected mode or an RRC inactive mode of an MR-DC terminal in the disclosure.

FIG. 1I illustrates a (1-2)th embodiment describing a procedure of suspending and resuming RRC connection by applying MR-DC or NR-DC in an RRC-connected mode or an RRC inactive mode of an MR-DC terminal or an NR-DC terminal in the disclosure.

In FIG. 1G, in the case in which there is no data transmission or reception to or from an MR-DC or NR-DC terminal 1i-10 which transmits or receives data in the RRC-connected mode, for a predetermined time or for a predetermined reason, when an MN 1*i*-02 attempts to change SCG configuration information or SN-terminated MCG bearers in the SN configured for the terminal (configuration changes of the SCG within the same SN, e.g. the addition, modification, or release of SCG bearer(s) and the SCG RLC bearer of split bearer(s), as well as configuration changes for SN terminated MCG bearers), the MN 1*i*-02 may initiate an SN modification procedure towards an SN CU 1*i*-03. In the above description, the SN may include both the SN CU 1*i*-03 and SN DUs 1*i*-04 and 1*i*-05. In order to initiate the SN modification procedure, the MN 1*i*-02 may transmit an SN modification request message to the SN CU 1*i*-03 (operation 1*i*-15). A new indicator or a new information element (IE, for example, a lower layer presence IE) indicating whether the SN is to maintain MR-DC or NR-DC configuration information configured for the terminal 1*i*-10 may be defined and included in the SN modification request message 1*i*-15. For example, the new indicator or the new IE included in the message may include information indicating to switch the state of the terminal from the RRC-connected mode to the RRC inactive mode, information to request terminal activity status, SN SDAP/PDCP configuration information, or the like.

The SN CU 1*i*-03 having received the SN modification request message may transmit a UE context modification request message to the multiple SN DUs 1*i*-04 and 1*i*-05 (operation 1*i*-20), and then may receive a UE context modification response message from the multiple SN DUs 1*i*-04 and 1*i*-05 (operation 1*i*-25). The SN CU 1*i*-03 may transmit an SN modification request acknowledge message to the MN 1*i*-02 (operation 1*i*-30). A new indicator or a new IE indicating whether the SN is to maintain MR-DC or NR-DC configuration information configured for the terminal 1*i*-10 may be defined and included in the SN modification request acknowledge message 1*i*-30. For example, the new indicator or the new IE included in the message may include information indicating the release of cell group information (CellGroupConfig, i.e. RLC bearer configurations for all DRBs, MAC-CellGroupConfig, and Physical-CellGroupConfig, PS Cell/SCell configuration of SN DUs/SCGs), information indicating terminal data activity of all SN-terminated bearers, information indicating terminal data activity of an individual SN-terminated bearer, or SN CU SDAP/PDCP configuration information (RadioBearerConfig, i.e. SDAP/PDCP configurations for all DRBs).

In operation 1*i*-30, for the MR-DC terminal, the SN CU 1*i*-03 maintains N2 connection and SDAP/PDCP configuration information, and the SN DUs 1*i*-04 and 1*i*-05 release cell group information. Further, in operation 1*i*-30, for the MR-DC terminal, the SN CU 1*i*-03 may maintain N2 connection, and the SN DUs 1*i*-04 and 1*i*-05 may release full configuration of the SN DUs. Further, in operation 1*i*-30, for the MR-DC terminal, the SN CU 1*i*-03 may maintain N2 connection, and the SN DUs 1*i*-04 and 1*i*-05 may maintain full configuration.

In operation 1*i*-35, the MN 1*i*-02 may transmit an RRC message (for example, RRC Release with SuspendConfig) to the terminal 1*i*-10 (operation 1*i*-35) to switch the state of the terminal to an RRC inactive mode 1*i*-40.

That is, when the state of the terminal in the RRC-connected mode transitions to the RRC inactive mode in the network, mode switching may be indicated by transmitting the RRC release message 1*i*-35 including suspension configuration information (suspendConfig). The RRC message 1*i*-35 may include information relating to a frequency which is to be measured in the RRC inactive mode, a priority of the frequency, a timer value, and the like. Configuring the frequency measurement configuration information to the terminal through the RRC message may be more efficient than broadcasting the frequency measurement configuration information on system information in a cell by the network. This is because the network may accurately identify the UE capability of the RRC-connected mode terminal and thus may configure more appropriate frequency measurement configuration information.

The RRC message 1*i*-35 may include the following information.

2. Information relating to a frequency to be measured or information relating to a cell-specific frequency belonging to an individual base station (MR-DC may support only multiple cells or frequencies belonging to two base stations, and thus the message may be configured to be information relating to cells or frequencies belonging to the individual base station), frequency band information, a frequency identity (a cell identity), measurement value to be measured (RSRP, RSRQ, or RS-SINR), a measurement object identity, a measurement identity (measurement ID), or a report configuration identity (report configuration ID)

3. The RRC message may include information on an area in which frequency measurement is to be performed in the RRC inactive mode (for example, default area information which is used when a tracking area (TA), a list of cells, an RAN notification area (RNA), or area information does not exist). Further, the frequency or the area in which frequency measurement is to be performed by the terminal may be indicated by a physical cell identity (physical cell ID) or a base station identity.

4. A physical cell identity (physical cell ID) or a base station identity may be indicated to distinguish, when the terminal measures the frequency, different cells or base stations with respect to the same frequency band. That is, the frequency measurement may be performed only for the cell or the frequency corresponding to the configured physical cell identity or the base station identity.

5. An indicator for indicating whether or not to perform frequency measurement in the RRC inactive mode, or whether to perform frequency measurement according to frequency configuration information configured through an RRC message, or to perform frequency measurement according to frequency configuration information received through system information 6. The RRC message may include information including a frequency value to be measured and a way measuring the frequency value when frequency measurement is performed in the RRC inactive mode. For example, configuration information indicating to measure one or more RSRP, RSRQ, and RS-SINR may be included.

7. The maximum number of measurable carriers when frequency measurement is performed in the RRC inactive mode 8. In order to save battery life of the terminal, a time may be configured so that frequency measurement is performed for a predetermined time only. For example, a timer value may be configured so that the frequency measurement is performed only when the timer operates. When the timer expires, the frequency measurement is suspended, whereby the battery life of the terminal can be saved. That is, the RRC message may include a frequency measurement time when the frequency measurement is performed in the RRC inactive mode.

9. A first time, a second time, or the number of times, a threshold, or a period: The following frequency measurement scheme may be indicated by configurating these values. In addition, a time stamp may be reported to indicate how long ago or how recently the measurement was performed when the frequency measurement is performed according to these values and the measurement reporting is performed.

A. In the case where a state, in which frequency signal strength (for example, RSRP, RSRQ, or RS-SINR) has a value greater than a given threshold, is maintained for a given time (the threshold and the time may be configured for the terminal through the RRC message, or may be broadcasted on system information), when a period is given, performing measurement during each period B. In the case where frequency signal strength (for example, RSRP, RSRQ, or RS-SINR) having a value greater than a given threshold is measured a given number of times or more (the threshold and the number of times may be configured for a terminal through the RRC message, or may be broadcasted on system information), when a period is given, performing measurement during each period C. In the case where frequency signal strength (for example, RSRP, RSRQ, or RS-SINR) having a value greater than a given threshold is measured a given number of times or more within a given time (the threshold, the time, and the number of times may be configured for a terminal through the RRC message, or may be broadcasted on system information), when a period is given, performing measurement during each period D. In the case where a state, in which frequency signal strength (for example, RSRP, RSRQ, or RS-RINR) has a value greater than a given threshold, is maintained for a given second time within a given first time (for example, when a timer is operated) (the threshold, the first time, and the second time may be configured for a terminal through the RRC message, or may be broadcasted on system information), when a period is given, performing measurement during each period E. In the case where frequency signal strength (for example, RSRP, RSRQ, or RS-RINR) having a value greater than a given threshold is measured a given number of times within a given first time (for example, when a timer is operated) (the threshold, the first time, and the number of times may be configured for a terminal through the RRC message, or may be broadcasted on system information), during a period is given, performing measurement for each period Further, the base station may indicate to the terminal: whether or not to perform frequency measurement by the terminal in the RRC inactive mode by defining a new indicator in the RRC message 1*i*-35; whether to receive frequency measurement configuration information according to system information and perform frequency measurement; or whether to perform frequency measurement based on the frequency measurement configuration information configured through the RRC message.

Further, a Resume ID may be allocated to the RRC message 1*g*-35 while RRC connection of the terminal is released and then a control message for indicating, to the terminal, to store UE context and release the RRC connection is transmitted. In this case, according to the allocation of the Resume ID, the terminal may identify that the UE context is to be stored. Alternatively, the base station may transmit, through the message, a separate context maintenance indication for indicating that the terminal is operated in the RRC inactive mode and the UE context is to be stored.

In the RRC message 1*i*-35, security information to update a security configuration required later when the terminal performs an RRC resumption procedure may be included. For example, NextHopChainingCount (NCC) may be preassigned so as to calculate and configure a new security key (KeNB* or KgNB* in the MN) by using NCC, or an SK-Counter or an SCG Counter may be preassigned so as to calculate or configure a new security key (SKeNG* or SKgNB* in the SN) by using the SK-Counter or the SCG Counter. In addition, if neither SK-Counter nor SCG Counter is included in the RRC message, an indicator indicating implicit calculation or configuration of a new security key (SKeNG* or SKgNB* in the SN) may be included in the RRC message. Later, the terminal may encrypt, into the security key, information on the result of frequency measured in the RRC inactive mode, and may report the security key to the base station. As described above, by preassigning the security key, the security can be enhanced and signaling overhead, which may be caused by the security configuration, can be reduced when the terminal assesses again. Further, by using the preconfigured security key, when message 3 (an RRC message, for example, an RRC resume request message) is transmitted, an encrypted RRC message may be transmitted, and when encrypted message 4 (an RRC message, for example, RRC resume message) is received, message 4 may be decrypted.

In the RRC message 1*i*-35, a common configuration parameter may be introduced and used in order for the terminal to simultaneously apply configuration for the MCG or the multiple SCGs, an individual configuration parameter may be introduced and used for SpCell (for example, a primary cell of the MCG (PCell)) in the MCG and one or more SCells, or an individual configuration parameter may be introduced and used for SpCell (for example, a primary cell of the SCG (PSCell) in the SCG and one or more SCells. When the common configuration parameter and the individual configuration parameter are configured, the individual configuration parameter may precede the common configuration parameter.

The terminal having received the RRC message 1*i*-35 in the above operation performs state transition to the RRC inactive mode according to indication from the RRC message (operation 1*i*-40). In this case, the terminal stores SDAP/PDCP configuration information for all DRBs (RadioBearerConfig, i.e. SDAP/PDCP configurations for all DRBs) of the MN and the SN CU, and stores cell group information of the MN for all DRBs (CellGroupConfig, i.e. RLC bearer configurations for all DRBs, MAC-CellGroupConfig, PhysicalCellGroupConfig, and PCell/SCell configuration of the MN). Further, the terminal may release or suspend cell group information of SN DUs (CellGroupConfig, i.e. RLC bearer configurations for all DRBs, MAC-CellGroupConfig, PhysicalCellGroupConfig, and PSCell/SCell configuration of SN DUs) according to the indication from the RRC message. When the terminal suspends the cell group information of the SN DUs, the terminal releases the cell group information of the SN DUs at the first time of performing the RRC connection resumption procedure with the MN (does not release RLC bearer of SN DUs but keeps them suspended upon resumption). The terminal suspends all DRBs and all SRBs described above, except for SRB0. The terminal in the RRC inactive mode performs cell re-selection while moving, and searches for a suitable cell. When a cell to camp on is found, the terminal reads system information 1*i*-45 of the cell.

The terminal in the RRC inactive mode may camp on one cell and read, from the system information (for example, SIB5 in the LTE system, and SIB1, SIB2, SIB3, SIB4, or SIB5 in the next-generation mobile communication system) of the cell, information relating to a frequency which is to be measured in the RRC inactive mode, a priority of the frequency, timer information, and the like. That is, all or some of the pieces of information included in the RRC message 1i-35 described above may be broadcasted on system information.

When the information on frequency measurement to be performed in the RRC inactive mode, configured in the RRC message 1i-35, satisfies a first condition, the corresponding information precedes the system information 1i-45.

The first condition may correspond to one or more of the following conditions.

1. The case in which a timer value configured through the RRC message has not expired
2. The case in which the terminal has not deviated from an area or a list of cells valid for performing frequency measurement configured through the RRC message
3. The case in which the terminal has not deviated from a cell that was serviced in the RRC-connected mode However, when a second condition is satisfied, the terminal may determine that the information on frequency measurement to be performed in the RRC inactive mode, configured in the RRC message, is no longer valid, and may preferentially apply the system information 1i-45.

The second condition may correspond to one or more of the following conditions.

4. The case in which a timer value configured through the RRC message has expired
5. The case in which the terminal has deviated from an area or a list of cells valid for performing frequency measurement configured through the RRC message
6. The case in which the terminal has deviated from a cell that was serviced in the RRC-connected mode In the case in which the terminal having received, through the system information, the information on frequency measurement to be performed in the RRC inactive mode and having performed the frequency measurement moves and accesses a new cell through cell re-selection, when the information on frequency measurement to be performed in the RRC inactive mode is broadcasted on the system information of the new cell, the terminal receives the new system information and continues to perform the frequency measurement in the RRC inactive mode. However, when the information on frequency measurement to be performed in the RRC inactive mode is not broadcasted on the system information of the new cell, the terminal may stop measuring the frequency to save battery life.

When the terminal in the RRC inactive mode which moves while performing the cell re-selection is connected to a network to perform an RAN notification area update (RNAU), the network may configure, for the terminal through the RRC message, new information on the frequency measurement to be performed in the RRC active mode. During the RNAU update procedure, if the frequency measurement information is configured for the terminal when the terminal accesses the network, frequency measurement information appropriate for each terminal may be configured and signaling overhead may be reduced.

The terminal in the RRC inactive mode may perform frequency measurement according to the frequency measurement information configured through the RRC message 1i-45, or the frequency measurement information configured through the system information 1i-35 (operation 1i-50).

The frequency measurement performed by the terminal in the RRC inactive mode may be measurement of, for example, reference signals received power (RSRP), reference signals received quality (RSRQ), or reference signal-signal to interference & noise ratio (RS-SINR) for the frequency indicated to be measured, or a time point at which signal strength exceeds a predetermined threshold value, etc. Further, a time point to start performing the frequency measurement may be one of the following time points. When the terminal reports the frequency measurement, transitions to the RRC-connected mode, receives an RRC message (for example, message 2, message 4, or a frequency measurement request message from the base station), or reports that the base station has a valid frequency measurement result, the frequency measurement may be suspended.

9. Start measuring frequency from a time point at which the RRC message 1i-35 is received and frequency measurement configuration information is read
10. Start measuring frequency after the RRC message 1i-35 is received, frequency measurement configuration information is read, and n number of time units (for example, subframes, time slots, or TTIs), which is indicated (or predetermined) by the frequency measurement configuration information, passes
11. Start measuring frequency from a time point at which the system information 1i-45 is received and frequency measurement configuration information is read
12. Start measuring frequency after the system information 1i-45 is received, frequency measurement configuration information is read, and n number of time units (for example, subframes, time slots, or TTIs), which is indicated (or predetermined) by the frequency measurement configuration information, passes
13. Start measuring frequency from a time point at which a preamble is transmitted for network connection (this is because performing continuous frequency measurement when a network connection is not needed may cause an increase in battery consumption)
14. Start measuring frequency from a time point at which a preamble is transmitted for network connection and a random-access response (RAR) is received (this is because performing continuous frequency measurement when a network connection is not needed may cause an increase in battery consumption)
15. Start measuring frequency from a time point at which a preamble is transmitted for network connection, a random-access response (RAR) is received, and an RRC message (message 3, for example, an RRC resume request message) is transmitted (this is because performing continuous frequency measurement when a network connection is not needed may cause an increase in battery consumption)
16. Start measuring frequency from a time point at which a preamble is transmitted for network connection, a random-access response (RAR) is received, an RRC message (message 3, for example, an RRC resume Request message) is transmitted, and an RRC message (message 4, for example, an RRC resume message) is transmitted (this is because performing continuous frequency measurement when a network connection is not needed may cause an increase in battery consumption)

The frequency measurement performed by the terminal in the RRC inactive mode may be different from the frequency measurement performed by the terminal in the RRC-connected mode. That is, the frequency measurement performed in the RRC-connected mode may change to measurement of other frequency when the quality or the strength of the current serving cell decreases lower than a predetermined condition (for example, RSRP, RSRQ, Srxlev, or Squal). This is to move to a better cell and get a better service when a signal from the current service cell is not good. However, the purpose of the frequency measurement performed by the terminal in the RRC inactive mode is to measure and report the frequency of other cells and facilitate configuration of carrier aggregation technology, regardless of the strength of the current serving cell. In addition, the terminal in the RRC-connected mode may perform channel state information-reference signal (CSI-RS)-based frequency measurement with reference to a time reference value of the serving cell. On the other hand, it is difficult for the terminal in the RRC inactive mode to perform the CSI-RS-based frequency measurement since the terminal in the RRC inactive mode has no serving cell, and thus RSRP, RSRQ, and RS-SINR may be measured based on a channel reference signal (CRS). Accordingly, a reference signal for measuring frequency may be different. Further, the frequency measurement performed by the terminal in the RRC inactive mode may be performed for non-serving frequency even when the result of the measurement of serving frequency is greater than SnonlntraSearchP and SnonIntraSearchQ indicated by the system information.

The terminal in the RRC inactive mode performs an RRC connection resumption procedure with the MN when data to be transmitted/received is generated later. The terminal transmits a preamble through message 1 to perform a random-access procedure (operation 1$i$-55). When allocation of a resource according to the preamble received through message 1 is possible, the MN allocates a corresponding uplink resource to the terminal through message 2 (operation 1$i$-60). In operation 1$i$-65, based on the received uplink resource information, the terminal transmits an RRC resume request message including a terminal identity (Resume ID) and resumeMAC-I information based on the UE context and the reason (resumeCause) for resuming RRC connection (operation 1$i$-65). In operation 1$i$-65, the terminal resumes SRB1. The MN having received the RRCResumeRequest message transmits an SN modification request message to the SN CU (operation 1$i$-70).

The SN CU selects candidate SN DUs among the multiple SN DUs, transmits a UE context modification request message (operation 1$i$-75), and receives a UE context modification response message (operation 1$i$-80). The UE context modification response message may include cell group information of the candidate SN DUs (CellGroupConfig, i.e. RLC bearer configurations for all DRBs, MAC-CellGroupConfig, PhysicalCellGroupConfig, and PSCell/SCell configuration of candidate SN DUs/SCGs). The MN transmits an RRCResume message to the terminal in response to the RRC resume request message (operation 1$i$-90). The RRCResume message may include a SK-Counter or SCG Counter value. Further, the RRCResume message may include SDAP/PDCP configuration information for all DRBs (RadioBearerConfig, i.e. SDAP/PDCP configurations for all DRBs) of the MN and the SN CU, cell group information of the MN for all DRBs (CellGroupConfig, i.e. RLC bearer configurations for all DRBs, MAC-CellGroupConfig, PhysicalCellGroupConfig, and PCell/SCell configuration of MN), and cell group information of the SN DUs (CellGroupConfig, i.e. RLC bearer configurations for all DRBs, MAC-CellGroupConfig, PhysicalCellGroupConfig, and PSCell/SCell configuration of SN DUs/SCGs). The RRC-connected terminal transmits an RRCResumeComplete message to the MN (operation 1$i$-95). In operation 1$i$-90 or operation 1$i$-95, data transmission or reception may be performed by resuming or reconfiguring all MCG/SCG/split bearers of the MN and the SN DUs.

The terminal selects the best SCG from candidate SCGs in operation 1$h$-100, and transmits a preamble through message 1 to perform a random-access procedure with the corresponding SN DU (for example SN DU1) (operation 1$h$-105). The SN DU having received the message may transmit a UE context modification required message to the SN CU 1$i$-03, wherein a new indicator indicating reception of message 1 is defined and included in the UE context modification required message (operation 1$h$-110). The SN CU 1$i$-03 may transmit a UE context release command message to the rest of SN DUs (for example, SN DU 2), the message including an indicator indicating the release of the cell group information (operation 1$h$-120).

The SN modification procedure, the RRC message used to switch the state of the MR-DC or NR-DC terminal from the RRC connected mode to the RRC inactive mode, and the RRC connection resumption procedure may be used to perform the (1-2)th embodiment by applying the (1-1)th embodiment.

Figure 1J:
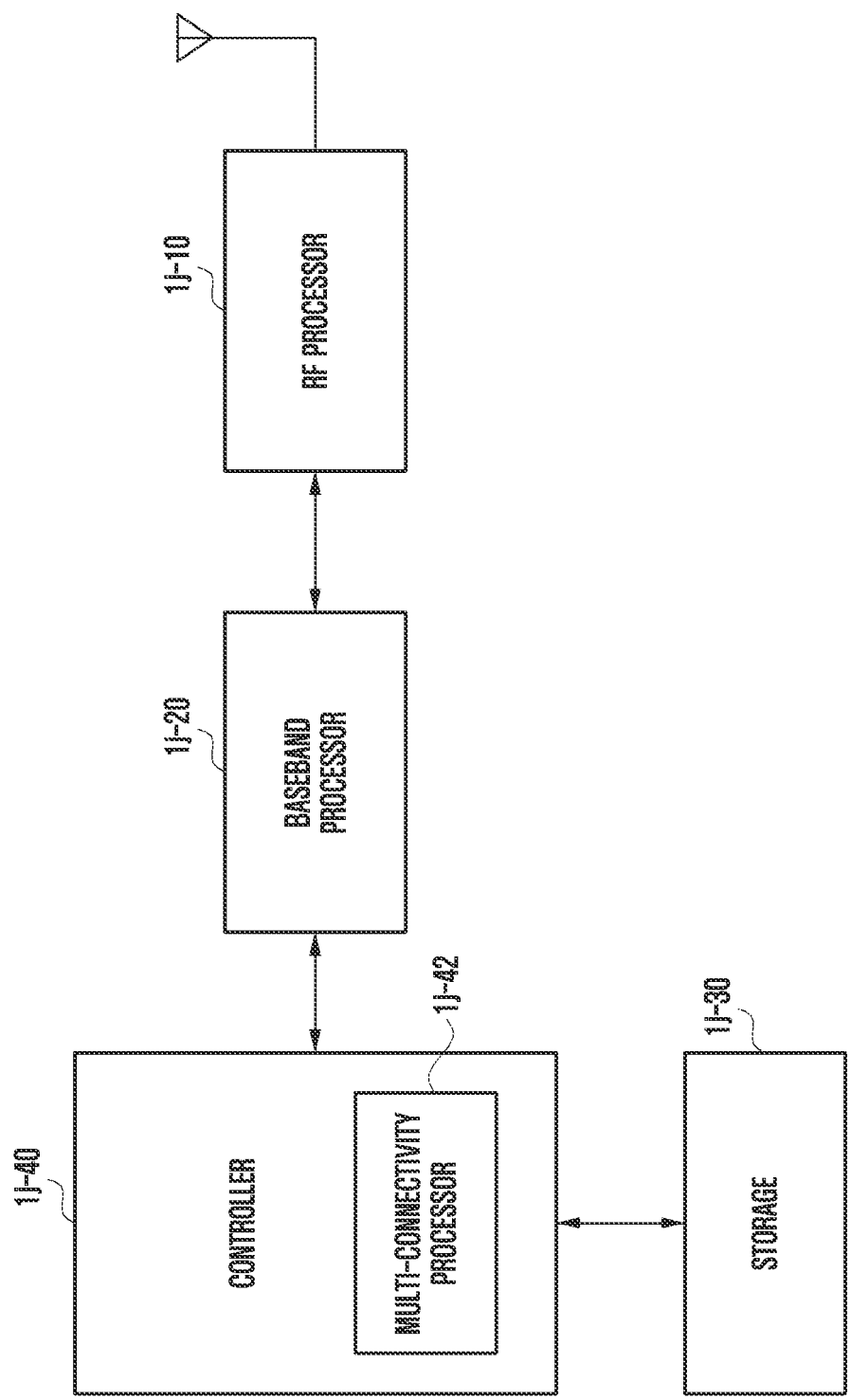
FIG. 1J illustrates the structure of a terminal, to which an embodiment of the disclosure is applicable.

FIG. 1J illustrates the structure of a terminal, to which an embodiment of the disclosure is applicable.

Referring to FIG. 1J, the terminal includes a radio frequency (RF) processor 1$j$-10, a baseband processor 1$j$-20, a storage 1$j$-30, and a controller 1$j$-40.

The RF processor 1$j$-10 performs a function for transmitting or receiving a signal through a radio channel, such as signal band conversion, amplification, and the like. That is, the RF processor 1$j$-10 up-converts a baseband signal, provided from the baseband processor 1$j$-20, to an RF-band signal and then transmits the RF-band signal through an antenna, and down-converts an RF-band signal received through an antenna into a baseband signal. For example, the RF processor 1$j$-10 may include a transmission filter, a reception filter, an amplifier, a mixer, an oscillator, a digital-to-analog converter (DAC), an analog-to-digital converter (ADC), and the like. Although only a single antenna is illustrated in FIG. 1J, the terminal may include multiple antennas. In addition, the RF processor 1$j$-10 may include multiple RF chains. Furthermore, the RF processor 1$j$-10 may perform beamforming For beamforming, the RF processor 1$j$-10 may adjust the phases and amplitudes of signals transmitted or received through multiple antennas or antenna elements. The RF processor 1$j$-10 may also perform MIMO and may receive data of multiple layers of data during the MIMO operation. The RF processor 1$j$-10 may perform reception beam sweeping by appropriately configuring the multiple antennas or antenna elements under the control of the controller, or may adjust the orientation and width of a reception beam such that the reception beam is coordinated with a transmission beam.

The baseband processor 1$j$-20 performs a function of conversion between a baseband signal and a bitstream according to the physical layer specifications of a system. For example, during data transmission, the baseband processor 1$j$-20 generates complex symbols by encoding and modulating a transmission bitstream. In addition, during data reception, the baseband processor 1$j$-20 reconstructs a received bitstream by demodulating and decoding a baseband signal provided from the RF processor 1$j$-10. For example, according to an orthogonal frequency-division multiplexing (OFDM) scheme, during data transmission, the baseband processor 1$j$-20 generates complex symbols by encoding and modulating a transmission bitstream, maps the complex symbols to subcarriers, and then configures OFDM symbols by performing inverse fast Fourier transformation (IFFT) operation and cyclic prefix (CP) insertion. Further, during data reception, the baseband processor 1$j$-20 segments a baseband signal, provided from the RF processor 1$j$-10, into units of OFDM symbols, reconstructs signals mapped to subcarriers by performing a fast Fourier transformation (FFT) operation, and then reconstructs a received bitstream by demodulating and decoding the signals.

The baseband processor 1*j*-20 and the RF processor 1*j*-10 transmit and receive signals as described above. Accordingly, each of the baseband processor 1*j*-20 and the RF processor 1*j*-10 may also be referred to as a transmitter, a receiver, a transceiver, or a communication unit. Furthermore, at least one of the baseband processor 1*j*-20 and the RF processor 1*j*-10 may include multiple communication modules to support multiple different radio-access technologies. In addition, at least one of the baseband processor 1*j*-20 and the RF processor 1*j*-10 may include multiple communication modules to process signals of different frequency bands. For example, the different radio-access technologies may include an LTE network, an NR network, and the like. In addition, the different frequency bands may include a super-high frequency (SHF) (e.g., 2.2 gHz or 2 ghz) band and a millimeter-wave (mmWave) (e.g., 60 GHz) band.

The storage 1*j*-30 stores data such as basic programs, applications, configuration information, or the like for the operation of the terminal. The storage 1*j*-30 provides the stored data in response to a request from the controller 1*j*-40.

The controller 1*j*-40 controls the overall operation of the terminal. For example, the controller 1*j*-40 transmits or receives signals through the baseband processor 1*j*-20 and the RF processor 1*j*-10. Further, the controller 1*j*-40 records and reads data on or from the storage 1*j*-40. To this end, the controller 1*j*-40 may include at least one processor. For example, the controller 1*j*-40 may include a communication processor (CP) for controlling communication and an application processor (AP) for controlling an upper layer such as an application. The controller 1*j*-40 may further include a multi-connectivity processor 1*j*-42 for supporting multi-connectivity.

Figure 1K:
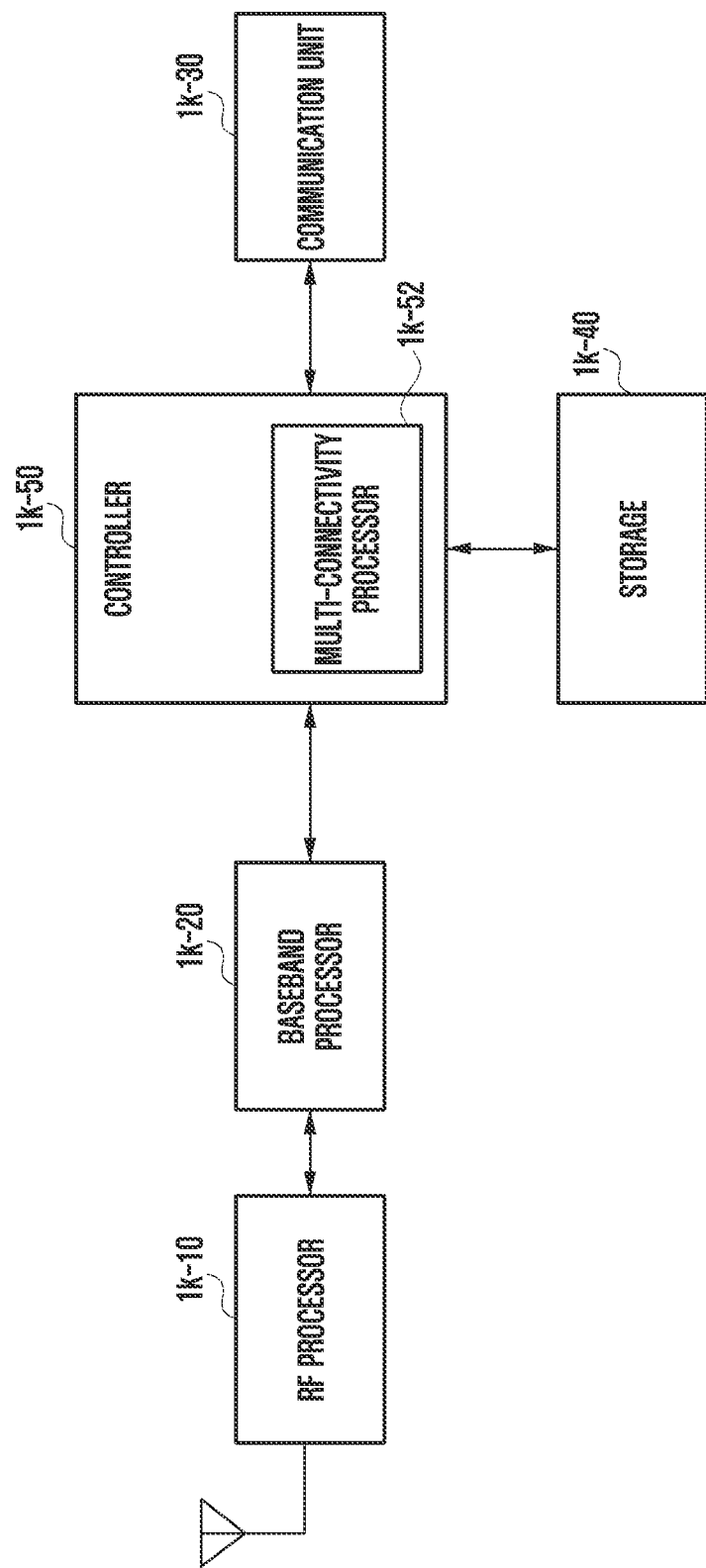
FIG. 1K illustrates a transmission and reception point (TRP) block configuration in a wireless communication system, to which an embodiment of the disclosure is applicable.

FIG. 1K illustrates a TRP block configuration in a wireless communication system, to which an embodiment of the disclosure is applicable.

As illustrated in FIG. 1K, the base station includes an RF processor 1*k*-10, a baseband processor 1*k*-20, a backhaul communication unit 1*k*-30, a storage 1*k*-40, and a controller 1*k*-50.

The RF processor 1*k*-10 performs a function of transmitting or receiving a signal through a radio channel, such as signal band conversion and amplification. That is, the RF processor 1*k*-10 up-converts a baseband signal, provided from the baseband processor 1*k*-20, to an RF-band signal and transmits the converted RF-band signal through an antenna, and down-converts an RF-band signal received through an antenna to a baseband signal. For example, the RF processor 1*k*-10 may include a transmission filter, a reception filter, an amplifier, a mixer, an oscillator, a DAC, an ADC, and the like. Although only a single antenna is illustrated in FIG. 1K, the first connection node may include multiple antennas. In addition, the RF processor 1*k*-10 may include multiple RF chains. Furthermore, the RF processor 1*k*-10 may perform beamforming. For beamforming, the RF processor 1*k*-10 may adjust phases and amplitudes of signals transmitted or received through multiple antennas or antenna elements. The RF processor 1*k*-10 may perform downlink MIMO operation by transmitting data of one or more layers.

The baseband processor 1*k*-20 performs conversion between a baseband signal and a bitstream based on the physical layer specifications of a first radio-access technology. For example, during data transmission, the baseband processor 1*k*-20 generates complex symbols by encoding and modulating a transmission bitstream. In addition, during data reception, the baseband processor 1*k*-20 reconstructs a received bitstream by demodulating and decoding a baseband signal provided from the RF processor 1*k*-10. For example, according to an OFDM scheme, during data transmission, the baseband processor 1*k*-20 generates complex symbols by encoding and modulating a transmission bitstream, maps the complex symbols to subcarriers, and then configures OFDM symbols by performing IFFT operation and CP insertion. Further, during data reception, the baseband processor 1*k*-20 segments a baseband signal, provided from the RF processor 1*k*-10, into units of OFDM symbols, reconstructs signals mapped to subcarriers by performing FFT operation, and then reconstructs a received bitstream by demodulating and decoding the signals. The baseband processor 1*k*-20 and the RF processor 1*k*-10 transmit and receive signals as described above. Accordingly, each of the baseband processor 1*k*-20 and the RF processor 1*k*-10 may also be referred to as a transmitter, a receiver, a transceiver, a communication unit, or a wireless communication unit.

The communication unit 1*k*-30 provides an interface for communicating with other nodes in a network.

The storage 1*k*-40 stores data such as basic programs, applications, configuration information, or the like for the operation of the primary base station. In particular, the storage 1*k*-40 may store information related to a bearer allocated to a connected terminal, the result of measurement reported from the connected terminal, and the like. In addition, the storage 1*k*-40 may store information which serves as criteria for determining whether or not to provide multi-connectivity to the terminal. The storage 1*k*-40 provides the stored data upon a request from the controller 1*k*-50.

The controller 1*k*-50 controls the overall operation of the primary base station. For example, the controller 1*k*-50 transmits or receives a signal through the baseband processor 1*k*-20 and the RF processor 1*k*-10 or through the backhaul communication unit 1*k*-30. In addition, the controller 1*k*-50 records and reads data on or from the storage 1*k*-40. To this end, the controller 1*k*-50 may include at least one processor. The controller 1*k*-50 may further include a multi-connectivity processor 1*k*-52 for supporting multi-connectivity.

Second Embodiment

Figure 2A:
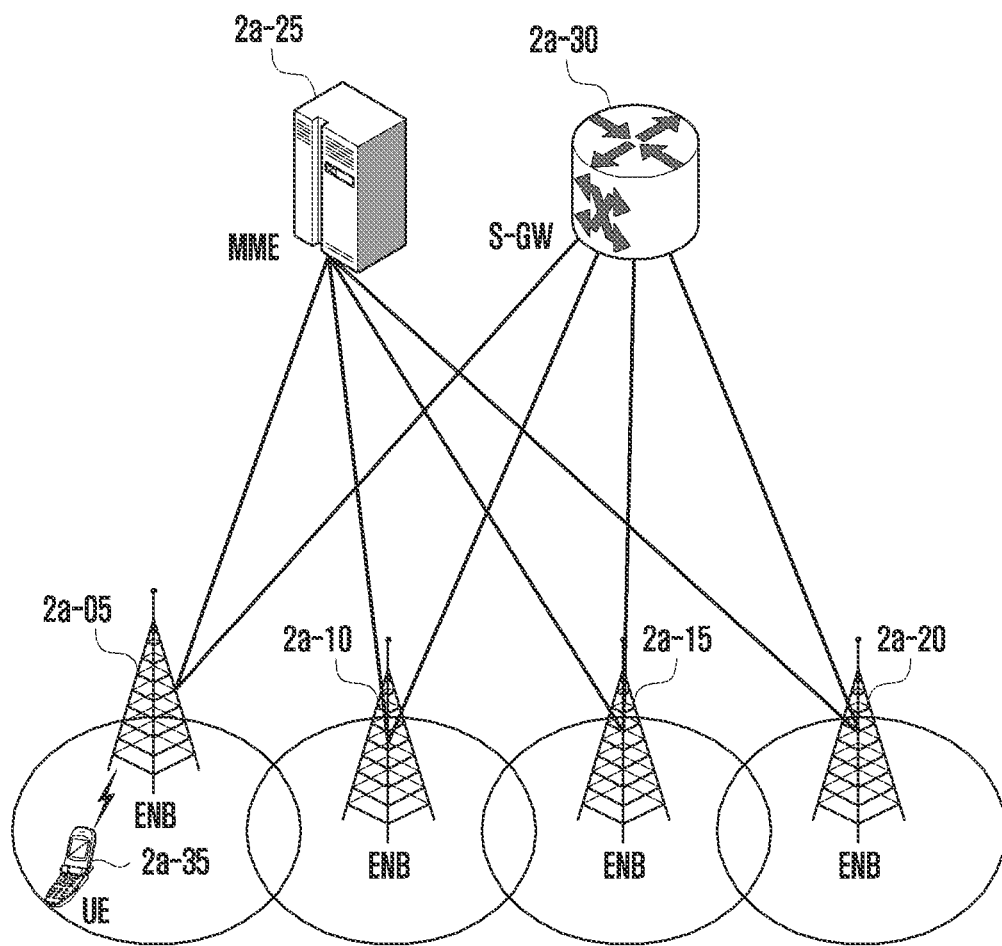
FIG. 2A illustrates the structure of an LTE system, to which the disclosure is applicable.

FIG. 2A illustrates the structure of an LTE system, to which the disclosure is applicable.

Referring to FIG. 2A, a radio access network (RAN) of the LTE system includes evolved base stations (hereinafter, referred to as "evolved node Bs (ENBs)", "Node Bs", or "base stations") 2*a*-05, 2*a*-10, 2*a*-15, and 2*a*-20, a mobility management entity (MME) 2*a*-25, and a serving-gateway (S-GW) 2*a*-30. A user equipment (hereinafter, referred to as a "UE" or "terminal") 2*a*-35 accesses an external network via the ENBs 2*a*-05, 2*a*-10, 2*a*-15, and 2*a*-20 and the S-GW 2*a*-30.

In FIG. 2A, the ENBs 2*a*-05, 2*a*-10, 2*a*-15, and 2*a*-20 correspond to the existing node Bs of a universal mobile telecommunication system (UMTS). The ENB is connected to the UE 2*a*-35 via a radio channel, and performs more complex functions than an existing node B. Since all user traffic data including real-time services such as voice over Internet protocol (VoIP) is serviced through a shared channel in the LTE system, a device for collecting state information, such as buffer state information of a UE, available transmission power state information, and channel state information and performing scheduling is required, and each of the ENBs 2*a*-05, 2*a*-10, 2*a*-15, and 2*a*-20 serves as such a device. A single ENB generally controls multiple cells. For example, the LTE system uses a radio-access technology such as orthogonal frequency-division multiplexing (hereinafter, referred to as "OFDM") in a bandwidth of 20 MHz to achieve a data rate of 100 Mbps. In addition, the LTE system also applies adaptive modulation & coding (hereinafter, referred to as "AMC") to determine a modulation scheme and a channel-coding rate in accordance with the channel state of a terminal. The S-GW 2a-30 is a device for providing a data bearer, and generates or releases the data bearer under the control of the MME 2a-25. The MME is a device for performing a mobility management function and various control functions for a terminal, and is connected to multiple base stations.

Figure 2B:
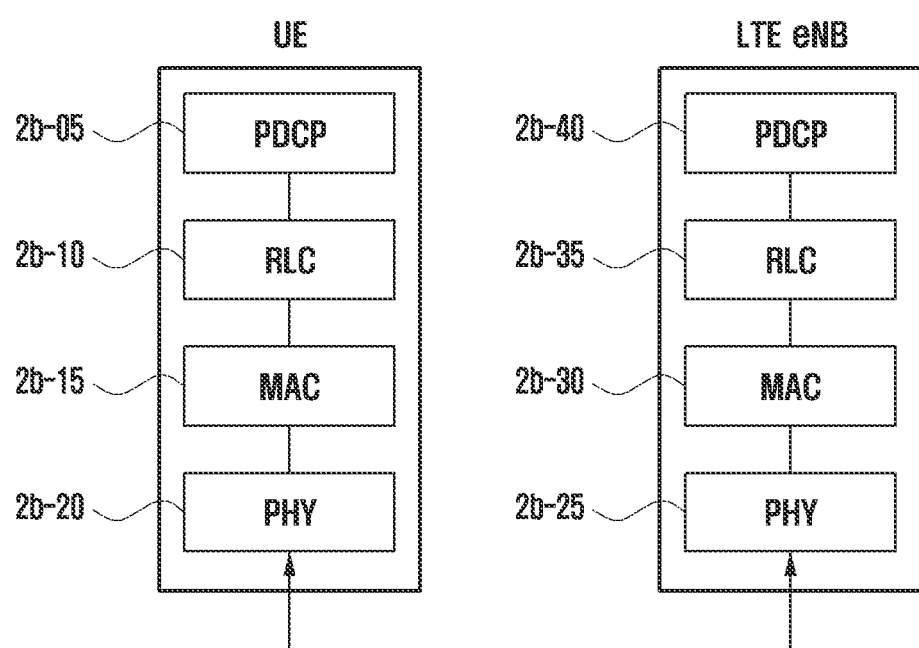
FIG. 2B illustrates a radio protocol structure in an LTE system, to which the disclosure is applicable.

FIG. 2B illustrates a radio protocol structure in an LTE system, to which the disclosure is applicable.

Referring to FIG. 2B, the radio protocol in the LTE system includes packet data convergence protocols (PDCPs) 2b-05 and 2b-40, radio link controls (RLCs) 2b-10 and 2b-35, and medium access controls (MACs) 2b-15 and 2b-30 in a terminal and an ENB, respectively. The PDCPs 2b-05 and 2b-40 perform operations of IP header compression/recovery and the like. The main functions of the PDCP are summarized below:

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link controls (hereinafter, referred to as "RLCs") 2b-10 and 2b-35 reconfigure the PDCP packet data unit (PDU) at an appropriate size to perform an automatic repeat reQuest (ARQ) operation or the like. The main functions of the RLC are summarized below:

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment The MACs 2b-15 and 2b-30 are connected to several RLC layer devices configured in one terminal, and perform an operation of multiplexing RLC PDUs into a MAC PDU and demultiplexing the RLC PDUs from the MAC PDU. The main functions of the MAC are summarized below:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers (PHYs) 2b-20 and 2b-25 generate an OFDM symbol by performing an operation of channel-coding and modulating upper-layer data and transmit the same through a radio channel, or perform an operation of demodulating and channel-decoding the OFDM symbol received through the radio channel and transmit the same to an upper layer.

Figure 2C:
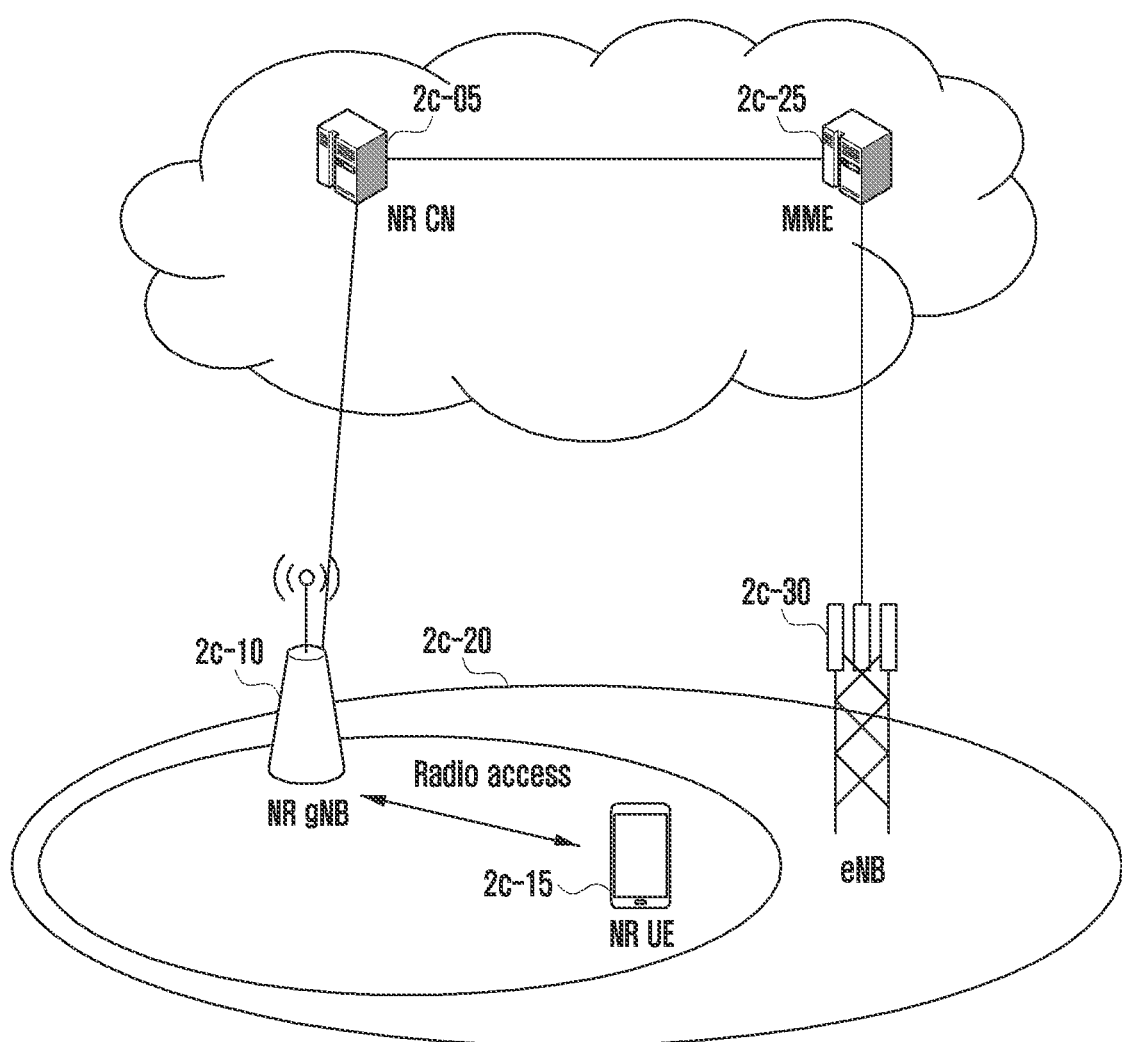
FIG. 2C illustrates the structure of a next-generation mobile communication system, to which the disclosure is applicable.

FIG. 2C illustrates the structure of a next-generation mobile communication system, to which the disclosure is applicable.

Referring to FIG. 2C, a radio access network in the next-generation mobile communication system (Hereinafter, referred to as "NR" or "2G") includes a new-radio node B (hereinafter, referred to as an "NR gNB" or "NR base station") 2c-10 and a new-radio core network (NR CN) 2c-05. A new-radio user equipment (hereinafter, referred to as an "NR UE" or a "terminal") 2c-15 accesses an external network through the NR gNB 2c-10 and the NR CN 2c-05.

In FIG. 2C, the NR gNB 2c-10 corresponds to an evolved node B (eNB) of the existing LTE system. The NR gNB may be connected to the NR UE 2c-15 through a radio channel, and thus may be capable of providing service superior to that of the existing node B. Since all user traffic is serviced through shared channels in the next-generation mobile communication system, a device for collecting state information, such as buffer state information of each UE, available transmission power state information, and channel state information, and performing scheduling is required, and the NR NB 2c-10 serves as such a device. A single NR gNB generally controls multiple cells. In order to implement ultra-high-speed data transmission as compared with the existing LTE, the NR gNB may have a maximum bandwidth that is equal to or higher than the existing maximum bandwidth, and a beamforming technology may be additionally combined using orthogonal frequency-division multiplexing (hereinafter, referred to as "OFDM") as a radio connection technology. In addition, an adaptive modulation & coding (AMC) scheme that determines a modulation scheme and a channel-coding rate in accordance with the channel state of the terminal is applied to the NR gNB. The NR CN 2c-05 performs mobility support, bearer configuration, quality of service (QoS) configuration, and the like. The NR CN is a device that performs not only terminal mobility management functions but also various types of control functions, and is connected to multiple base stations. Further, the next-generation mobile communication system may be linked with the existing LTE system, and the NR CN is connected to the MME 2c-25 through a network interface. The MME is connected to an eNB 2c-30, that is, the existing base station.

Figure 2D:
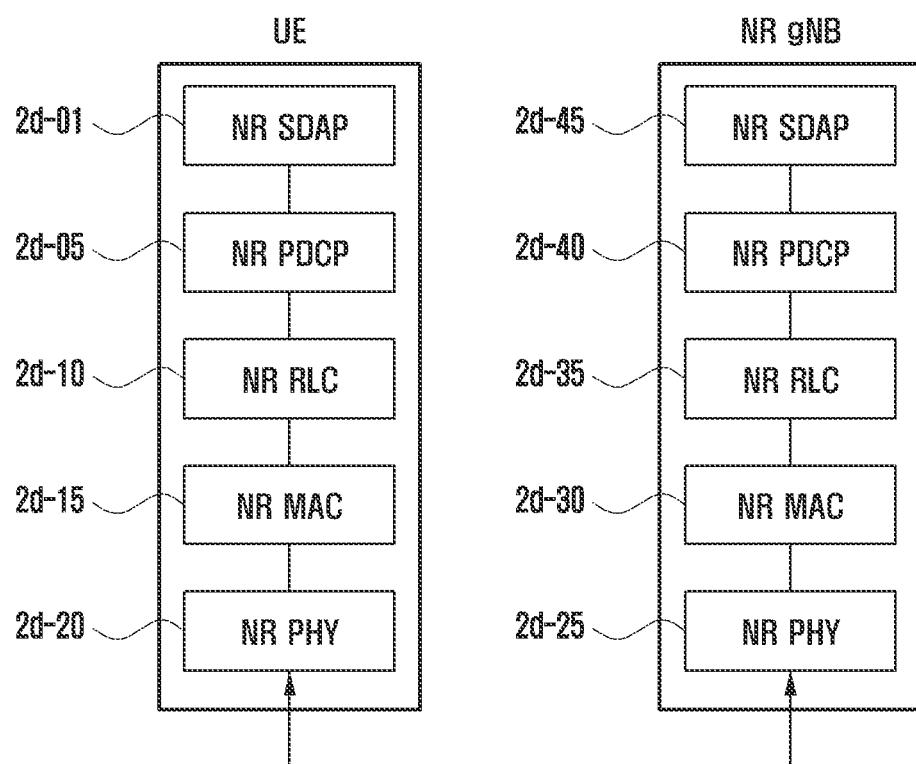
FIG. 2D illustrates a radio protocol structure in the next-generation mobile communication system, to which the disclosure is applicable.

FIG. 2D illustrates a radio protocol structure in the next-generation mobile communication system, to which the disclosure is applicable.

Referring to FIG. 2D, the radio protocol in the next-generation mobile communication system includes NR SDAPs 2d-01 and 2d-45, NR PDCPs 2d-05 and 2d-40, NR RLCs 2d-10 and 2d-35, and NR MACs 2d-15 and 2d-30, in a terminal and an NR base station, respectively.

The main functions of the NR SDPAs 2d-01 and 2d-45 may include some of the following functions:

Transfer of user plane data

Mapping between a QoS flow and a DRB for both DL and UL

Marking QoS flow ID in both DL and UL packets

Reflective QoS flow to DRB mapping for the UL SDAP PDUs

For an SDAP-layer device, the terminal may receive, through an RRC message, a configuration as to whether to use a header of the SDAP-layer device or to use a function of the SDAP-layer device function for each PDCP layer device, each bearer, or each logical channel When an SDAP header is configured, the terminal may be indicated to update or reconfigure, with an NAS reflective QoS 1-bit indicator and an AS reflective QoS 1-bit indicator of the SDAP header, mapping information for uplink and downlink QoS flows and a data bearer. The SDAP header may include QoS flow ID information indicating the QoS. The QoS information may be used for data-processing priority, scheduling information, or the like in order to ensure a smooth service.

The main functions of the NR PDCPs 2d-05 and 2d-40 may include some of the following functions:

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the above description, the reordering function of the NR PDCP device refers to a function of sequentially rearranging PDCP PDUs received in a lower layer based on a PDCP sequence number (SN), and may include: a function of transferring data to an upper layer in the rearranged order; a function of directly transferring data without considering an order; a function of recording lost PDCP PDUs by rearranging an order; a function of reporting a state of the lost PDCP PDUs to a transmission end; and a function of requesting retransmission of the lost PDCP PDUs.

The main functions of the NR RLCs 2d-10 and 2d-35 may include some of the following functions:

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above description, the in-sequence delivery function of the NR RLC device refers to a function of sequentially transferring RLC SDUs received from a lower layer to an upper layer, and may include: a function of rearranging and transferring, when a single RLC SDU is divided into multiple RLC SDUs and received, the divided multiple RLC SDUs; a function of rearranging the received RLC PDUs based on an RLC sequence number (SN) or a PDCP sequence number (SN); a function of recording lost RLC PDUs by rearranging an order; a function of reporting the state of the lost RLC PDUs to a transmission end; a function of requesting retransmission of the lost RLC PDUs; a function of sequentially transferring only RLC SDUs preceding the lost RLC SDU to the upper layer when there is a lost RLC SDU; a function of sequentially transferring all received RLC SDUs to the upper layer before a predetermined timer starts if the timer expires even when there is a lost RLC SDU; and a function of transferring all RLC SDUs received up to that point in time to the upper layer if the predetermined timer expires even when there is a lost RLC SDU. Further, the NR RLC may process the RLC PDUs in the received order (in order of arrival regardless of the order of serial numbers or sequence numbers), and may deliver the processed RLC PDUs to the PDCP device regardless of the order thereof (out-of-sequence delivery). In the case of a segment, the NR RLC may receive segments which are stored in a buffer or are to be received later, reconfigure the segments into one complete RLC PDU, and then process the complete RLC PDU and deliver the same to the PDCP device. The NR RLC layer may not include a concatenation function and may perform the function in the NR MAC layer or may replace the function with a multiplexing function of the NR MAC layer.

In the above description, the out-of-sequence delivery function of the NR RLC device refers to a function of directly delivering, to the upper layer regardless of order, the RLC SDUs received from the lower layer, and may include: a function of rearranging and transferring, when a single RLC SDU is divided into multiple RLC SDUs and received, the divided multiple RLC SDUs; and a function of recording lost RLC PDUs by storing RLC SNs or PDCP SNs of received RLC PDUs and reordering the received RLC PDUs.

The NR MAC 2d-15 and 2d-30 may be connected to several NR RLC layer devices configured in one terminal, and the main functions of the NR MAC may include some of the following functions:

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

NR Physical layers (NR PHYs) 2d-20 and 2d-25 may generate an OFDM symbol by performing an operation of channel-coding and modulating upper-layer data and transmit the same through a radio channel, or may perform an operation of demodulating and channel-decoding the OFDM symbol received through the radio channel and transmit the same to the upper layer.

Figure 2E:
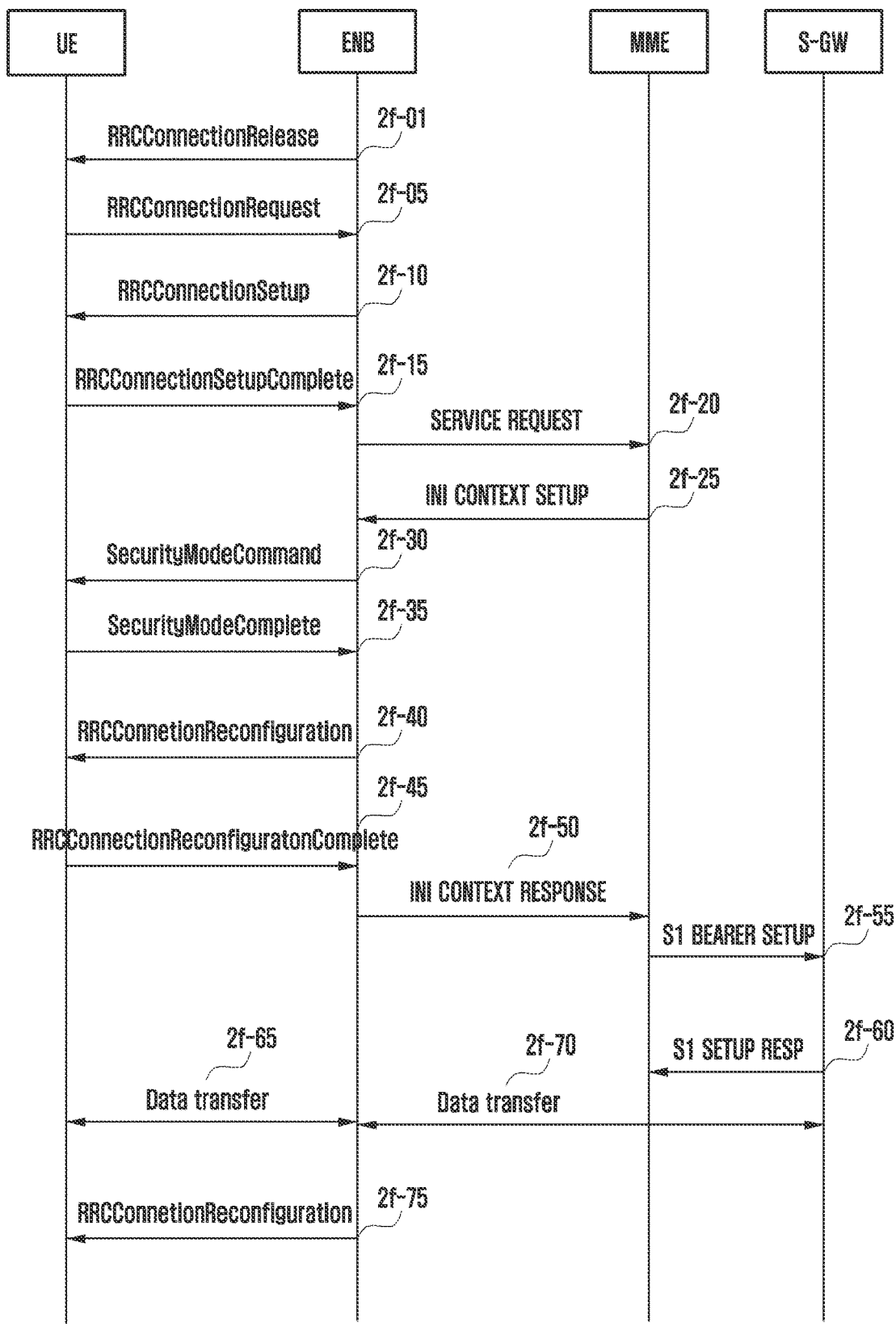
FIG. 2E illustrates a procedure of releasing connection between a base station and a terminal and switching the state of the terminal from an RRC-connected mode to an RRC idle mode, and a procedure of configuring connection between the base station and the terminal and switching the state of the terminal from the RRC idle mode to the RRC-connected mode.

FIG. 2E illustrates a procedure of releasing connection between a base station and a terminal and switching the state of the terminal from an RRC-connected mode to an RRC idle mode, and a procedure of configuring connection between the base station and the terminal and switching the state of the terminal from the RRC idle mode to the RRC-connected mode.

In FIG. 2E, when there is no data transmission or reception to or from the terminal, which transmits or receives data in the RRC-connected mode, for a predetermined reason, or for a predetermined time, the base station may transmit an RRCConnectionRelease message to the terminal to switch the state of the terminal to the RRC idle mode (operation 2e-01). When data to be transmitted is generated later, the terminal currently having no connection (hereinafter, referred to as an idle mode UE), performs an RRC connection establishment procedure with the base station. The terminal establishes uplink transmission synchronization with the base station through a random-access procedure and transmits an RRCConnectionRequest message to the base station (operation 2e-05). In the message, an identity of the terminal, the reason for establishing the connection (establishmenCause), and the like are included. The base station transmits an RRCConnectionSetup message so that the terminal configures the RRC connection (operation 2e-10). In the message, RRC connection configuration information, and the like are included. The RRC connection is also referred to as a signaling radio bearer (SRB), and is used for transmitting or receiving an RRC message which is a control message between the terminal and the base station. The terminal having configured the RRC connection transmits an RRCConnectionSetupComplete message to the base station (operation 2e-15). In the message, a SERVICE REQUEST control message which is used for the terminal to request bearer configuration for a predetermined service from an MME is included.

The base station transmits the SERVICE REQUEST message included in the RRCConnectedSetupComplete message to the MME (operation 2e-20), and the MME determines whether to provide the service requested by the terminal. As a result of the determination, when it is determined to provide the service requested by the terminal, the MME transmits an INITIAL CONTEXT SETUP REQUEST message to the base station (operation 2e-25). In the message, information such as QoS information to be applied in configuring a data radio bearer (DRB), and security-related information to be applied to the DRB (for example, a security key or a security algorithm) is included. In order to configure security, the base station exchanges a SecurityModeCommand message 2e-30 and a SecurityModeComplete message 2e-35 with the terminal. When the security configuration is completed, the base station transmits an RRCConnectionReconfiguration message to the terminal (operation 2e-40). The DRB configuration information for processing user data is included in the message, and the terminal configures a DRB by applying the DRB configuration information and transmits an RRCConnectionReconfigurationComplete message to the base station (operation 2e-45).

The base station having completed the DRB configuration with the terminal transmits an INITIAL CONTEXT SETUP COMPLETE message to the MME (operation 2e-50), and the MME having received the message exchanges an S1 BEARER SETUP message and an S1 BEARER SETUP RESPONSE message with the S-GW to configure an S1 bearer (operations 2e-55 and 2e-60). The SI bearer is data transmission connection configured between the S-GW and the base station, and is in one-to-one correspondence with the DRB. When the above procedure is completed, the terminal transmits or receives data to or from the base station through the S-GW (operations 2e-65 and 2e-70). Generally, as described above, a data transmission procedure has three operations of an RRC connection configuration, a security configuration, and a DRB configuration. Further, in order to renew, add, or change the configuration for the terminal for a predetermined reason, the base station may transmit an RRCConnectionReconfiguration message (operation 2e-75).

As described above, a large number of signaling procedures are required for the terminal to configure RRC connection and switch the state from the RRC idle mode to the RRC connection mode. Accordingly, in the next-generation mobile communication system, the RRC inactive mode may be newly defined. In the new mode described above, since the terminal and the base station may store UE context and maintain the S1 bearer if required, when the terminal in the RRC inactive mode attempts to access the network again, the terminal may access the network more promptly and transmit or receive data, through an RRC reconnection configuration procedure to be described below, which requires a smaller number of signaling procedures.

In the disclosure, when a bearer of a layer device is suspended, it means that no data transmission or reception may be performed and data-processing is suspended, and also means that the data is not considered for transmission and is thus not considered for buffer state reporting. On the other hand, when a bearer or a layer device is resumed, it means that data transmission or reception may be performed and data-processing is resumed, and also means that the data is considered for transmission and is thus considered for buffer state reporting.

Figure 2F:
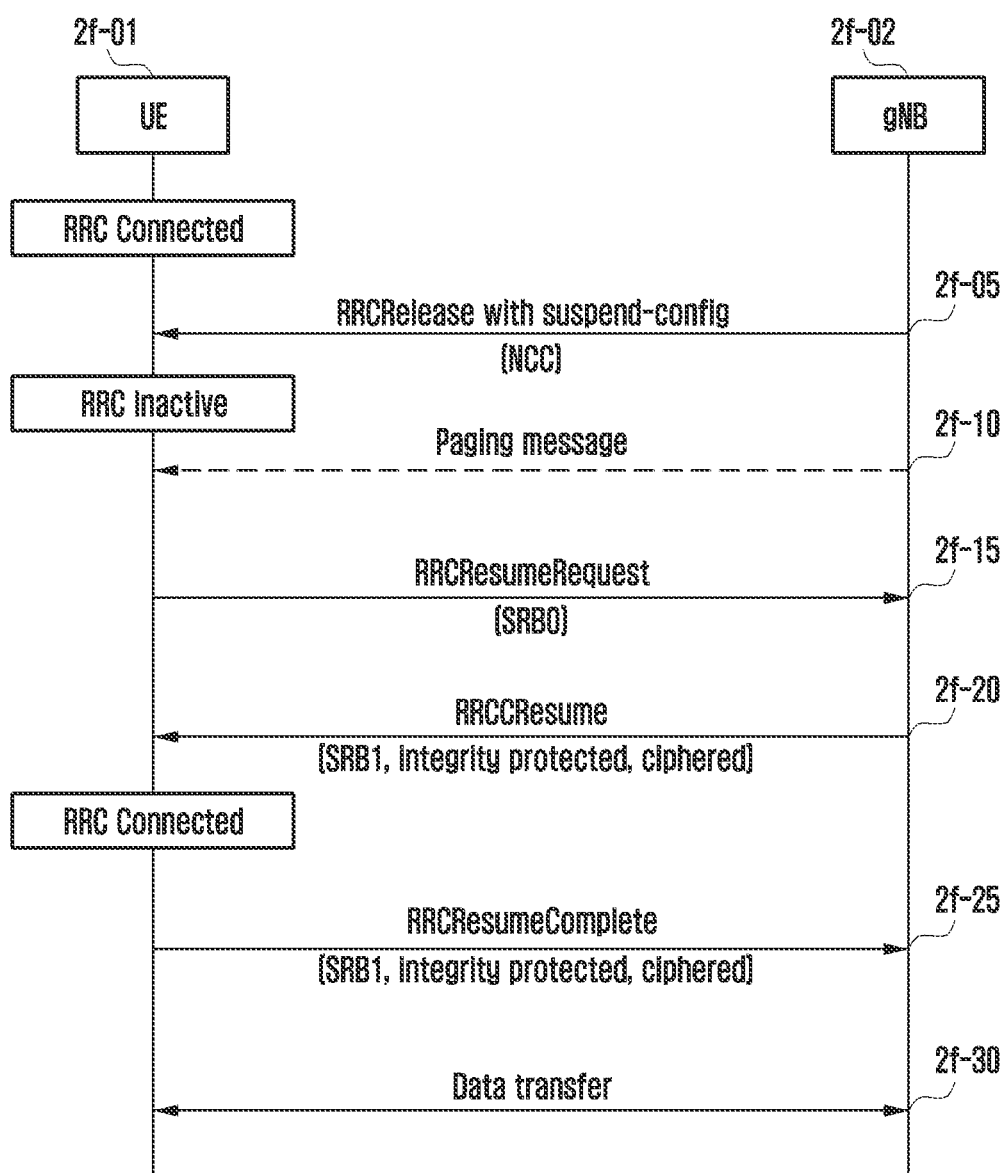
FIG. 2F illustrates a method of supporting an RRC connection suspension and resumption procedure when a terminal performs network connection with one base station in a single connectivity manner and transmits or receives data to or from the base station, proposed in the disclosure.

FIG. 2F illustrates a scheme of supporting an RRC connection suspension and resumption procedure when a terminal performs network connection with one base station in a single connectivity manner and transmits or receives data to or from the base station, proposed in the disclosure.

In FIG. 2F, a terminal 2f-01 may perform network connection with one base station 2f-02 in a single connectivity manner and transmit or receive data to or from the base station 2f-02. When the base station needs to make the state of the terminal transition to the RRC inactive mode for a predetermined reason, the base station may transmit an RRCRelease message 2f-05 to the terminal to make the state of the terminal transition to the RRC inactive mode.

The terminal operation when the terminal has received the RRCRelease message 2f-05 including suspension configuration information is proposed below.

1. In the case in which the RRCRelease message includes the suspension configuration information (suspendConfig),
  A. When there is terminal connection resumption identity (resumeIdentity), NexthopChainingCount (NCC), or RAN-notification area information (ran-NotificationAreaInfo) already stored in the terminal,
    i. The terminal replaces (or updates) the stored values with new values included in the suspension configuration information of the RRCRelease message.
  B. When there is no terminal connection resumption identity (resumeIdentity), NexthopChainingCount (NCC), or RAN-notification area information (ran-NotificationAreaInfo) already stored in the terminal,
    i. The terminal stores terminal connection resumption identity (resumeIdentity), NexthopChainingCount (NCC), and RAN-notification area information (ran-NotificationAreaInfo) included in the suspension configuration information of the RRCRelease message.
  C. The terminal resets the MAC-layer device (in order to prevent unnecessary data retransmission at the time of connection resumption of pieces of data stored in an HARQ buffer).
  D. The terminal re-establishes RLC-layer devices for all SRBs and DRBs (in order to prevent unnecessary data retransmission at the time of connection resumption of pieces of data stored in an RLC buffer, and to initialize parameters for later use).
  E. When the RRCRelease message including the suspension configuration information is not received as a response to the RRCResumeRequest message,
    i. The terminal stores UE context. The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

F. The terminal suspends all DRBs and SRBs, except for SRB0.

G. The terminal reports suspension of RRC connection to an upper layer.

H. The terminal configures lower-layer devices to suspend a function for integrity protection and encryption.

I. The terminal transitions to an RRC inactive mode.

In the above description, when the terminal in the RRC inactive mode needs to receive a paging message (operation 2f-10), transmit uplink data, or update the RAN notification area while moving, the terminal may perform an RRC connection resumption procedure.

When the terminal performs a random-access procedure upon the need for configuration of connection and transmits an RRCResumeRequest message to the base station, with respect to the transmission of the message, the terminal operation is proposed below (operation 2f-15).

1. When the terminal identifies system information, and the system information indicates transmission of a complete terminal connection resumption identity (I-RNTI or a full resume ID), the terminal prepares to transmit the message including the stored complete terminal connection resumption identity (I-RNTI). When the system information indicates to transmit a truncated terminal connection resumption identity (truncated I-RNTI or a truncated resume ID), the terminal configures the stored complete terminal connection resumption identity (I-RNTI) to a truncated terminal connection resumption identity (a truncated resume ID) according to a predetermined scheme, and prepares to transmit the message including the configured truncated terminal connection resumption identity.

2. The terminal restores RRC connection configuration information and security context information from the stored UE context.

3. The terminal updates a new KgNB security key based on the current KgNB security key, the NextHop (NH) value, and the stored NCC value.

4. The terminal induces new security keys (K_RRCenc, K_RRC_int, K_UPint, and K_UPenc) to be used in the integrity protection and verification procedure and the encryption and decryption procedure by using the newly updated KgNB security key.

5. The terminal calculates MAC-I and prepares to transmit the message including the calculated MAC-I.

6. The terminal resumes SRB1 (SRB1 is to be resumed in advance since the RRCResume message is to be received through SRB1 as a response to the RRCResumeRequest to be transmitted).

7. The terminal configures the RRCResumeRequest message and transmits the message to a lower-layer device.

8. The terminal resumes the integrity protection and verification procedure by applying the updated security keys and a preconfigured algorithm with respect to all bearers except for SRB0, and applies the integrity verification and protection to pieces of data to be transmitted and received thereafter. (The reason to apply the integrity verification and protection is to increase reliability and security on the pieces of data to be transmitted or received later to or from SRB1 or DRBs.)

9. The terminal resumes the encryption and decryption procedure by applying the updated security keys and a preconfigured algorithm with respect to all bearers except for SRB0, and applies the encryption and decryption to pieces of data to be transmitted and received thereafter. (The reason to apply the encryption and decryption is to increase reliability and security on the pieces of data to be transmitted or received later to or from SRB1 or DRBs.)

When the terminal performs a random-access procedure upon the need for configuration of connection, transmits an RRCResumeRequest message to the base station, and then receives the RRCResume message as a response to the RRCResumeRequest message, the terminal operation is proposed below (operation 2f-20).

1. When receiving the message, the terminal restores the PDCP state, resets a COUNT value, and re-establishes PDCP-layer devices of all DRBs and SRB2.

2. When the message includes master cell group (masterCellgroup) configuration information, A. The terminal performs and applies the master cell group configuration information included the message. The master cell group information may include configuration information on RLC-layer devices belonging to the master cell group, a logical channel identity, a bearer identity, and the like.

3. When the message includes bearer configuration information (radioBearerConfig), A. The terminal performs and applies the bearer configuration information (radioBearerConfig) included in the message. The bearer configuration information (radioBearerConfig) may include configuration information on PDCP-layer devices of each bearer, configuration information on SDAP-layer devices, a logical channel identity, a bearer identity, and the like.

4. The terminal resumes all DRBs and SRB2.

5. When the message includes frequency measurement configuration information (measConfig), A. The terminal performs and applies the frequency measurement configuration information (measConfig) included the message.

6. The terminal transitions to an RRC-connected mode.

7. The terminal indicates the resumption of the suspended RRC connection to an upper-layer device.

8. The terminal configures and transmits an RRCResumeComplete message for transmission to a lower layer (operation 2f-25).

The terminal may transmit or receive data to or from the base station (operation 2f-30).

Figure 2G:
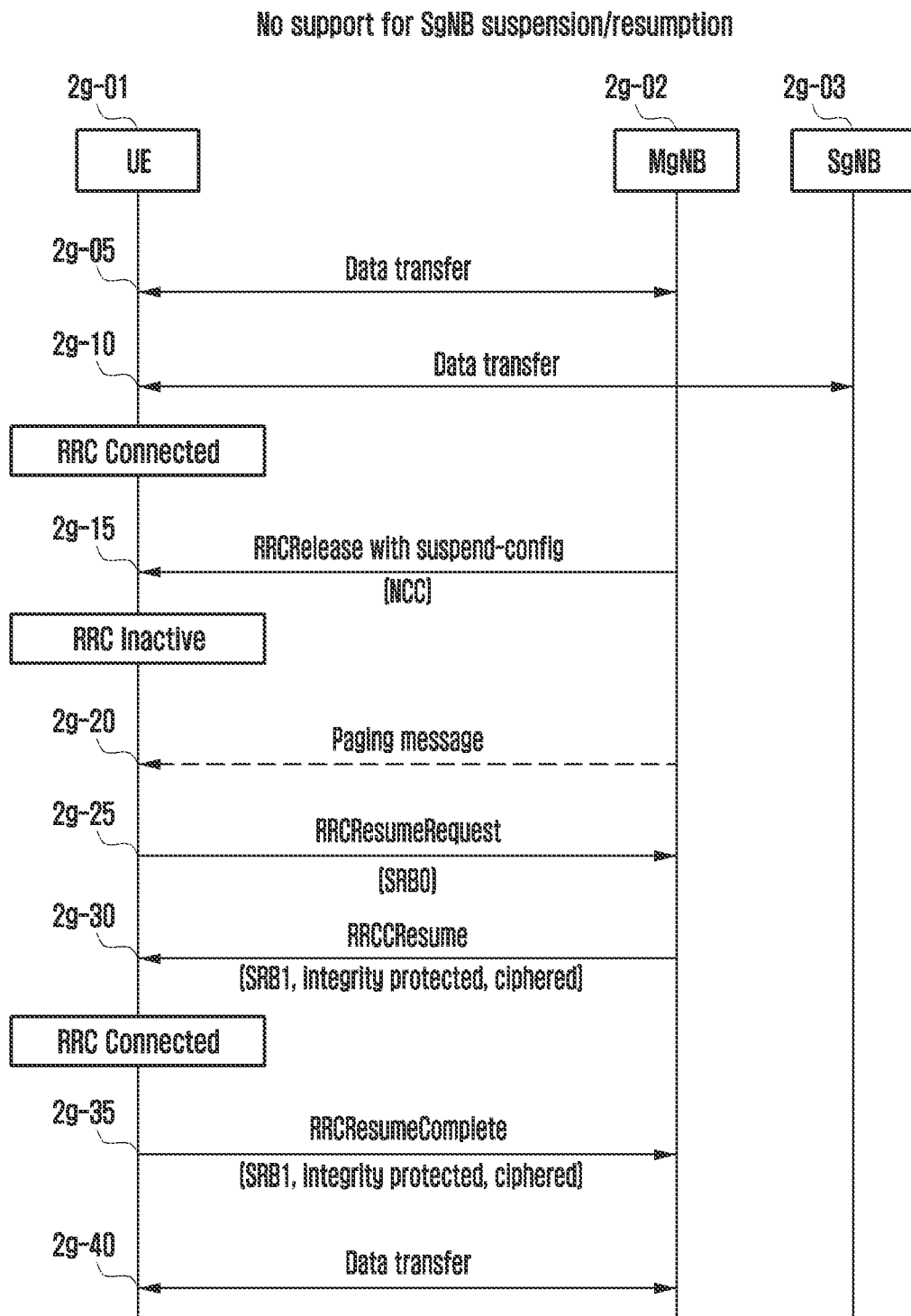
FIG. 2G illustrates a (2-1)th embodiment describing support for a RRC connection suspension and resumption procedure when a terminal performs network connection with two base stations in a single connectivity manner and transmits or receives data to or from the two base stations in the disclosure.

FIG. 2G illustrates a (2-1)th embodiment describing support for a RRC connection suspension and resumption procedure when a terminal performs network connection with two base stations in a single connectivity manner and transmits or receives data to or from the two base stations in the disclosure. In the (2-1)th embodiment, for reducing complex procedures and for convenience of implementation, the suspension and resumption procedure is not supported for RRC and bearer configuration information corresponding to a secondary cell group (SCG) (SgNB or SeNB). That is, the suspension and resumption procedure is supported only for RRC and bearer configuration information corresponding to a master cell group (MCG) (MgNB or MeNB).

In FIG. 2G, a terminal 2g-01 may transmit or receive data to or from two base stations 2g-02 and 2g-03 by performing network connectivity with the two base stations in a single connectivity manner and applying dual-connectivity technology. When the base station needs to make the state of the terminal transition to the RRC inactive mode for a predetermined reason, the base station may transmit an RRCRelease message 2g-15 to the terminal to make the state of the terminal transition to the RRC inactive mode.

The terminal operation when the terminal has received the RRCRelease message 2g-15 including suspension configuration information is proposed below.

1. In the case in which the RRCRelease message includes the suspension configuration information (suspendConfig), A. When there is terminal connection resumption identity (resumeIdentity), NexthopChainingCount (NCC), or RAN-notification area information (ran-NotificationAreaInfo) already stored in the terminal, i. The terminal replaces (or updates) the stored values with new values included in the suspension configuration information of the RRCRelease message.

B. When there is no terminal connection resumption identity (resumeIdentity), NexthopChainingCount (NCC), or RAN-notification area information (ran-NotificationAreaInfo) already stored in the terminal, i. The terminal stores terminal connection resumption identity (resumeIdentity), NexthopChainingCount (NCC), and RAN-notification area information (ran-NotificationAreaInfo) included in the suspension configuration information of the RRCRelease message.

C. The terminal resets the MAC-layer device corresponding to the master cell group (in order to prevent unnecessary data retransmission at the time of connection resumption of pieces of data stored in an HARQ buffer). Further, the terminal releases the MAC-layer device corresponding to the secondary cell group.

D. The terminal re-establishes RLC-layer devices for all SRBs and DRBs corresponding to the master cell group (MCG-terminated RBs) (in order to prevent unnecessary data retransmission at the time of connection resumption of pieces of data stored in an RLC buffer, and to initialize parameters for later use). Further, the terminal releases each layer device and bearer information (for example, configuration information of SDAP-layer devices, PDCP-layer devices, and RLC-layer devices) of all SRBs and DRBs corresponding to the secondary cell group (SCG-terminated RBs).

E. When the RRCRelease message including the suspension configuration information is not received as a response to the RRCResumeRequest message, i. The terminal stores UE context. The UE context may include current RRC configuration information of the master cell group, current security context information of the master cell group, PDCP state information including ROHC state information of the master cell group, SDAP configuration information of the master cell group, a terminal cell identity (C-RNTI) having been used in a source cell (source PCell) of the master cell group, and a cell identity (CellIdentity) and a physical cell identity of a source cell (PCell).

F. The terminal suspends all DRBs and SRBs corresponding to the master cell group (MCG-terminated RBs), except for SRB0. Further, the terminal releases each layer device and bearer information (for example, configuration information of SDAP-layer devices, PDCP-layer devices, and RLC-layer devices) of all SRBs and DRBs corresponding to the secondary cell group (SCG-terminated RBs).

G. The terminal reports suspension of RRC connection to an upper layer.

H. The terminal configures lower-layer devices to suspend a function for integrity protection and encryption.

I. The terminal transitions to an RRC inactive mode.

In the above description, when the terminal in the RRC inactive mode needs to receive a paging message (operations 2g-20), transmit uplink data, or update the RAN notification area while moving, the terminal may perform an RRC connection resumption procedure.

When the terminal performs a random-access procedure upon the need for configuration of connection and transmits an RRCResumeRequest message to the base station, with respect to the transmission of the message, the terminal operation is proposed below (operation 2g-25).

1. When the terminal identifies system information, and the system information indicates transmission of a complete terminal connection resumption identity (I-RNTI or a full resume ID), the terminal prepares to transmit the message including the stored complete terminal connection resumption identity (I-RNTI). When the system information indicates to transmit a truncated terminal connection resumption identity (a truncated I-RNTI or a truncated resume ID), the terminal configures the stored complete terminal connection resumption identity (I-RNTI) to a truncated terminal connection resumption identity (a truncated resume ID) according to a predetermined scheme, and prepares to transmit the message including the configured truncated terminal connection resumption identity.

2. The terminal restores RRC connection configuration information and security context information from the stored UE context.

3. The terminal updates a new KgNB security key corresponding to the master cell group based on the current KgNB security key, the NextHop (NH) value, and the stored NCC value.

4. The terminal induces new security keys (K_RRCenc, K_RRC_int, K_UPint, and K_UPenc) to be used in the integrity protection and verification procedure and the encryption and decryption procedure by using the newly updated KgNB security key.

5. The terminal calculates MAC-I and prepares to transmit the message including the calculated MAC-I.

6. The terminal resumes SRB1 (SRB1 is to be resumed in advance since the RRCResume message is to be received through SRB1 as a response to the RRCResumeRequest to be transmitted).

7. The terminal configures the RRCResumeRequest message and transmits the message to a lower-layer device.

8. The terminal resumes the integrity protection and verification procedure by applying the updated security keys and a preconfigured algorithm with respect to all bearers corresponding to the master cell group (MCG-terminated RBs), except for SRB0, and applies the integrity verification and protection to pieces of data to be transmitted and received thereafter. (The reason to apply the integrity verification and protection is to increase reliability and security on the pieces of data to be transmitted or received later to or from SRB1 or DRBs.)

9. The terminal resumes the encryption and decryption procedure by applying the updated security keys and a preconfigured algorithm with respect to all bearers corresponding to the master cell group (MCG-terminated RBs), except for SRB0, and applies the encryption and decryption to pieces of data to be transmitted and received thereafter. (The reason to apply the encryption and decryption is to increase reliability and security on the pieces of data to be transmitted or received later to or from SRB1 or DRBs.)

When the terminal performs a random-access procedure upon the need for configuration of connection, transmits an RRCResumeRequest message to the base station, and then receives the RRCResume message as a response to the RRCResumeRequest message, the terminal operation is proposed below (operation 2g-30).

1. When receiving the message, the terminal restores the PDCP state corresponding to the master cell group, resets a COUNT value, and re-establishes PDCP-layer devices of all DRBs and SRB2 corresponding to the master cell group (MCG-terminated RBs).

2. When the message includes master cell group (master-Cellgroup) configuration information, A. The terminal performs and applies the master cell group configuration information included the message. The master cell group information may include configuration information on RLC-layer devices belonging to the master cell group, a logical channel identity, a bearer identity, and the like.

3. When the message includes bearer configuration information (radioBearerConfig), A. The terminal performs and applies the bearer configuration information (radioBearerConfig) included in the message. The bearer configuration information (radioBearerConfig) may include configuration information on PDCP-layer devices of each bearer, configuration information on SDAP-layer devices, a logical channel identity, a bearer identity, and the like.

4. The terminal resumes all DRBs and SRB2 corresponding to the master cell group (MCG-terminated RBs).

5. When the message includes frequency measurement configuration information (measConfig), A. The terminal performs and applies the frequency measurement configuration information included the message. That is, the terminal may perform frequency measurement according to the configuration.

6. The terminal transitions to an RRC-connected mode.

7. The terminal indicates the resumption of the suspended RRC connection to an upper-layer device.

8. The terminal configures and transmits an RRCResumeComplete message for transmission to a lower layer (operation 2g-35).

The terminal may transmit or receive data to or from the base station (operation 2g-40).

Figure 2H:
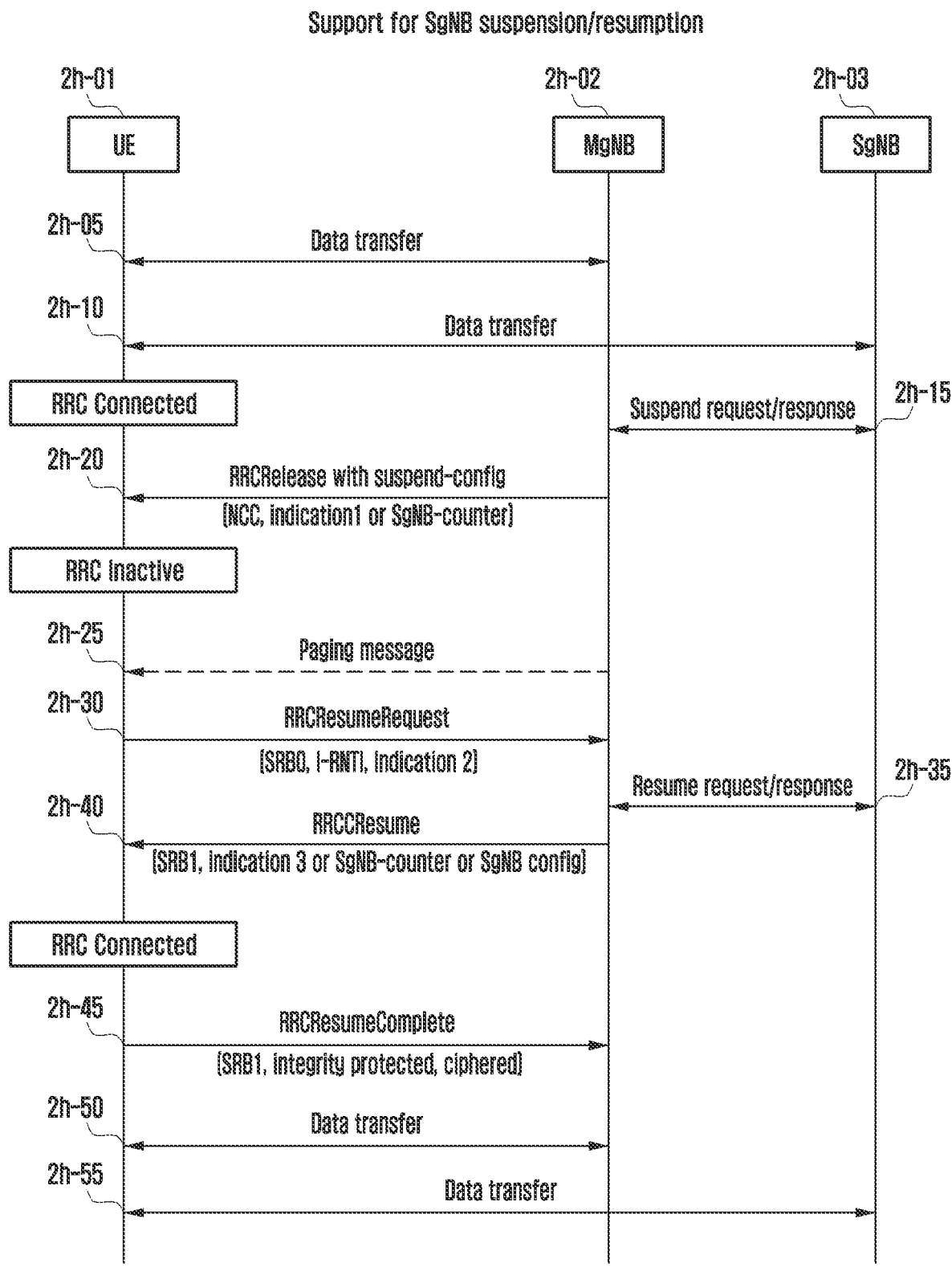
FIG. 2H illustrates a (2-2)th embodiment describing support for a RRC connection suspension and resumption procedure when a terminal performs network connection with two base stations in a single connectivity manner and transmits or receives data to or from the two base stations in the disclosure.

FIG. 2H illustrates a (2-2)th embodiment describing support for a RRC connection suspension and resumption procedure when a terminal performs network connection with two base stations in a single connectivity manner and transmits or receives data to or from the two base stations in the disclosure.

In the (2-2)th embodiment, the suspension and resumption procedure is supported for RRC and bearer configuration information corresponding to a secondary cell group (SCG) (SgNB or SeNB). That is, the suspension and resumption procedure is separately supported for RRC and bearer configuration information corresponding to a master cell group (MCG) (MgNB or MeNB), and for RRC and bearer configuration information corresponding to a secondary cell group (SCG) (SgNB or SeNB). Accordingly, there is no need for newly configuring RRC and bearer configuration information corresponding to a secondary cell group (SCG) (SgNB or SeNB), thereby signaling overhead and connection delay can be reduced. Further, in the (2-2)th embodiment, the terminal performs frequency measurement for the secondary cell group in advance, determines a channel state based on the result of the measurement, and indicates that the channel state is good for the secondary cell group by using an indicator of an RRCResumeRequest message.

In FIG. 2H, a terminal 2h-01 may transmit or receive data to or from two base stations 2h-02 and 2h-03 by performing network connection with the two base stations in a single connectivity manner and applying dual-connectivity technology. When the base station needs to make the state of the terminal transition to the RRC inactive mode for a predetermined reason, the base station may transmit an RRCRelease message (operation 2h-15) to make the state of the terminal transition to the RRC inactive mode. In the above description, for the terminal employing dual-connectivity technology, in order to determine whether to suspend and resume master cell group bearer configuration and RRC configuration information, and to determine whether to suspend and resume secondary cell group bearer configuration and RRC configuration information, the base station may inquire of a secondary cell base station about whether to suspend and resume the configuration information and determine the same according to a response to the inquiry (operation 2h-15). When it is determined to support the suspension and resumption procedure of the secondary cell base station, a master cell base station may store, in suspension configuration information of an RRCRelease message, secondary cell group bearer configuration information and RRC configuration information including a defined new indicator or an SCG-counter value (or sk-counter), and indicate to suspend secondary cell group bearers. In the above description, the SCG counter value (or sk-counter) is a security key induction value required to induce security keys (for example, K_SgNB) of the secondary cell group.

A (2-1)th embodiment of the terminal operation when the terminal has received the RRCRelease message 2h-20 including suspension configuration information is proposed below.

1. In the case in which the RRCRelease message includes the suspension configuration information (suspendConfig), A. When there is terminal connection resumption identity (resumeIdentity), NexthopChainingCount (NCC), RAN-notification area information (ran-NotificationAreaInfo), or an SCG-counter value (or sk-counter) already stored in the terminal, i. The terminal replaces (or updates) the stored values with new values included in the suspension configuration information of the RRCRelease message.

B. When there is no terminal connection resumption identity (resumeIdentity), NexthopChainingCount (NCC), RAN-notification area information (ran-NotificationAreaInfo), or an SCG-counter value (or sk-counter) already stored in the terminal, i. The terminal stores terminal connection resumption identity (resumeIdentity), NexthopChainingCount (NCC), RAN-notification area information (ran-NotificationAreaInfo), or an SCG-counter value (or sk-counter) included in the suspension configuration information of the RRCRelease message.

C. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases a MAC-layer device and configuration information corresponding to the secondary cell group. That is, the terminal determines that the suspension and resumption procedure is not supported for the secondary cell group.

D. The terminal resets the MAC-layer device (if not released in the above operation) corresponding to the master cell group or the secondary cell group (in order to prevent unnecessary data retransmission at the time of connection resumption of pieces of data stored in an HARQ buffer).

E. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases or discards UE context corresponding the secondary cell group. The UE context current RRC configuration information corresponding to the secondary cell group, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

F. The terminal may perform scheme 1 or scheme 2 below.

i. Scheme 1: The terminal re-establishes RLC-layer devices for all SRBs and DRBs (MCG/SCG-terminated RBs) (in order to prevent unnecessary data retransmission at the time of connection resumption of pieces of data stored in an RLC buffer, and to initialize parameters for later use).

ii. Scheme 2: The terminal re-establishes RLC-layer devices for all SRBs and DRBs corresponding to the master cell group (MCG-terminated RBs). On the other hand, the terminal releases each RLC-layer device and configuration information of RLC-layer devices of all SRBs and DRBs corresponding to the secondary cell group (SCG-terminated RBs) (in order to perform new configuration in accordance with a new base station at time of new access of the terminal).

G. In the case in which the RRCRelease message including the suspension configuration information is not received as a response to the RRCResumeRequest message, H. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases or discards UE context corresponding to the secondary cell group.

I. The terminal stores UE context. The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

J. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases each layer device and bearer information (for example, configuration information of SDAP-layer devices, PDCP-layer devices, and RLC-layer devices) of all SRBs and DRBs corresponding to the secondary cell group (SCG-terminated RBs).

K. The terminal suspends all SRBs and DRBs corresponding to the master cell group (MCG-terminated RBs), except for SRB0. When the configuration information corresponding to the secondary cell group is not released, the terminal suspends all SRBs and DRBs corresponding to the secondary cell group (SCG-terminated RBs).

L. The terminal reports suspension of RRC connection to an upper layer.

M. The terminal configures lower-layer devices to suspend a function for integrity protection and encryption.

N. The terminal transitions to an RRC inactive mode.

The (2-2)th embodiment of the terminal operation when the terminal has received the RRCRelease message 2h-20 including suspension configuration information is proposed below.

1. In the case in which the RRCRelease message includes the suspension configuration information (suspendConfig), A. When there is terminal connection resumption identity (resumeIdentity), NexthopChainingCount (NCC), or RAN-notification area information (ran-NotificationAreaInfo) already stored in the terminal, i. The terminal replaces (or updates) the stored values with new values included in the suspension configuration information of the RRCRelease message.

B. When there is no terminal connection resumption identity (resumeIdentity), NexthopChainingCount (NCC), or RAN-notification area information (ran-NotificationAreaInfo) already stored in the terminal, i. The terminal stores terminal connection resumption identity (resumeIdentity), NexthopChainingCount (NCC), RAN-notification area information (ran-NotificationAreaInfo), or an SCG-counter value (or sk-counter) included in the suspension configuration information of the RRCRelease message.

C. The terminal resets the MAC-layer device corresponding to the master cell group or the secondary cell group (in order to prevent unnecessary data retransmission at the time of connection resumption of pieces of data stored in an HARQ buffer).

D. The terminal re-establishes RLC-layer devices for all SRBs and DRBs (MCG/SCG-terminated RBs) (in order to prevent unnecessary data retransmission at the time of connection resumption of pieces of data stored in an RLC buffer, and to initialize parameters for later use).

E. When the RRCRelease message including the suspension configuration information is not received as a response to the RRCResumeRequest message, F. The terminal stores UE context. The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

G. The terminal suspends all DRBs and SRBs corresponding to the master cell group (MCG-terminated RBs), except for SRB0. Further, the terminal suspends all SRBs and DRBs corresponding to the secondary cell group (SCG-terminated RBs).

H. The terminal reports suspension of RRC connection to an upper layer.

I. The terminal configures lower-layer devices to suspend a function for integrity protection and encryption.

J. The terminal transitions to an RRC inactive mode.

In the above description, when the terminal in the RRC inactive mode needs to receive a paging message (operations 2h-25), transmit uplink data, or update the RAN notification area while moving, the terminal may perform an RRC connection resumption procedure.

In the (2-2)th embodiment in the disclosure, when the terminal receives frequency measurement configuration information of the suspended secondary cell group through the RRCRelease message or system information, starts performing measurement for the secondary cell group, and determines based on the result of the measurement that connection to the secondary cell group is valid, the terminal defines a new indicator in the RRCResumeRequest and indicates, to the base station, that the state of a channel with the secondary cell group is good, and thus connection resumption is allowed. In the above description, when the frequency measurement configuration information is received through both the RRCRelease message and the system information, the frequency measurement configuration information received through the RRCRelease message may precede the frequency measurement configuration information received through the system information.

When the terminal performs a random-access procedure upon the need for configuration of connection and transmits an RRCResumeRequest message to the base station, with respect to the transmission of the message, the terminal operation is proposed below (operation 2h-30).

1. When the terminal identifies system information, and the system information indicates transmission of a complete terminal connection resumption identity (I-RNTI or a full resume ID), the terminal prepares to transmit the message including the stored complete terminal connection resumption identity (I-RNTI). When the system information indicates to transmit a truncated terminal connection resumption identity (a truncated I-RNTI or a truncated resume ID), the terminal configures the stored complete terminal connection resumption identity (I-RNTI) to a truncated terminal connection resumption identity (a truncated resume ID) according to a predetermined scheme, and prepares to transmit the message including the configured truncated terminal connection resumption identity.

2. The terminal restores RRC connection configuration information and security context information from the stored UE context.

3. The terminal updates a new KgNB security key corresponding to the master cell group based on the current KgNB security key, the NextHop (NH) value, and the stored NCC value.

4. Further, when the terminal has received the SCG-counter value (or sk-counter) through the RRCRelease message, the terminal updates a new SKgNB security key corresponding to the secondary cell group based on a KgNB security key and the SCG-counter value (or sk-counter).

5. The terminal induces new security keys (K_RRCenc, K_RRC_int, K_UPint, and K_UPenc) to be used in the integrity protection and verification procedure and the encryption and decryption procedure by using the newly updated KgNB security key.

6. Further, when the terminal has received the SCG-counter value (or sk-counter) through the RRCRelease message, the terminal induces new security keys (SK_RRCenc, SK_RRC_int, SK_UPint, and SK_UPenc) to be used in the integrity protection and verification procedure and the encryption and decryption procedure by using the newly updated SKgNB security key corresponding to the secondary cell group.

7. The terminal calculates MAC-I and prepares to transmit the message including the calculated MAC-I.

8. The terminal resumes SRB1 (SRB1 is to be resumed in advance since the RRCResume message is to be received through SRB1 as a response to the RRCResumeRequest message to be transmitted).

9. The terminal configures the RRCResumeRequest message and transmits the message to a lower-layer device.

10. The terminal resumes the integrity protection and verification procedure by applying the updated security keys and a preconfigured algorithm with respect to all bearers corresponding to the master cell group (MCG-terminated RBs), except for SRB0, and applies the integrity verification and protection to pieces of data to be transmitted and received thereafter. (The reason to apply the integrity verification and protection is to increase reliability and security on the pieces of data to be transmitted or received later to or from SRB1 or DRBs.)

11. The terminal resumes the encryption and decryption procedure by applying the updated security keys and a preconfigured algorithm with respect to all bearers corresponding to the master cell group (MCG-terminated RBs), except for SRB0, and applies the encryption and decryption to pieces of data to be transmitted and received thereafter. (The reason to apply the encryption and decryption is to increase reliability and security on the pieces of data to be transmitted or received later to or from SRB1 or DRBs.)

12. When the terminal has received the SCG-counter value (or sk-counter) through the RRCRelease message, the terminal resumes the integrity protection and verification procedure by applying the updated security keys and a preconfigured algorithm with respect to all bearers corresponding to the secondary cell group (SCG-terminated RBs), and applies the integrity verification and protection to pieces of data to be transmitted and received thereafter. (The reason to apply the integrity verification and protection is to increase reliability and security on the pieces of data to be transmitted or received later to or from DRBs.)

13. When the terminal has received the SCG-counter value (or sk-counter) through the RRCRelease message, the terminal resumes the encryption and decryption procedure by applying the updated security keys and a preconfigured algorithm with respect to all bearers corresponding to the secondary cell group (SCG-terminated RBs), and applies the encryption and decryption to pieces of data to be transmitted and received thereafter. (The reason to apply the encryption and decryption is to increase reliability and security on the pieces of data to be transmitted or received later to or from DRBs.)

When the terminal performs a random-access procedure upon the need for configuration of connection, transmits an RRCResumeRequest message to the base station, and then receives the RRCResume message as a response to the RRCResumeRequest message, the terminal operation is proposed below (operation 2h-40). The base station may indicate resumption of the secondary cell group by defining an indicator indicating to resume the secondary cell group in the RRCResume message, or including an SCG-counter value (or sk-counter) or secondary cell group configuration information in the RRCResume message. The base station may inquire of a secondary cell base station about whether to resume the secondary cell group and determine the same according to a response to the inquiry (operation 2h-35).

1. When receiving the message, the terminal restores the PDCP state corresponding to the master cell group, resets a COUNT value, and re-establishes PDCP-layer devices of all DRBs and SRB2 corresponding to the master cell group (MCG-terminated RBs).

2. In the case in which the RRCResume message includes secondary cell group configuration information, an SCG-counter value (or sk-counter), or an indicator indicting resumption of the secondary cell group, and indicates the resumption of the secondary cell group, when receiving the message, the terminal restores the PDCP state corresponding to the secondary cell group, resets a COUNT value, and re-establishes PDCP-layer devices of all DRBs and SRB2 corresponding to the secondary cell group (SCG-terminated RBs).

3. When the message includes master cell group (master-Cellgroup) configuration information, A. The terminal performs and applies the master cell group configuration information included the message. The master cell group information may include configuration information on RLC-layer devices belonging to the master cell group, a logical channel identity, a bearer identity, and the like.

4. When the message includes bearer configuration information (radioBearerConfig), A. The terminal performs and applies the bearer configuration information (radioBearerConfig) included in the message. The bearer configuration information (radioBearerConfig) may include configuration information on PDCP-layer devices of each bearer, configuration information on SDAP-layer devices, a logical channel identity, a bearer identity, and the like.

5. When the message includes secondary cell group (masterCellgroup) configuration information, A. The terminal performs and applies the secondary cell group configuration information included the message. The secondary cell group information may include configuration information on RLC-layer devices belonging to the secondary cell group, a logical channel identity, a bearer identity, and the like.

6. When the message includes secondary bearer configuration information (radioBearerConfig), A. The terminal performs and applies the secondary bearer configuration information (radioBearerConfig) included in the message. The secondary bearer configuration information (radioBearerConfig) may include configuration information on PDCP-layer devices of each secondary bearer, configuration information on SDAP-layer devices, a logical channel identity, a bearer identity, and the like.

7. The terminal resumes all DRBs and SRB2 corresponding to the master cell group (MCG-terminated RBs).

8. When the RRCResume message includes secondary cell group configuration information, an SCG-counter value (or sk-counter), or an indicator indicting resumption of the secondary cell group, and indicates resumption of the secondary cell group, the terminal resumes all DRBs and SRB corresponding to the secondary cell group (SCG-terminated RBs).

9. When the message includes frequency measurement configuration information (measConfig), A. The terminal performs and applies the frequency measurement configuration information included the message. That is, the terminal may perform frequency measurement according to the configuration.

10. The terminal transitions to an RRC-connected mode.

11. The terminal indicates the resumption of the suspended RRC connection to an upper-layer device.

12. The terminal configures and transmits an RRCResumeComplete message for transmission to a lower layer (operation 2h-45).

In the disclosure, the SCG-counter value (or sk-counter) may not be allocated by the base station in the connection resumption and suspension procedure, and a predefined value or a predetermined value (for example, 0) may be used therefor. Alternatively, the SCG-counter value (or sk-counter) may be updated according to a predefined rule. For example, when the connection resumption and suspension procedure is applied, the SCG-counter value (or sk-counter) may be used by increasing the value by 1.

The terminal may transmit or receive data to or from the base station (operations 2h-50 and 2h-55).

Figure 2I:
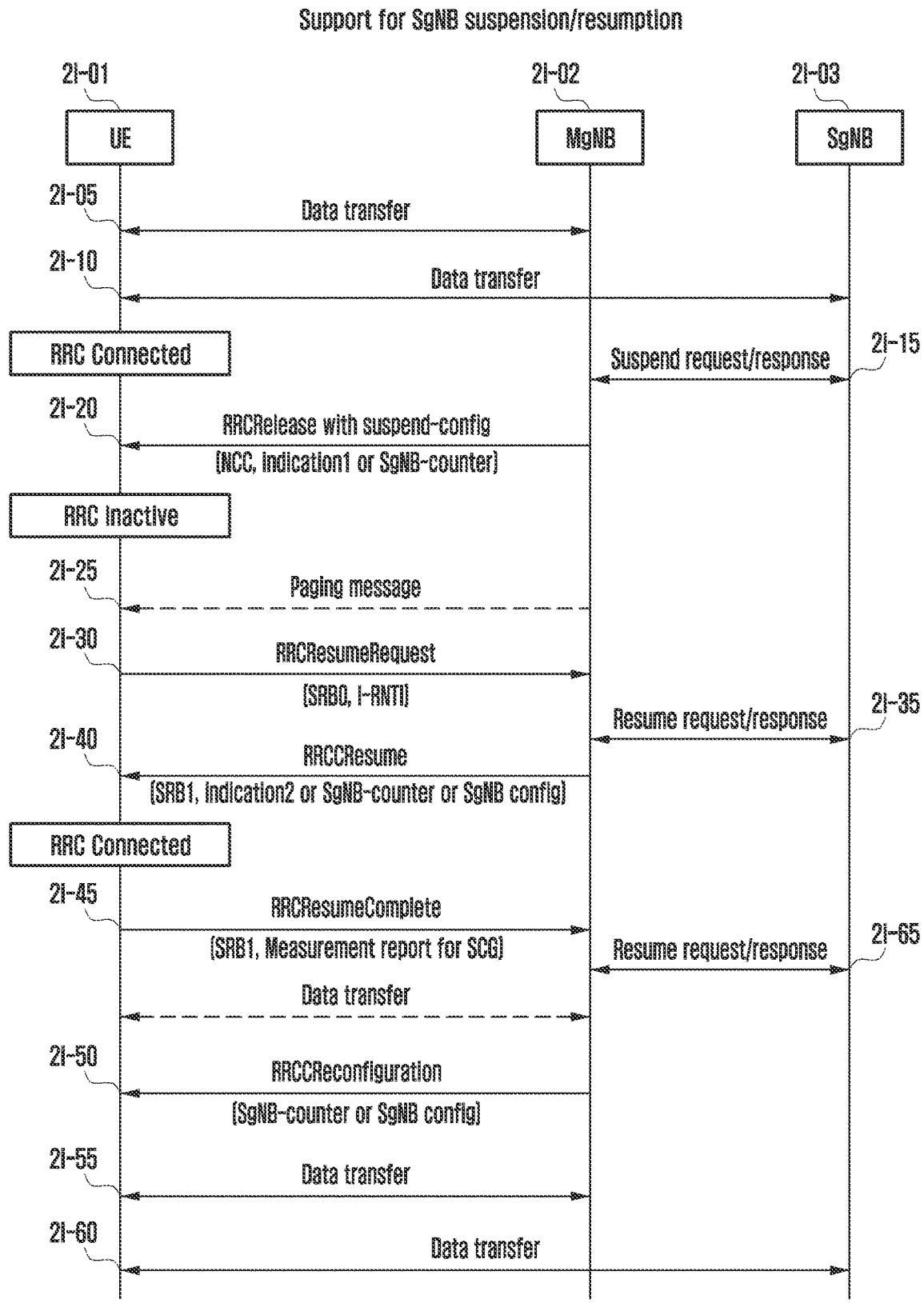
FIG. 2I illustrates a (2-3)th embodiment describing support for a RRC connection suspension and resumption procedure when a terminal performs network connection with two base stations in a single connectivity manner and transmits or receives data to or from the two base stations in the disclosure.

FIG. 2I illustrates a (2-3)th embodiment describing support for a RRC connection suspension and resumption procedure when a terminal performs network connection with two base stations in a single connectivity manner and transmits or receives data to or from the two base stations in the disclosure. In the (2-3)th embodiment, the suspension and resumption procedure is supported for RRC and bearer configuration information corresponding to a secondary cell group (SCG) (SgNB or SeNB). That is, the suspension and resumption procedure is separately supported for RRC and bearer configuration information corresponding to a master cell group (MCG) (MgNB or MeNB), and for RRC and bearer configuration information corresponding to a secondary cell group (SCG) (SgNB or SeNB). Accordingly, there is no need for newly configuring RRC and bearer configuration information corresponding to a secondary cell group (SCG) (SgNB or SeNB), thereby signaling overhead and connection delay can be reduced. Further, in the (2-3)th embodiment, the bearers in the master cell group and the bearers in the secondary cell group are resumed at different time points. The terminal reports the result of the frequency measurement for the secondary cell group to the base station through an RRCResumeComplete message, and the base station indicates whether to resume the secondary cell group through an RRCReconfiguration message.

In FIG. 2I, a terminal 2i-01 may transmit data to or from two base stations 2i-02 and 2i-03 by performing network connection with the two base stations in a single connectivity manner and applying dual-connectivity technology. When the base station needs to make the state of the terminal transition to the RRC inactive mode for a predetermined reason, the base station may transmit an RRCRelease message 2i-15 to make the state of the terminal transition to the RRC inactive mode. In the above description, for the terminal employing dual-connectivity technology, in order to determine whether to suspend and resume master cell group bearer configuration and RRC configuration information, and to determine whether to suspend and resume secondary cell group bearer configuration and RRC configuration information, the base station may inquire of a secondary cell base station about whether to suspend and resume the configuration information and determine the same according to a response to the inquiry (operation 2i-15). When it is determined to support the suspension and resumption procedure of the secondary cell base station, a master cell base station may store, in suspension configuration information of an RRCRelease message, secondary cell group bearer configuration information and RRC configuration information including a defined new indicator or an SCG-counter value (or sk-counter), and indicate to suspend secondary cell group bearers. In the above description, the SCG counter value (or sk-counter) is a security key induction value required to induce security keys (for example, K_SgNB) of the secondary cell group.

A (2-3-1)th embodiment of the terminal operation when the terminal has received the RRCRelease message 2i-20 including suspension configuration information is proposed below.

1. In the case in which the RRCRelease message includes the suspension configuration information (suspendConfig), A. When there is terminal connection resumption identity (resumeIdentity), NexthopChainingCount (NCC), RAN-notification area information (ran-NotificationAreaInfo), or an SCG-counter value (or sk-counter) already stored in the terminal, i. The terminal replaces (or updates) the stored values with new values included in the suspension configuration information of the RRCRelease message.

B. When there is no terminal connection resumption identity (resumeIdentity), NexthopChainingCount (NCC), RAN-notification area information (ran-NotificationAreaInfo), or an SCG-counter value (or sk-counter) already stored in the terminal, i. The terminal stores terminal connection resumption identity (resumeIdentity), NexthopChainingCount (NCC), RAN-notification area information (ran-NotificationAreaInfo), or an SCG-counter value (or sk-counter) included in the suspension configuration information of the RRCRelease message.

C. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases a MAC-layer device and configuration information corresponding to the secondary cell group. That is, the terminal determines that the suspension and resumption procedure is not supported for the secondary cell group.

D. The terminal resets the MAC-layer device (if not released in the above operation) corresponding to the master cell group or the secondary cell group (in order to prevent unnecessary data retransmission at the time of connection resumption of pieces of data stored in an HARQ buffer).

E. When the RRCRelease message has secondary cell group bearer configuration and RRC configuration information stored in the suspension configuration information (suspendConfig), and does not include an SCG-counter value (or sk-counter or an indicator indicating to suspend secondary cell group bearers, or includes an indicator, but the indicator indicates that suspension of the secondary cell group is not supported, i. The terminal releases or discards UE context corresponding the secondary cell group. The UE context current RRC configuration information corresponding to the secondary cell group, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

F. The terminal may perform scheme 1 or scheme 2 below.

i. Scheme 1: The terminal re-establishes RLC-layer devices for all SRBs and DRBs (MCG/SCG-terminated RBs) (in order to prevent unnecessary data retransmission at the time of connection resumption of pieces of data stored in an RLC buffer, and to initialize parameters for later use).

ii. Scheme 2: The terminal re-establishes RLC-layer devices for all SRBs and DRBs corresponding to the master cell group (MCG-terminated RBs). On the other hand, the terminal releases each RLC-layer device and configuration information of RLC-layer devices of all SRBs and DRBs corresponding to the secondary cell group (SCG-terminated RBs) (in order to perform new configuration in accordance with a new base station at time of new access of the terminal).

G. In the case in which the RRCRelease message including the suspension configuration information is not received as a response to the RRCResumeRequest message, H. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases or discards UE context corresponding to the secondary cell group.

I. The terminal stores UE context. The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

J. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases each layer device and bearer information (for example, configuration information of SDAP-layer devices, PDCP-layer devices, and RLC-layer devices) of all SRBs and DRBs (SCG-terminated RBs) corresponding to the secondary cell group.

K. The terminal suspends all SRBs and DRBs corresponding to the master cell group (MCG-terminated RBs), except for SRB0. When the configuration information corresponding to the secondary cell group is not released, the terminal suspends all SRBs and DRBs corresponding to the secondary cell group (SCG-terminated RBs).

L. The terminal reports suspension of RRC connection to an upper layer.

M. The terminal configures lower-layer devices to suspend a function for integrity protection and encryption.

N. The terminal transitions to an RRC inactive mode.

A (2-3-2)th embodiment of the terminal operation when the terminal has received the RRCRelease message 2i-20 including suspension configuration information is proposed below.

1. In the case in which the RRCRelease message includes the suspension configuration information (suspendConfig), A. When there is terminal connection resumption identity (resumeIdentity), NexthopChainingCount (NCC), or RAN-notification area information (ran-NotificationAreaInfo) already stored in the terminal, i. The terminal replaces (or updates) the stored values with new values included in the suspension configuration information of the RRCRelease message.

B. When there is no terminal connection resumption identity (resumeIdentity), NexthopChainingCount (NCC), or RAN-notification area information (ran-NotificationAreaInfo) already stored in the terminal, i. The terminal stores terminal connection resumption identity (resumeIdentity), NexthopChainingCount (NCC), RAN-notification area information (ran-NotificationAreaInfo), or an SCG-counter value (or sk-counter) included in the suspension configuration information of the RRCRelease message.

C. The terminal resets the MAC-layer device corresponding to the master cell group or the secondary cell group (in order to prevent unnecessary data retransmission at the time of connection resumption of pieces of data stored in an HARQ buffer).

D. The terminal re-establishes RLC-layer devices for all SRBs and DRBs (MCG/SCG-terminated RBs) (in order to prevent unnecessary data retransmission at the time of connection resumption of pieces of data stored in an RLC buffer, and to initialize parameters for later use).

E. When the RRCRelease message including the suspension configuration information is not received as a response to the RRCResumeRequest message, F. The terminal stores UE context. The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

G. The terminal suspends all DRBs and SRBs corresponding to the master cell group (MCG-terminated RBs), except for SRB0. Further, the terminal suspends all SRBs and DRBs corresponding to the secondary cell group (SCG-terminated RBs).

H. The terminal reports suspension of RRC connection to an upper layer.

I. The terminal configures lower-layer devices to suspend a function for integrity protection and encryption.

J. The terminal transitions to an RRC inactive mode.

In the above description, when the terminal in the RRC inactive mode needs to receive a paging message (operations 2*i*-25), transmit uplink data, or update the RAN notification area while moving, the terminal may perform an RRC connection resumption procedure.

When the terminal performs a random-access procedure upon the need for configuration of connection and transmits an RRCResumeRequest message to the base station, with respect to the transmission of the message, the terminal operation is proposed below (operation 2*i*-30).

1. When the terminal identifies system information, and the system information indicates transmission of a complete terminal connection resumption identity (I-RNTI or a full resume ID), the terminal prepares to transmit the message including the stored complete terminal connection resumption identity (I-RNTI). When the system information indicates to transmit a truncated terminal connection resumption identity (a truncated I-RNTI or a truncated resume ID), the terminal configures the stored complete terminal connection resumption identity (I-RNTI) to a truncated terminal connection resumption identity (a truncated resume ID) according to a predetermined scheme, and prepares to transmit the message including the configured truncated terminal connection resumption identity.

2. The terminal restores RRC connection configuration information and security context information from the stored UE context.

3. The terminal updates a new KgNB security key corresponding to the master cell group based on the current KgNB security key, the NextHop (NH) value, and the stored NCC value.

4. Further, when the terminal has received the SCG-counter value (or sk-counter) through the RRCRelease message, the terminal updates a new SKgNB security key corresponding to the secondary cell group based on a KgNB security key and the SCG-counter value (or sk-counter).

5. The terminal induces new security keys (K_RRCenc, K_RRC_int, K_UPint, and K_UPenc) to be used in the integrity protection and verification procedure and the encryption and decryption procedure by using the newly updated KgNB security key.

6. Further, when the terminal has received the SCG-counter value (or sk-counter) through the RRCRelease message, the terminal induces new security keys (SK_RRCenc, SK_RRC_int, SK_UPint, and SK_UPenc) to be used in the integrity protection and verification procedure and the encryption and decryption procedure by using the newly updated SKgNB security key.

7. The terminal calculates MAC-I and prepares to transmit the message including the calculated MAC-I.

8. The terminal resumes SRB1 (SRB1 is to be resumed in advance since the RRCResume message is to be received through SRB1 as a response to the RRCResumeRequest message to be transmitted).

9. The terminal configures the RRCResumeRequest message and transmits the message to the lower-layer device.

10. The terminal resumes the integrity protection and verification procedure by applying the updated security keys and a preconfigured algorithm with respect to all bearers corresponding to the master cell group (MCG-terminated RBs), except for SRB0, and applies the integrity verification and protection to pieces of data to be transmitted and received thereafter. (The reason to apply the integrity verification and protection is to increase reliability and security on the pieces of data to be transmitted or received later to or from SRB1 or DRBs.)

11. The terminal resumes the encryption and decryption procedure by applying the updated security keys and a preconfigured algorithm with respect to all bearers corresponding to the master cell group (MCG-terminated RBs), except for SRB0, and applies the encryption and decryption to pieces of data to be transmitted and received thereafter. (The reason to apply the encryption and decryption is to increase reliability and security on the pieces of data to be transmitted or received later to or from SRB1 or DRBs.)

12. When the terminal has received the SCG-counter value (or sk-counter) through the RRCRelease message, the terminal resumes the integrity protection and verification procedure by applying the updated security keys and a preconfigured algorithm with respect to all bearers corresponding to the secondary cell group (SCG-terminated RBs), and applies the integrity verification and protection to pieces of data to be transmitted and received thereafter. (The reason to apply the integrity verification and protection is to increase reliability and security on the pieces of data to be transmitted or received later to or from DRBs.)

13. When the terminal has received the SCG-counter value (or sk-counter) through the RRCRelease message, the terminal resumes the encryption and decryption procedure by applying the updated security keys and a preconfigured algorithm with respect to all bearers corresponding to the secondary cell group (SCG-terminated RBs), and applies the encryption and decryption to pieces of data to be transmitted and received thereafter. (The reason to apply the encryption and decryption is to increase reliability and security on the pieces of data to be transmitted or received later to or from DRBs.)

In the above description, when the terminal performs a random-access procedure upon the need for configuration of connection, transmits an RRCResumeRequest message to the base station, and then receives the RRCResume message as a response to the RRCResumeRequest message, a (2-3-3)th embodiment of the terminal operation is proposed below (operation 2*i*-40).

1. When receiving the message, the terminal restores the PDCP state corresponding to the master cell group, resets a COUNT value, and re-establishes PDCP-layer devices of all DRBs and SRB2 corresponding to the master cell group (MCG-terminated RBs).

2. When the message includes master cell group (masterCellgroup) configuration information, A. The terminal performs and applies the master cell group configuration information included the message. The master cell group information may include configuration information on RLC-layer devices belonging to the master cell group, a logical channel identity, a bearer identity, and the like.

3. When the terminal has received the SCG-counter value (or sk-counter) through the message, the terminal updates a new SKgNB security key corresponding to the secondary cell group based on a KgNB security key and the SCG-counter value (or sk-counter). Further, the terminal induces new security keys (SK_RRCenc, SK_RRC_int, SK_UPint, and SK_UPenc) to be used in the integrity protection and verification procedure and the encryption and decryption procedure by using the newly updated SKgNB security key corresponding to the secondary cell group.

4. When the message includes bearer configuration information (radioBearerConfig), A. The terminal performs and applies the bearer configuration information (radioBearerConfig) included in the message. The bearer configuration information (radioBearerConfig) may include configuration information on PDCP-layer devices of each bearer, configuration information on SDAP-layer devices, a logical channel identity, a bearer identity, and the like.

5. When the message includes secondary cell group (masterCellgroup) configuration information, A. The terminal performs and applies the secondary cell group configuration information included the message. The secondary cell group information may include configuration information on RLC-layer devices belonging to the secondary cell group, a logical channel identity, a bearer identity, and the like.

6. When the message includes secondary bearer configuration information (radioBearerConfig), A. The terminal performs and applies the secondary bearer configuration information (radioBearerConfig) included in the message. The secondary bearer configuration information (radioBearerConfig) may include configuration information on PDCP-layer devices of each secondary bearer, configuration information on SDAP-layer devices, a logical channel identity, a bearer identity, and the like.

7. The terminal resumes all DRBs and SRB2 corresponding to the master cell group (MCG-terminated RBs).

8. When the message includes frequency measurement configuration information (measConfig), A. The terminal performs and applies the frequency measurement configuration information included the message. That is, the terminal may perform frequency measurement according to the configuration.

9. The terminal transitions to an RRC-connected mode.

10. The terminal indicates the resumption of the suspended RRC connection to an upper-layer device.

11. The terminal configures and transmits an RRCResumeComplete message for transmission to a lower layer (operation 2*i*-45).

In the above description, when the terminal performs a random-access procedure upon the need for configuration of connection, transmits an RRCResumeRequest message to the base station, and then receives the RRCResume message as a response to the RRCResumeRequest message, a (2-3-4)th embodiment of the terminal operation is proposed below (operation 2*i*-40). The base station may indicate resumption of the secondary cell group by defining an indicator indicating to resume the secondary cell group in the RRCResume message, or including an SCG-counter value (or sk-counter) or cell group configuration information in the RRCResume message. The base station may inquire of a secondary cell base station about whether to resume the secondary cell group and determine the same according to a response to the inquiry (operation 2*i*-35).

1. When receiving the message, the terminal restores the PDCP state corresponding to the master cell group, resets a COUNT value, and re-establishes PDCP-layer devices of all DRBs and SRB2 corresponding to the master cell group (MCG-terminated RBs).

2. When the RRCResume message does not include secondary cell group configuration information, an SCG-counter value (or sk-counter), or an indicator indicating to resume the secondary cell group, or does not indicate resumption of the secondary cell group, the terminal releases SRB and DRBs corresponding the secondary cell group (SCG-terminated RBs), and releases or discards RRC configuration information and bearer configuration information corresponding to the secondary cell group.

3. When the terminal has received the SCG-counter value (or sk-counter) through the message, the terminal updates a new SKgNB security key corresponding to the secondary cell group based on a KgNB security key and the SCG-counter value (or sk-counter). Further, the terminal induces new security keys (SK_RRCenc, SK_RRC_int, SK_UPint, and SK_UPenc) to be used in the integrity protection and verification procedure and the encryption and decryption procedure by using the newly updated SKgNB security key corresponding to the secondary cell group.

4. When the message includes master cell group (masterCellgroup) configuration information, A. The terminal performs and applies the master cell group configuration information included the message. The master cell group information may include configuration information on RLC-layer devices belonging to the master cell group, a logical channel identity, a bearer identity, and the like.

5. When the message includes bearer configuration information (radioBearerConfig), A. The terminal performs and applies the bearer configuration information (radioBearerConfig) included in the message. The bearer configuration information (radioBearerConfig) may include configuration information on PDCP-layer devices of each bearer, configuration information on SDAP-layer devices, a logical channel identity, a bearer identity, and the like.

6. When the message includes secondary cell group (masterCellgroup) configuration information, A. The terminal performs and applies the secondary cell group configuration information included the message. The secondary cell group information may include configuration information on RLC-layer devices belonging to the secondary cell group, a logical channel identity, a bearer identity, and the like.

7. When the message includes secondary bearer configuration information (radioBearerConfig), A. The terminal performs and applies the secondary bearer configuration information (radioBearerConfig) included in the message. The secondary bearer configuration information (radioBearerConfig) may include configuration information on PDCP-layer devices of each secondary bearer, configuration information on SDAP-layer devices, a logical channel identity, a bearer identity, and the like.

8. The terminal resumes all DRBs and SRB2 corresponding to the master cell group (MCG-terminated RBs).

9. When the message includes frequency measurement configuration information (measConfig), A. The terminal performs and applies the frequency measurement configuration information included the message. That is, the terminal may perform frequency measurement according to the configuration.

10. The terminal transitions to an RRC-connected mode.

11. The terminal indicates the resumption of the suspended RRC connection to an upper-layer device.

12. The terminal configures and transmits an RRCResumeComplete message for transmission to a lower layer (operation 2*i*-45).

In the above description, when the terminal has UE context information and bearer configuration information on the suspended secondary cell group, the terminal may perform frequency measurement for the secondary cell group based on the frequency configuration information configured through the system information, the RRCRelease message, or the RRCResume message, and may transmit the RRCResumeComplete message including the result of the frequency measurement. Further when the result of the frequency measurement is received, the base station may inquire of a secondary cell base station about whether to resume the bearer information of the suspended secondary cell group and determine the same according to a response to the inquiry, and the base station may indicate, through an RRCReconfiguration message, whether to resume or release bearers for the secondary cell group.

The terminal operation when the terminal has received the RRCReconfiguration message is proposed below.

1. When the terminal has received the SCG-counter value (or sk-counter) through the message, the terminal updates a new SKgNB security key corresponding to the secondary cell group based on a KgNB security key and the SCG-counter value (or sk-counter). Further, the terminal induces new security keys (SK_RRCenc, SK_RRC_int, SK_UPint, and SK_UPenc) to be used in the integrity protection and verification procedure and the encryption and decryption procedure by using the newly updated SKgNB security key corresponding to the secondary cell group.

2. When the RRCReconfiguration message includes secondary cell group configuration information, an SCG-counter value (or sk-counter), or an indicator indicating to resume the secondary cell group, and indicates resumption of the secondary cell group, the terminal resumes SRB and DRBs corresponding the secondary cell group (SCG-terminated RBs). When the RRCReconfiguration message does not include secondary cell group configuration information, an SCG-counter value (or sk-counter), or an indicator indicating to resume the secondary cell group, or indicates release of the secondary cell group, the terminal releases SRB and all DRBs corresponding to the secondary cell group (SCG-terminated RBs) and releases or discards RRC configuration information and bearer configuration information corresponding to the secondary cell group.

3. When the terminal receives the message, and the RRCReconfiguration message includes secondary cell group configuration information, an SCG-counter value (or sk-counter), or an indicator indicting resumption of the secondary cell group, and indicates the resumption of the secondary cell group, the terminal restores the PDCP state corresponding to the secondary cell group, resets a COUNT value, and re-establishes PDCP-layer devices of all DRBs and SRB2 (SCG-terminated RBs) corresponding to the secondary cell group.

4. When the message includes secondary cell group (masterCellgroup) configuration information, A. The terminal performs and applies the secondary cell group configuration information included the message. The secondary cell group information may include configuration information on RLC-layer devices belonging to the secondary cell group, a logical channel identity, a bearer identity, and the like.

5. When the message includes secondary bearer configuration information (radioBearerConfig), A. The terminal performs and applies the secondary bearer configuration information (radioBearerConfig) included in the message. The secondary bearer configuration information (radioBearerConfig) may include configuration information on PDCP-layer devices of each secondary bearer, configuration information on SDAP-layer devices, a logical channel identity, a bearer identity, and the like.

In the disclosure, the SCG-counter value (or sk-counter) may not be allocated by the base station in the connection resumption and suspension procedure, and a predefined value or a predetermined value (for example, 0) may be used therefor. Alternatively, the SCG-counter value (or sk-counter) may be updated according to a predefined rule. For example, when the connection resumption and suspension procedure is applied, the SCG-counter value (or sk-counter) may be used by increasing the value by 1.

In the disclosure, the re-establishment procedure of the PDCP-layer device includes a procedure of newly configuring the integrity protection and verification procedure and the encryption and decryption procedure with the updated security key.

Further, the terminal may transmit or receive data to or from the base station (operations 2*i*-55 and 2*i*-60).

Figure 2J:
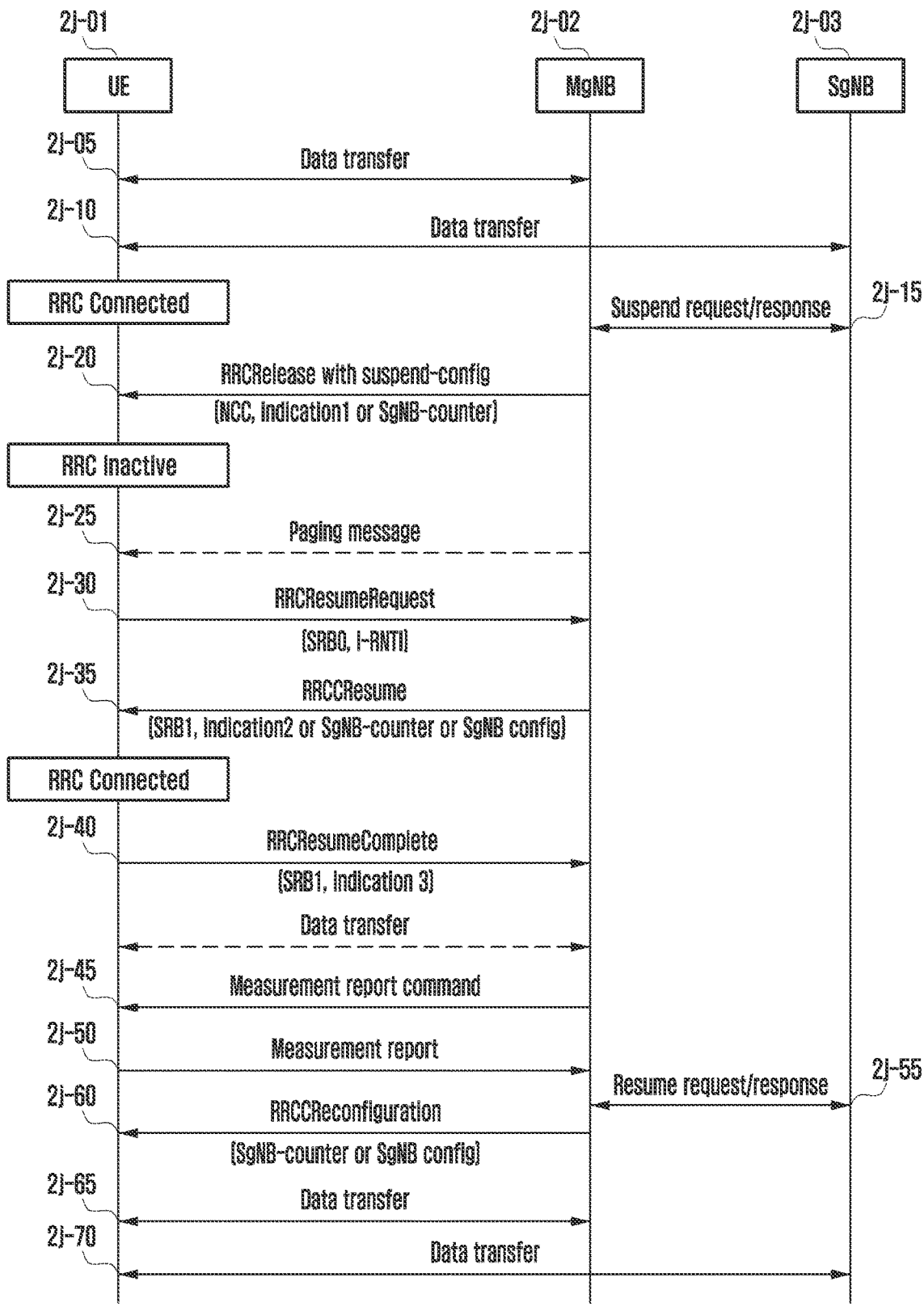
FIG. 2J illustrates a (2-4)th embodiment describing support for a RRC connection suspension and resumption procedure when a terminal performs network connection with two base stations in a single connectivity manner and transmits or receives data to or from the two base stations in the disclosure.

FIG. 2J illustrates a (2-4)th embodiment describing support for a RRC connection suspension and resumption procedure when a terminal performs network connection with two base stations in a single connectivity manner and transmits or receives data to or from the two base stations in the disclosure. In the (2-4)th embodiment, the suspension and resumption procedure is supported for RRC and bearer configuration information corresponding to a secondary cell group (SCG) (SgNB or SeNB). That is, the suspension and resumption procedure is separately supported for RRC and bearer configuration information corresponding to a master cell group (MCG) (MgNB or MeNB), and for RRC and bearer configuration information corresponding to a secondary cell group (SCG) (SgNB or SeNB). Accordingly, there is no need for newly configuring RRC and bearer configuration information corresponding to a secondary cell group (SCG) (SgNB or SeNB), thereby signaling overhead and connection delay can be reduced.

Further, in the (2-4)th embodiment, the bearers in the master cell group and the bearers in the secondary cell group are resumed at different time points. The terminal reports that there is a frequency measurement result on the secondary cell group, to the base station through an RRCResumeComplete message. When the base station commands the terminal to report the frequency measurement result (measurement report command), the terminal reports the frequency measurement result to the terminal, and the base station indicates whether to resume the secondary cell group through an RRCReconfiguration message.

In FIG. 2J, a terminal 2*j*-01 may transmit data to or from two base stations 2*j*-02 and 2*j*-03 by performing network connection with the two base stations in a single connectivity manner and applying dual-connectivity technology. When the base station needs to make the state of the terminal transition to the RRC inactive mode for a predetermined reason, the base station may transmit an RRCRelease message 2*j*-15 to make the state of the terminal transition to the RRC inactive mode. In the above description, for the terminal employing dual-connectivity technology, in order to determine whether to suspend and resume master cell group bearer configuration and RRC configuration information, and to determine whether to suspend and resume secondary cell group bearer configuration and RRC configuration information, the base station may inquire of a secondary cell base station about whether to suspend and resume the configuration information and determine the same according to a response to the inquiry (operation 2*j*-15). When it is determined to support the suspension and resumption procedure of the secondary cell base station, a master cell base station may store, in suspension configuration information of an RRCRelease message, secondary cell group bearer configuration information and RRC configuration information including a defined new indicator or an SCG-counter value (or sk-counter), and indicate to suspend secondary cell group bearers. In the above description, the SCG counter value (or sk-counter) is a security key induction value required to induce security keys (for example, K_SgNB) of the secondary cell group.

A (2-4-1)th embodiment of the terminal operation when the terminal has received the RRCRelease message 2*j*-20 including suspension configuration information is proposed below.

1. In the case in which the RRCRelease message includes the suspension configuration information (suspendConfig),
   A. When there is terminal connection resumption identity (resumeIdentity), NexthopChainingCount (NCC), RAN-notification area information (ran-NotificationAreaInfo), or an SCG-counter value (or sk-counter) already stored in the terminal,
      i. The terminal replaces (or updates) the stored values with new values included in the suspension configuration information of the RRCRelease message.
   B. When there is no terminal connection resumption identity (resumeIdentity), NexthopChainingCount (NCC), RAN-notification area information (ran-NotificationAreaInfo), or an SCG-counter value (or sk-counter) already stored in the terminal,
      i. The terminal stores terminal connection resumption identity (resumeIdentity), NexthopChainingCount (NCC), RAN-notification area information (ran-NotificationAreaInfo), or an SCG-counter value (or sk-counter) included in the suspension configuration information of the RRCRelease message.
   C. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported,
      i. The terminal releases a MAC-layer device and configuration information corresponding to the secondary cell group. That is, the terminal determines that the suspension and resumption procedure is not supported for the secondary cell group.
   D. The terminal resets the MAC-layer device (if not released in the above operation) corresponding to the master cell group or the secondary cell group (in order to prevent unnecessary data retransmission at the time of connection resumption of pieces of data stored in an HARQ buffer).
   E. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported,
      i. The terminal releases or discards UE context corresponding the secondary cell group. The UE context current RRC configuration information corresponding to the secondary cell group, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).
   F. The terminal may perform scheme 1 or scheme 2 below.
      i. Scheme 1: The terminal re-establishes RLC-layer devices for all SRBs and DRBs (MCG/SCG-terminated RBs) (in order to prevent unnecessary data retransmission at the time of connection resumption of pieces of data stored in an RLC buffer, and to initialize parameters for later use).
      ii. Scheme 2: The terminal re-establishes RLC-layer devices for all SRBs and DRBs corresponding to the master cell group (MCG-terminated RBs). On the other hand, the terminal releases each RLC-layer device and configuration information of RLC-layer devices of all SRBs and DRBs corresponding to the secondary cell group (SCG-terminated RBs) (in order to perform new configuration in accordance with a new base station at time of new access of the terminal).
   G. In the case in which the RRCRelease message including the suspension configuration information is not received as a response to the RRCResumeRequest message,
   H. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported,
      i. The terminal releases or discards UE context corresponding to the secondary cell group.
   I. The terminal stores UE context. The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

J. When the RRCRelease message has secondary cell group bearer configuration and RRC configuration information stored in the suspension configuration information (suspendConfig), and does not include an SCG-counter value (or sk-counter) or an indicator indicating to suspend secondary cell group bearers, or includes an indicator, but the indicator indicates that suspension of the secondary cell group is not supported, i. The terminal releases each layer device and bearer information (for example, configuration information of SDAP-layer devices, PDCP-layer devices, and RLC-layer devices) of all SRBs and DRBs corresponding to the secondary cell group (SCG-terminated RBs).

K. The terminal suspends all SRBs and DRBs corresponding to the master cell group (MCG-terminated RBs), except for SRB0. When the configuration information corresponding to the secondary cell group is not released, the terminal suspends all SRBs and DRBs corresponding to the secondary cell group (SCG-terminated RBs).

L. The terminal reports suspension of RRC connection to an upper layer.

M. The terminal configures lower-layer devices to suspend a function for integrity protection and encryption.

N. The terminal transitions to an RRC inactive mode.

A (2-4-2)th embodiment of the terminal operation when the terminal has received the RRCRelease message 2j-20 including suspension configuration information is proposed below.

1. In the case in which the RRCRelease message includes the suspension configuration information (suspendConfig), A. When there is terminal connection resumption identity (resumeIdentity), NexthopChainingCount (NCC), or RAN-notification area information (ran-NotificationAreaInfo) already stored in the terminal, i. The terminal replaces (or updates) the stored values with new values included in the suspension configuration information of the RRCRelease message.

B. When there is no terminal connection resumption identity (resumeIdentity), NexthopChainingCount (NCC), or RAN-notification area information (ran-NotificationAreaInfo) already stored in the terminal, i. The terminal stores terminal connection resumption identity (resumeIdentity), NexthopChainingCount (NCC), RAN-notification area information (ran-NotificationAreaInfo), or an SCG-counter value (or sk-counter) included in the suspension configuration information of the RRCRelease message.

C. The terminal resets the MAC-layer device corresponding to the master cell group or the secondary cell group (in order to prevent unnecessary data retransmission at the time of connection resumption of pieces of data stored in an HARQ buffer).

D. The terminal re-establishes RLC-layer devices for all SRBs and DRBs (MCG/SCG-terminated RBs) (in order to prevent unnecessary data retransmission at the time of connection resumption of pieces of data stored in an RLC buffer, and to initialize parameters for later use).

E. When the RRCRelease message including the suspension configuration information is not received as a response to the RRCResumeRequest message, F. The terminal stores UE context. The UE context may include current RRC configuration information, current security context information, PDCP state information including ROHC state information, SDAP configuration information, a terminal cell identity (C-RNTI) having been used in a source cell (source PCell), and a cell identity (CellIdentity) and a physical cell identity of a source cell (PCell).

G. The terminal suspends all DRBs and SRBs corresponding to the master cell group (MCG-terminated RBs), except for SRB0. Further, the terminal suspends all SRBs and DRBs corresponding to the secondary cell group (SCG-terminated RBs).

H. The terminal reports suspension of RRC connection to an upper layer.

I. The terminal configures lower-layer devices to suspend a function for integrity protection and encryption.

J. The terminal transitions to an RRC inactive mode.

In the above description, when the terminal in the RRC inactive mode needs to receive a paging message (operations 2j-25), transmit uplink data, or update the RAN notification area while moving, the terminal may perform an RRC connection resumption procedure.

When the terminal performs a random-access procedure upon the need for configuration of connection and transmits an RRCResumeRequest message to the base station, with respect to the transmission of the message, the terminal operation is proposed below (operation 2j-30).

1. When the terminal identifies system information, and the system information indicates transmission of a complete terminal connection resumption identity (I-RNTI or a full resume ID), the terminal prepares to transmit the message including the stored complete terminal connection resumption identity (I-RNTI). When the system information indicates to transmit a truncated terminal connection resumption identity (a truncated I-RNTI or a truncated resume ID), the terminal configures the stored complete terminal connection resumption identity (I-RNTI) to a truncated terminal connection resumption identity (a truncated resume ID) according to a predetermined scheme, and prepares to transmit the message including the configured truncated terminal connection resumption identity.

2. The terminal restores RRC connection configuration information and security context information from the stored UE context.

3. The terminal updates a new KgNB security key corresponding to the master cell group based on the current KgNB security key, the NextHop (NH) value, and the stored NCC value.

4. Further, when the terminal has received the SCG-counter value (or sk-counter) through the RRCRelease message, the terminal updates a new SKgNB security key corresponding to the secondary cell group based on a KgNB security key and the SCG-counter value (or sk-counter).

5. The terminal induces new security keys (K_RRCenc, K_RRC_int, K_UPint, and K_UPenc) to be used in the integrity protection and verification procedure and the encryption and decryption procedure by using the newly updated KgNB security key.

6. Further, when the terminal has received the SCG-counter value (or sk-counter) through the RRCRelease message, the terminal induces new security keys (SK_RRCenc, SK_RRC_int, SK_UPint, and SK_UPenc) to be used in the integrity protection and verification procedure and the encryption and decryption procedure by using the newly updated SKgNB security key corresponding to the secondary cell group.

7. The terminal calculates MAC-I and prepares to transmit the message including the calculated MAC-I.

8. The terminal resumes SRB1 (SRB1 is to be resumed in advance since the RRCResume message is to be received through SRB1 as a response to the RRCResumeRequest to be transmitted).

9. The terminal configures the RRCResumeRequest message and transmits the message to the lower-layer device.

10. The terminal resumes the integrity protection and verification procedure by applying the updated security keys and a preconfigured algorithm with respect to all bearers corresponding to the master cell group (MCG-terminated RBs), except for SRB0, and applies the integrity verification and protection to pieces of data to be transmitted and received thereafter. (The reason to apply the integrity verification and protection is to increase reliability and security on the pieces of data to be transmitted or received later to or from SRB1 or DRBs.)

11. The terminal resumes the encryption and decryption procedure by applying the updated security keys and a preconfigured algorithm with respect to all bearers corresponding to the master cell group (MCG-terminated RBs), except for SRB0, and applies the encryption and decryption to pieces of data to be transmitted and received thereafter. (The reason to apply the encryption and decryption is to increase reliability and security on the pieces of data to be transmitted or received later to or from SRB1 or DRBs.)

12. When the terminal has received the SCG-counter value (or sk-counter) through the RRCRelease message, the terminal resumes the integrity protection and verification procedure by applying the updated security keys and a preconfigured algorithm with respect to all bearers corresponding to the secondary cell group (SCG-terminated RBs), and applies the integrity verification and protection to pieces of data to be transmitted and received thereafter. (The reason to apply the integrity verification and protection is to increase reliability and security on the pieces of data to be transmitted or received later to or from DRBs.)

13. When the terminal has received the SCG-counter value (or sk-counter) through the RRCRelease message, the terminal resumes the encryption and decryption procedure by applying the updated security keys and a preconfigured algorithm with respect to all bearers corresponding to the secondary cell group (SCG-terminated RBs), and applies the encryption and decryption to pieces of data to be transmitted and received thereafter. (The reason to apply the encryption and decryption is to increase reliability and security on the pieces of data to be transmitted or received later to or from DRBs.)

In the above description, when the terminal performs a random-access procedure upon the need for configuration of connection, transmits an RRCResumeRequest message to the base station, and then receives the RRCResume message as a response to the RRCResumeRequest message, a (2-3-3)th embodiment of the terminal operation is proposed below (operation 2*j*-30).

1. When receiving the message, the terminal restores the PDCP state corresponding to the master cell group, resets a COUNT value, and re-establishes PDCP-layer devices of all DRBs and SRB2 (MCG-terminated RBs) corresponding to the master cell group.

2. When the terminal has received the SCG-counter value (or sk-counter) through the message, the terminal updates a new SKgNB security key corresponding to the secondary cell group based on a KgNB security key and the SCG-counter value (or sk-counter). Further, the terminal induces new security keys (SK_RRCenc, SK_RRC_int, SK_UPint, and SK_UPenc) to be used in the encryption and decryption procedure by using the newly updated SKgNB security key corresponding to the secondary cell group.

3. When the message includes master cell group (masterCellgroup) configuration information, A. The terminal performs and applies the master cell group configuration information included the message. The master cell group information may include configuration information on RLC-layer devices belonging to the master cell group, a logical channel identity, a bearer identity, and the like.

4. When the message includes bearer configuration information (radioBearerConfig), A. The terminal performs and applies the bearer configuration information (radioBearerConfig) included in the message. The bearer configuration information (radioBearerConfig) may include configuration information on PDCP-layer devices of each bearer, configuration information on SDAP-layer devices, a logical channel identity, a bearer identity, and the like.

5. When the message includes secondary cell group (masterCellgroup) configuration information, A. The terminal performs and applies the secondary cell group configuration information included the message. The secondary cell group information may include configuration information on RLC-layer devices belonging to the secondary cell group, a logical channel identity, a bearer identity, and the like.

6. When the message includes secondary bearer configuration information (radioBearerConfig), A. The terminal performs and applies the secondary bearer configuration information (radioBearerConfig) included in the message. The secondary bearer configuration information (radioBearerConfig) may include configuration information on PDCP-layer devices of each secondary bearer, configuration information on SDAP-layer devices, a logical channel identity, a bearer identity, and the like.

7. The terminal resumes all DRBs and SRB2 corresponding to the master cell group (MCG-terminated RBs).

8. When the message includes frequency measurement configuration information (measConfig), A. The terminal performs and applies the frequency measurement configuration information included the message. That is, the terminal may perform frequency measurement according to the configuration.

9. The terminal transitions to an RRC-connected mode.

10. The terminal indicates the resumption of the suspended RRC connection to an upper-layer device.

11. The terminal configures and transmits an RRCResumeComplete message for transmission to a lower layer (operation 2*j*-40).

In the above description, when the terminal performs a random-access procedure upon the need for configuration of connection, transmits an RRCResumeRequest message to the base station, and then receives the RRCResume message as a response to the RRCResumeRequest message, a (2-3-4)th embodiment of the terminal operation is proposed below (operation 2*j*-40). The base station may indicate resumption of the secondary cell group by defining an indicator indicating to resume the secondary cell group in the RRCResume message, or including an SCG-counter value (or sk-counter) or cell group configuration information in the RRCResume message. The base station may inquire of a secondary cell base station about whether to resume the secondary cell group and determine the same according to a response to the inquiry (operation 2*j*-35).

1. When receiving the message, the terminal restores the PDCP state corresponding to the master cell group, resets a COUNT value, and re-establishes PDCP-layer devices of all DRBs and SRB2 (MCG-terminated RBs) corresponding to the master cell group.

2. When the RRCResume message does not include secondary cell group configuration information, an SCG-counter value (or sk-counter), or an indicator indicating to resume the secondary cell group, or does not indicate resumption of the secondary cell group, the terminal releases SRB and DRBs corresponding the secondary cell group (SCG-terminated RBs), and releases or discards RRC configuration information and bearer configuration information corresponding to the secondary cell group.

3. When the terminal has received the SCG-counter value (or sk-counter) through the message, the terminal updates a new SKgNB security key corresponding to the secondary cell group based on a KgNB security key and the SCG-counter value (or sk-counter). Further, the terminal induces new security keys (SK_RRCenc, SK_RRC_int, SK_UPint, and SK_UPenc) to be used in the integrity protection and verification procedure and the encryption and decryption procedure by using the newly updated SKgNB security key corresponding to the secondary cell group.

4. When the message includes master cell group (masterCellgroup) configuration information, A. The terminal performs and applies the master cell group configuration information included the message. The master cell group information may include configuration information on RLC-layer devices belonging to the master cell group, a logical channel identity, a bearer identity, and the like.

5. When the message includes bearer configuration information (radioBearerConfig), A. The terminal performs and applies the bearer configuration information (radioBearerConfig) included in the message. The bearer configuration information (radioBearerConfig) may include configuration information on PDCP-layer devices of each bearer, configuration information on SDAP-layer devices, a logical channel identity, a bearer identity, and the like.

6. When the message includes secondary cell group (masterCellgroup) configuration information, A. The terminal performs and applies the secondary cell group configuration information included the message. The secondary cell group information may include configuration information on RLC-layer devices belonging to the secondary cell group, a logical channel identity, a bearer identity, and the like.

7. When the message includes secondary bearer configuration information (radioBearerConfig), A. The terminal performs and applies the secondary bearer configuration information (radioBearerConfig) included in the message. The secondary bearer configuration information (radioBearerConfig) may include configuration information on PDCP-layer devices of each secondary bearer, configuration information on SDAP-layer devices, a logical channel identity, a bearer identity, and the like.

8. The terminal resumes all DRBs and SRB2 corresponding to the master cell group (MCG-terminated RBs).

9. When the message includes frequency measurement configuration information (measConfig), A. The terminal performs and applies the frequency measurement configuration information included the message. That is, the terminal may perform frequency measurement according to the configuration.

10. The terminal transitions to an RRC-connected mode.

11. The terminal indicates the resumption of the suspended RRC connection to an upper-layer device.

12. The terminal configures and transmits an RRCResumeComplete message for transmission to a lower layer (operation 2j-45).

In the above description, when the terminal has UE context information and bearer configuration information on the suspended secondary cell group, the terminal may perform frequency measurement for the secondary cell group based on the frequency configuration information configured through the system information, the RRCRelease message, or the RRCResume message. When there is a valid result, the terminal transmits the RRCResumeComplete message including an indicator in order to indicate that the result exists. In the case in which the base station receives the indicator, when resumption of the secondary cell group is needed, the base station may command the terminal to report the frequency measurement result (operation 2j-45), and the terminal may report the frequency measurement result in response to the request for the report (operation 2j-50). When the frequency measurement result on the secondary cell group is received, the base station may inquire of a secondary cell base station about whether to resume the bearer information of the suspended secondary cell group and determine the same according to a response to the inquiry, and the base station may indicate, through an RRCReconfiguration message, whether to resume or release bearers for the secondary cell group.

The terminal operation when the terminal has received the RRCReconfiguration message is proposed below (operation 2j-60).

1. When the terminal has received the SCG-counter value (or sk-counter) through the message, the terminal updates a new SKgNB security key corresponding to the secondary cell group based on a KgNB security key and the SCG-counter value (or sk-counter). Further, the terminal induces new security keys (SK_RRCenc, SK_RRC_int, SK_UPint, and SK_UPenc) to be used in the integrity protection and verification procedure and the encryption and decryption procedure by using the newly updated SKgNB security key corresponding to the secondary cell group.

2. When the RRCReconfiguration message includes secondary cell group configuration information, an SCG-counter value (or sk-counter), or an indicator indicating to resume the secondary cell group, and indicates resumption of the secondary cell group, the terminal resumes SRB and DRBs corresponding the secondary cell group (SCG-terminated RBs). When the RRCReconfiguration message does not include secondary cell group configuration information, an SCG-counter value (or sk-counter), or an indicator indicating to resume the secondary cell group, or indicates release of the secondary cell group, the terminal releases SRB and all DRBs corresponding to the secondary cell group (SCG-terminated RBs) and releases or discards RRC configuration information and bearer configuration information corresponding to the secondary cell group.

3. When the terminal receives the message, and the RRCReconfiguration message includes secondary cell group configuration information, an SCG-counter value (or sk-counter), or an indicator indicting resumption of the secondary cell group, and indicates the resumption of the secondary cell group, the terminal restores the PDCP state corresponding to the secondary cell group, resets a COUNT value, and re-establishes PDCP-layer devices of all DRBs and SRB2 corresponding to the secondary cell group (SCG-terminated RBs).

4. When the message includes secondary cell group (masterCellgroup) configuration information, A. The terminal performs and applies the secondary cell group configuration information included the message. The secondary cell group information may include configuration information on RLC-layer devices belonging to the secondary cell group, a logical channel identity, a bearer identity, and the like.

5. When the message includes secondary bearer configuration information (radioBearerConfig), A. The terminal performs and applies the secondary bearer configuration information (radioBearerConfig) included in the message. The secondary bearer configuration information (radioBearerConfig) may include configuration information on PDCP-layer devices of each secondary bearer, configuration information on SDAP-layer devices, a logical channel identity, a bearer identity, and the like.

In the disclosure, the SCG-counter value (or sk-counter) may not be allocated by the base station in the connection resumption and suspension procedure, and a predefined value or a predetermined value (for example, 0) may be used therefor. Alternatively, the SCG-counter value (or sk-counter) may be updated according to a predefined rule. For example, when the connection resumption and suspension procedure is applied, the SCG-counter value (or sk-counter) may be used by increasing the value by 1.

In the disclosure, the re-establishment procedure of the PDCP-layer device includes a procedure of newly configuring the integrity protection and verification procedure and the encryption and decryption procedure with the updated security key.

Further, the terminal may transmit or receive data to or from the base station (operations 2j-65 and 2j-70).

Figure 2K:
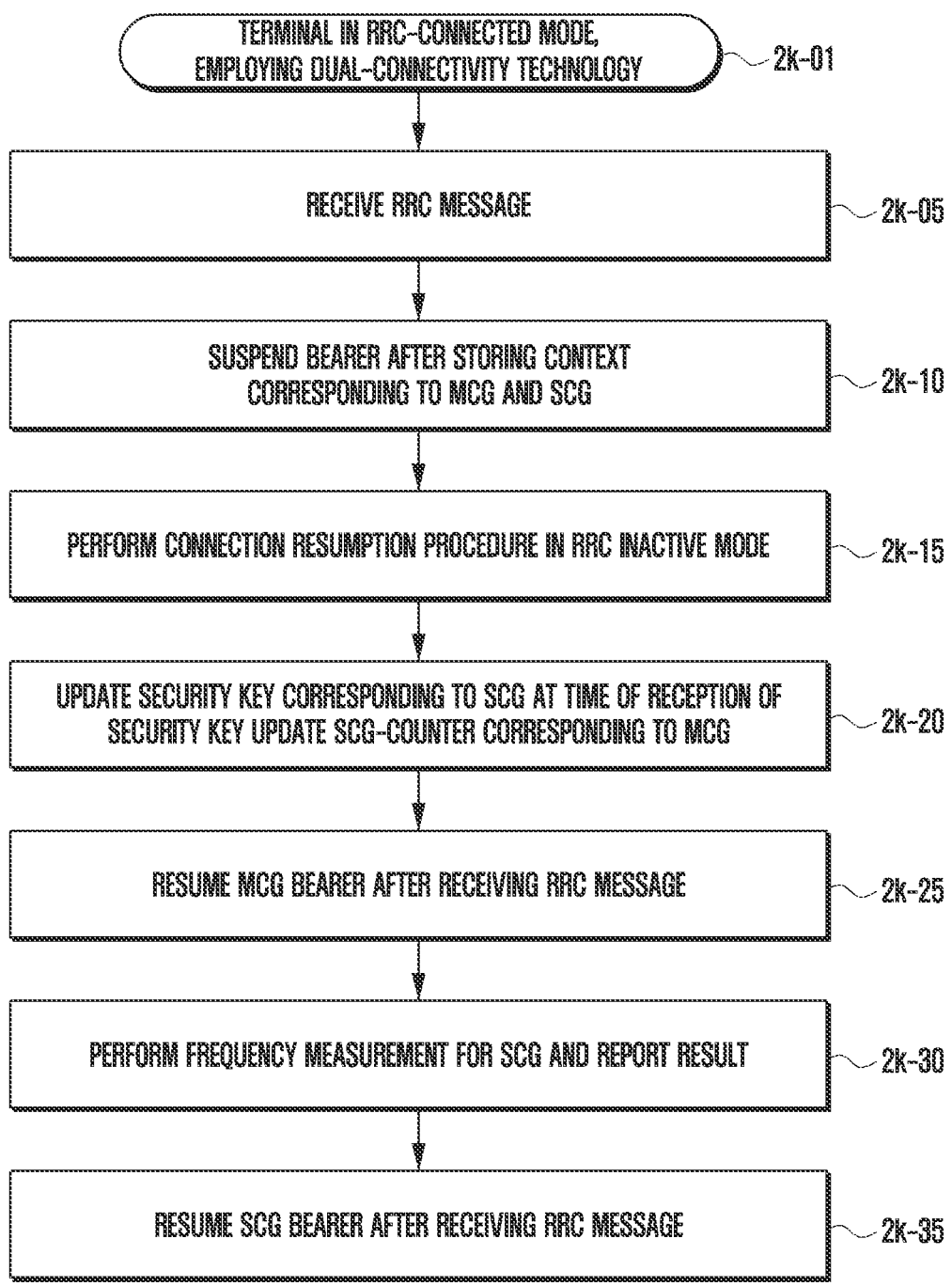
FIG. 2K illustrates the operation of a terminal for the procedures proposed in the disclosure.

FIG. 2K illustrates the operation of a terminal for the procedures proposed in the disclosure.

In the disclosure, when an RRC-connected terminal 2k-01 employing the dual-connection technology receives an RRC message (operation 2k-05) indicating to suspend connection from the base station and to transition to the RRC inactive mode, the terminal stores and releases UE context for a master cell group or a secondary cell group according to an indicator included in the message. When the terminal determines, while performing movement in the RRC inactive mode, that reconnection to the network is required, the terminal performs an RRC connection resumption procedure (operation 2k-15). That is, the terminal performs a random-access procedure and updates a security key for the master cell group or the secondary cell group before sending an RRCResumeRequest message (operation 2k-20). In addition, the terminal may resume bearers belonging to the master cell group after receiving an RRCResume message as a response to the RRCResumeRequest message. When the terminal has UE context corresponding to the secondary cell group, the terminal measures the frequency for the secondary cell group and transmits, to the base station, an indicator indicating there is a frequency measurement result, or the frequency measurement result, through an RRC message (operation 2k-30). In the case in which it is indicated that there is a frequency measurement result, when the base station requests reporting of the frequency measurement result, the terminal may report the frequency measurement result. When the base station indicates, through an RRCReconfiguration message, resumption of bearers belonging to the secondary cell group, the terminal resumes the bearers and transmits or receives data (operation 2k-35).

In the disclosure, the base station may define a new indicator in the RRC message and perform a suspension or resumption procedure for each bearer. In addition, in the disclosure, the UE context for the secondary cell group may include configuration information of an SDAP-layer device, a PDCP-layer device, an RLC-layer device, a MAC-layer device, and a PHY-layer device. Alternatively, the UE context for the second cell group may not include configuration information of the RLC-layer device (the RLC-layer device configuration information is information allocated for each cell group, and thus it may be advantageous to be allocated in a new cell group).

In the disclosure, the base station may identify whether the terminal in the RRC inactive mode stores the UE context for the secondary cell group, based on a terminal connection resumption identity. Alternatively, when the terminal performs random access to a specific preamble by applying preamble grouping, the base station may indicate that the terminal stores the UE context for the secondary cell group, and that the suspension or resumption procedure for the secondary cell group is required.

The disclosure may be directly applied to the case in which the terminal in the RRC inactive mode re-accesses the same master cell group, and may be extendedly applied, through the modification, to the case in which the terminal in the RRC inactive mode re-accesses a new master cell group.

Figure 2L:
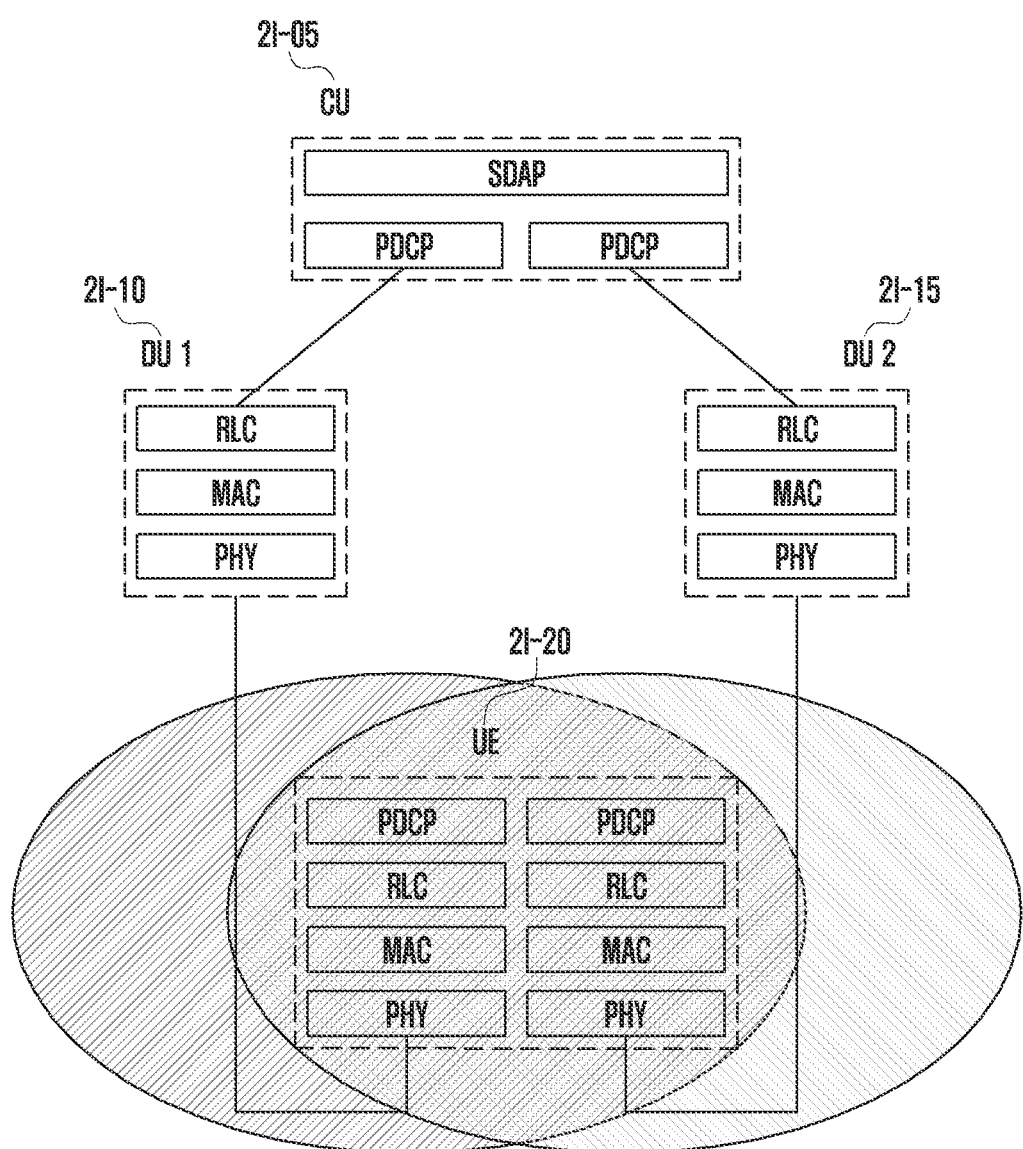
FIG. 2L illustrates a base station implementation method to which the disclosure is extendedly applicable.

FIG. 2L illustrates a base station implementation method to which the disclosure is extendedly applicable.

In FIG. 2L, when a base station is implemented, a single base station may be split into one central unit (CU) 2l-05 and multiple distributed units (DUs) 2l-10 and 2l-15. An SDAP-layer device and a PDCP-layer device may be implemented in the CU, and an RLC-layer device, a MAC-layer device, and a PHY-layer device may be implemented in the DU. According to the structure, costs for implementing the base station may be saved.

As shown in FIG. 2L, when a terminal is connected to two DUs and the dual-connectivity technology is used, an RRC inactive mode supporting method by a dual-connectivity-technology-based terminal, proposed in the disclosure to support the RRC inactive mode, may be applied. For example, the procedure of the disclosure may be applied by considering DU1 as a master cell group, and considering DU2 as a secondary cell group.

Alternatively, a new MAC control element (MAC CE) may be defined to suspend and resume bearers for each DU. For example, the new MAC CE may be transmitted to DU1 to indicate to suspend and resume bearers for DU2. In addition, the new MAC CE may be transmitted to DU2 to indicate to suspend and resume bearers for DU1. For a split bearer suspended by the MAC CE in the above description, RLC devices corresponding to the suspended cell group may suspend data transmission. The terminal may periodically perform frequency measurement for the cell group (for example, DU2) in which bearers are suspended by the MAC CE in the above description, and may report the result of the measurement through an unsuspended cell group (DU1). Accordingly, PDCCH monitoring for the suspended cell group may be suspended, thereby battery life can be saved.

The MAC CE may indicate a DU to be suspended or resumed by using DU identity information, a bearer identity, a cell identity, a logical channel identity, a cell group identity, or the like, and may be designed in the form of a bitmap.

The disclosure may be applied the dual-connection technology and also extendedly applied to the multi-connectivity technology. That is, the disclosure may be applied to the case in which connection is configured among a terminal and two or more base stations or DUs.

Figure 2M:
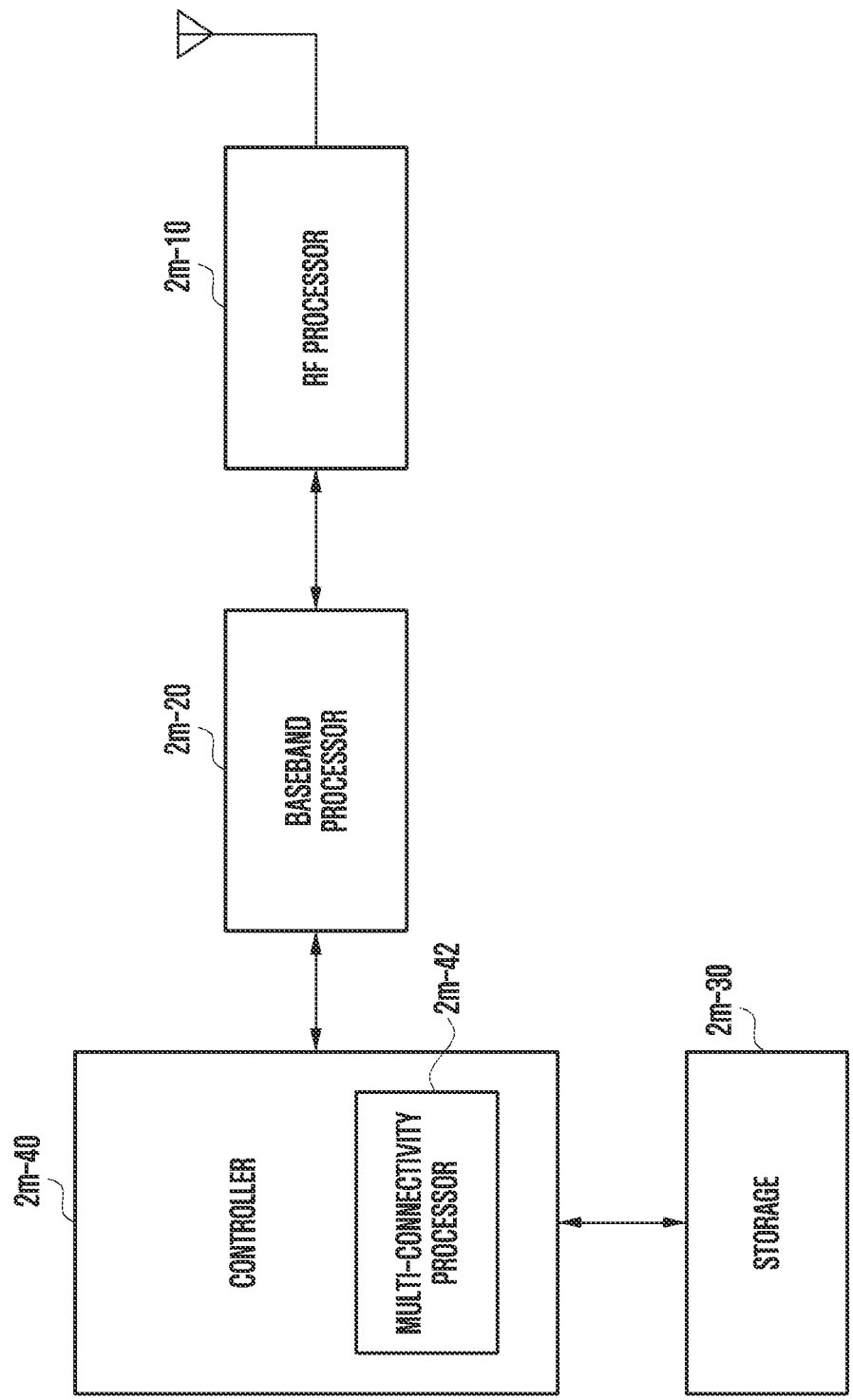
FIG. 2M illustrates the structure of a terminal, to which an embodiment of the disclosure is applicable.

FIG. 2M illustrates the structure of a terminal, to which an embodiment of the disclosure is applicable.

Referring to FIG. 2M, the terminal includes a radio frequency (RF) processor $2m$-10, a baseband processor $2m$-20, a storage $2m$-30, and a controller $2m$-40.

The RF processor $2m$-10 performs a function for transmitting or receiving a signal through a radio channel, such as signal band conversion, amplification, and the like. That is, the RF processor $2m$-10 up-converts a baseband signal, provided from the baseband processor $2m$-20, to an RF-band signal and then transmits the RF-band signal through an antenna, and down-converts an RF-band signal received through an antenna into a baseband signal. For example, the RF processor $2m$-10 may include a transmission filter, a reception filter, an amplifier, a mixer, an oscillator, a digital-to-analog converter (DAC), an analog-to-digital converter (ADC), and the like. Although only a single antenna is illustrated in FIG. 2M, the terminal may include multiple antennas. In addition, the RF processor $2m$-10 may include multiple RF chains. Furthermore, the RF processor $2m$-10 may perform beamforming. For beamforming, the RF processor $2m$-10 may adjust the phases and amplitudes of signals transmitted or received through multiple antennas or antenna elements. The RF processor $2m$-10 may also perform MIMO and may receive data of multiple layers of data during the MIMO operation. The RF processor $2m$-10 may perform reception beam sweeping by appropriately configuring the multiple antennas or antenna elements under the control of the controller, or may adjust the orientation and width of a reception beam such that the reception beam is coordinated with a transmission beam.

The baseband processor $2m$-20 performs a function of conversion between a baseband signal and a bitstream according to the physical layer specifications of a system. For example, during data transmission, the baseband processor $2m$-20 generates complex symbols by encoding and modulating a transmission bitstream. In addition, during data reception, the baseband processor $2m$-20 reconstructs a received bitstream by demodulating and decoding a baseband signal provided from the RF processor $2m$-10. For example, according to an orthogonal frequency-division multiplexing (OFDM) scheme, during data transmission, the baseband processor $2m$-20 generates complex symbols by encoding and modulating a transmission bitstream, maps the complex symbols to subcarriers, and then configures OFDM symbols by performing inverse fast Fourier transformation (IFFT) operation and cyclic prefix (CP) insertion. Further, during data reception, the baseband processor $2m$-20 segments a baseband signal, provided from the RF processor $2m$-10, into units of OFDM symbols, reconstructs signals mapped to subcarriers by performing a fast Fourier transformation (FFT) operation, and then reconstructs a received bitstream by demodulating and decoding the signals.

The baseband processor $2m$-20 and the RF processor $2m$-10 transmit and receive signals as described above. Accordingly, each of the baseband processor $2m$-20 and the RF processor $2m$-10 may also be referred to as a transmitter, a receiver, a transceiver, or a communication unit. Furthermore, at least one of the baseband processor $2m$-20 and the RF processor $2m$-10 may include multiple communication modules to support multiple different radio-access technologies. In addition, at least one of the baseband processor $2m$-20 and the RF processor $2m$-10 may include multiple communication modules to process signals of different frequency bands. For example, the different radio-access technologies may include an LTE network, an NR network, and the like. In addition, the different frequency bands may include a super-high frequency (SHF) (e.g., 2.2 gHz or 2 ghz) band and a millimeter-wave (mmWave) (e.g., 60 GHz) band.

The storage $2m$-30 stores data such as basic programs, applications, configuration information, or the like for the operation of the terminal. The storage $2m$-30 provides the stored data in response to a request from the controller $2m$-40.

The controller $2m$-40 controls the overall operation of the terminal. For example, the controller $2m$-40 transmits or receives signals through the baseband processor $2m$-20 and the RF processor $2m$-10. Further, the controller $2m$-40 records and reads data on or from the storage $2m$-40. To this end, the controller $2m$-40 may include at least one processor. For example, the controller $2m$-40 may include a communication processor (CP) for controlling communication and an application processor (AP) for controlling an upper layer such as an application. The controller $2m$-40 may further include a multi-connectivity processor $2m$-42 for supporting multi-connectivity.

Figure 2N:
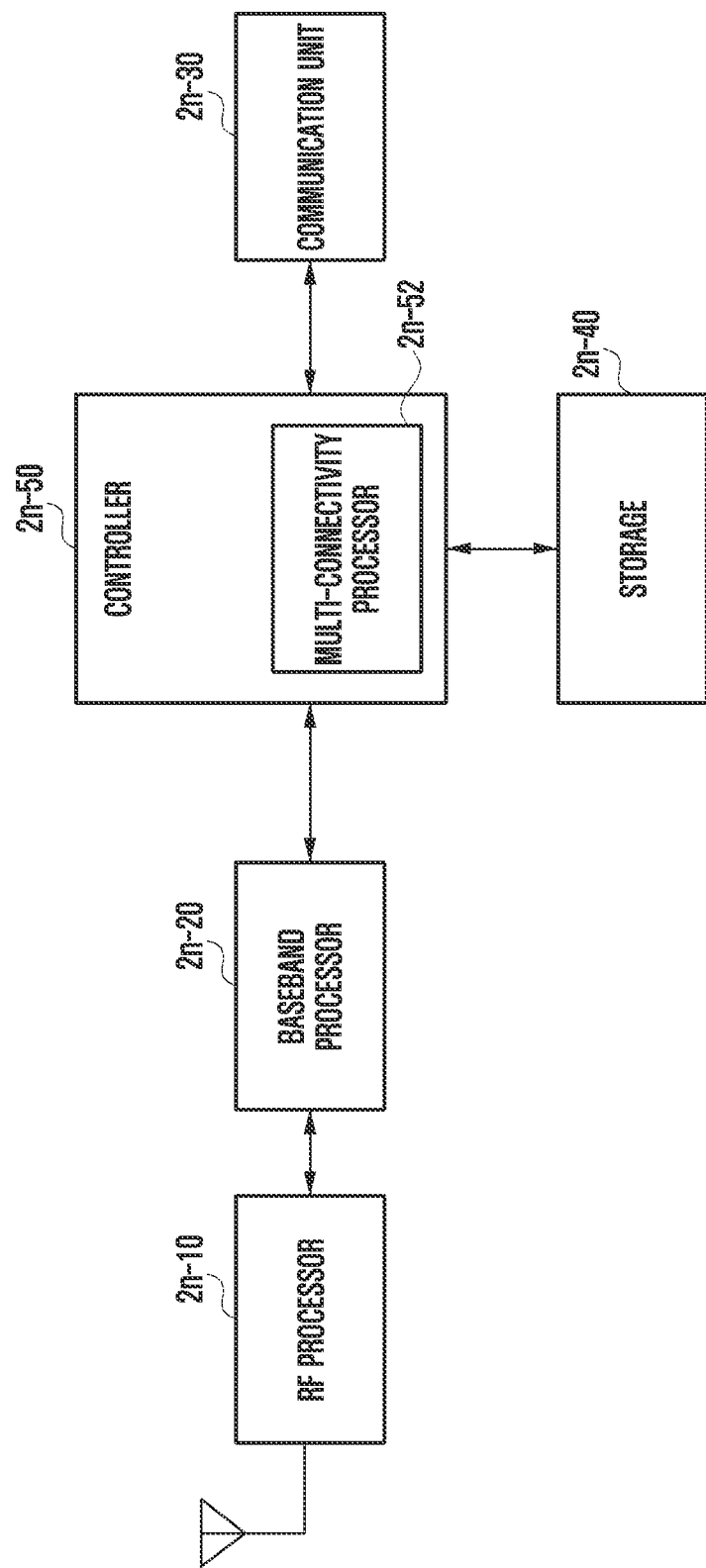
FIG. 2N illustrates a TRP block configuration in a wireless communication system, to which an embodiment of the disclosure is applicable.

FIG. 2N illustrates a TRP block configuration in a wireless communication system, to which an embodiment of the disclosure is applicable.

As illustrated in FIG. 2N, the base station includes an RF processor $2n$-10, a baseband processor $2n$-20, a backhaul communication unit $2n$-30, a storage $2n$-40, and a controller $2n$-50.

The RF processor $2n$-10 performs a function of transmitting or receiving a signal through a radio channel, such as signal band conversion and amplification. That is, the RF processor $2n$-10 up-converts a baseband signal, provided from the baseband processor $2n$-20, to an RF-band signal and transmits the converted RF-band signal through an antenna, and down-converts an RF-band signal received through an antenna to a baseband signal. For example, the RF processor $2n$-10 may include a transmission filter, a reception filter, an amplifier, a mixer, an oscillator, a DAC, an ADC, and the like. Although only a single antenna is illustrated in FIG. 2N, the first connection node may include multiple antennas. In addition, the RF processor $2n$-10 may include multiple RF chains. Furthermore, the RF processor $2n$-10 may perform beamforming. For beamforming, the RF processor $2n$-10 may adjust phases and amplitudes of signals transmitted or received through multiple antennas or antenna elements. The RF processor $2n$-10 may perform downlink MIMO operation by transmitting data of one or more layers.

The baseband processor $2n$-20 performs conversion between a baseband signal and a bitstream based on the physical layer specifications of a first radio-access technology. For example, during data transmission, the baseband processor $2n$-20 generates complex symbols by encoding and modulating a transmission bitstream. In addition, during data reception, the baseband processor $2n$-20 reconstructs a received bitstream by demodulating and decoding a baseband signal provided from the RF processor $2n$-10. For example, according to an OFDM scheme, during data transmission, the baseband processor $2n$-20 generates complex symbols by encoding and modulating a transmission bitstream, maps the complex symbols to subcarriers, and then configures OFDM symbols by performing IFFT operation and CP insertion. Further, during data reception, the baseband processor $2n$-20 segments a baseband signal, provided from the RF processor $2n$-10, into units of OFDM symbols, reconstructs signals mapped to subcarriers by performing FFT operation, and then reconstructs a received bitstream by demodulating and decoding the signals. The baseband processor $2n$-20 and the RF processor $2n$-10 transmit and receive signals as described above. Accordingly, each of the baseband processor 2n-20 and the RF processor 2n-10 may also be referred to as a transmitter, a receiver, a transceiver, a communication unit, or a wireless communication unit.

The communication unit 2n-30 provides an interface for communicating with other nodes in a network.

The storage 2n-40 stores data such as basic programs, applications, configuration information, or the like for the operation of the primary base station. In particular, the storage 2n-40 may store information related to a bearer allocated to a connected terminal, the result of measurement reported from the connected terminal, and the like. In addition, the storage 2n-40 may store information which serves as criteria for determining whether or not to provide multi-connectivity to the terminal. The storage 2n-40 provides the stored data upon a request from the controller 2n-50.

The controller 2n-50 controls the overall operation of the primary base station. For example, the controller 2n-50 transmits or receives a signal through the baseband processor 2n-20 and the RF processor 2n-10 or through the backhaul communication unit 2n-30. In addition, the controller 2n-50 records and reads data on or from the storage 2n-40. To this end, the controller 2n-50 may include at least one processor. The controller 2n-50 may further include a multi-connectivity processor 2n-52 for supporting multi-connectivity.

The particular embodiments of the disclosure described and shown in the specification and the drawings have been presented to easily explain the technical contents of the disclosure and help understanding of the disclosure, and are not intended to limit the scope of the disclosure. Further, it will be apparent that the above respective embodiments may be partially or completely employed in combination, and one or more embodiments may be employed in combination. Therefore, the scope of the disclosure should be construed to include, in addition to the embodiments disclosed herein, all changes and modifications derived on the basis of the technical idea of the disclosure.

The invention claimed is:

1. A method performed by a terminal in a wireless communication system, the method comprising:
receiving a radio resource control (RRC) release message configuring an RRC inactive state, the RRC release message including measurement configuration information;
performing a measurement based on the measurement configuration information while the terminal is in the RRC inactive state;
receiving, from a base station, an RRC resume message as a response to an RRC resume request message transmitted by the terminal;
in case that the RRC resume message does not include first information associated with restoring a secondary cell group (SCG) configuration, releasing the SCG configuration; and
transmitting, to the base station, an RRC resume complete message including a result of the measurement based on the RRC resume message.

2. The method of claim 1,
wherein the measurement configuration information includes second information indicating a frequency for the measurement,
wherein the measurement is performed for the frequency based on the second information,
wherein the RRC resume message includes third information associated with the measurement, and
wherein the RRC resume complete message is generated based on the second information.

3. The method of claim 1, in case that the RRC resume message includes the first information, further comprising restoring configuration information of the SCG.

4. The method of claim 1, in case that the RRC resume message includes fourth information associated with configuring an RRC connection with a secondary cell group (SCG), further comprising performing an RRC reconfiguration for the SCG.

5. The method of claim 1, in case that the RRC resume message includes fifth information for identifying at least one security key for a secondary cell group (SCG), further comprising performing a security key update for the SCG based on the fifth information.

6. A method performed by a base station in a wireless communication system, the method comprising:
receiving, from a terminal, a radio resource control (RRC) resume request message;
transmitting, to the terminal, an RRC resume message in response to the RRC resume request message; and
receiving, from the terminal, an RRC resume complete message including a result of a measurement based on the RRC resume message,
wherein the measurement depends on measurement configuration information for an RRC inactive state,
wherein the measurement configuration information is included in an RRC release message configuring the RRC inactive state, and
wherein, in case that the RRC resume message does not include first information associated with restoring a secondary cell group (SCG) configuration, the SCG configuration is released.

7. The method of claim 6,
wherein the measurement configuration information includes second information indicating a frequency for the measurement,
wherein the measurement is performed for the frequency based on the second information,
wherein the RRC resume message includes third information associated with the measurement, and
wherein the RRC resume complete message is generated based on the third information.

8. The method of claim 6, wherein, in case that the RRC resume message includes fourth information associated with configuring an RRC connection with a secondary cell group (SCG), an RRC reconfiguration for the SCG is performed based on the fourth information.

9. The method of claim 6, wherein, in case that the RRC resume message includes fifth information for identifying at least one security key for a secondary cell group (SCG), a security key is updated for the SCG based on the fifth information.

10. A terminal in a wireless communication system, the terminal comprising:
a transceiver configured to transmit and receive a signal; and
a controller coupled with the transceiver and configured to:
receive a radio resource control (RRC) release message configuring an RRC inactive state, the RRC release message including measurement configuration information,
perform a measurement based on the measurement configuration information while the terminal is in the RRC inactive state, receive, from a base station, an RRC resume message as a response to an RRC resume request message transmitted by the terminal, in case that the RRC resume message does not include first information associated with restoring a secondary cell group (SCG) configuration, releasing the SCG configuration, and transmit, to the base station, an RRC resume complete message including a result of the measurement based on the RRC resume message.

11. The terminal of claim 10,
wherein the measurement configuration information includes second information indicating a frequency for the measurement,
wherein the controller is configured to perform the measurement for the frequency based on the second information,
wherein the RRC resume message includes third information associated with the measurement, and
wherein the RRC resume complete message is generated based on the second information.

12. The terminal of claim 10, wherein, in case that the RRC resume message includes the first information, the controller is configured to restore configuration information of the SCG.

13. The terminal of claim 10, wherein, in case that the RRC resume message includes fourth information associated with configuring an RRC connection with a secondary cell group (SCG), the controller is configured to perform an RRC reconfiguration for the SCG.

14. The terminal of claim 10, wherein, in case that the RRC resume message includes fifth information for identifying at least one security key for a secondary cell group (SCG), the controller is configured to perform a security key update for the SCG based on the fifth information.

15. A base station in a wireless communication system, the base station comprising:
a transceiver configured to transmit and receive a signal; and
a controller coupled with the transceiver and configured to:
receive, from a terminal, a radio resource control (RRC) resume request message,
transmit, to the terminal, an RRC resume message in response to the RRC resume request message, and
receive, from the terminal, an RRC resume complete message including a result of a measurement based on the RRC resume message,
wherein the measurement depends on measurement configuration information for an RRC inactive state,
wherein the measurement configuration information is included in an RRC release message configuring the RRC inactive state, and
wherein, in case that the RRC resume message does not include first information associated with restoring a secondary cell group (SCG) configuration, the SCG configuration is released.

16. The base station of claim 15,
wherein the measurement configuration information includes second information indicating a frequency for the measurement,
wherein the measurement is performed for the frequency based on the second information,
wherein the RRC resume message includes third information associated with the measurement, and
wherein the RRC resume complete message is generated based on the third information.

17. The base station of claim 15, wherein, in case that the RRC resume message includes fourth information associated with configuring an RRC connection with a secondary cell group (SCG), an RRC reconfiguration for the SCG is performed based on the fourth information.

18. The base station of claim 15, wherein, in case that the RRC resume message includes fifth information for identifying at least one security key for a secondary cell group (SCG), a security key is updated for the SCG based on the fifth information.

* * * * *